(12) United States Patent
Choi et al.

(10) Patent No.: US 10,540,068 B2
(45) Date of Patent: Jan. 21, 2020

(54) METHOD OF PROCESSING CONTENT AND ELECTRONIC DEVICE THEREOF

(71) Applicant: Samsung Electronics Co., Ltd., Suwon-si, Gyeonggi-do (KR)

(72) Inventors: Hyun-Chul Choi, Suwon-si (KR); Soo-Jin Park, Suwon-si (KR); Hyung-Jin Park, Yongin-si (KR); Na-Gyeom Yoo, Yongin-si (KR); Bo-Hyun Yu, Uiwang-si (KR); Jae-Woong Chun, Suwon-si (KR); Hyo-Sun Choi, Suwon-si (KR); Soo-Ji Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 696 days.

(21) Appl. No.: 14/827,802

(22) Filed: Aug. 17, 2015

(65) Prior Publication Data
US 2016/0048298 A1 Feb. 18, 2016

(30) Foreign Application Priority Data
Aug. 18, 2014 (KR) .................. 10-2014-0107188

(51) Int. Cl.
*G06F 3/0484* (2013.01)
*G06F 3/0481* (2013.01)
*H04W 4/029* (2018.01)

(52) U.S. Cl.
CPC ...... *G06F 3/04842* (2013.01); *G06F 3/04817* (2013.01); *H04W 4/029* (2018.02)

(58) Field of Classification Search
CPC .. G06F 3/04842; G06F 3/04817; H04W 4/02; H04W 4/029; G06Q 30/0601; G06Q 30/0641; G06Q 30/0267
See application file for complete search history.

(56) References Cited

U.S. PATENT DOCUMENTS

| | | | |
|---|---|---|---|
| 5,946,647 A | 8/1999 | Miller et al. | |
| 6,323,853 B1 | 11/2001 | Hedloy | |
| 8,380,747 B2 * | 2/2013 | Dargahi | G06Q 10/00 707/796 |
| 9,916,396 B2 * | 3/2018 | Hong | G06F 3/04842 |
| 2002/0054092 A1 | 5/2002 | Hedloy | |
| 2007/0244907 A1 | 10/2007 | Hedloy | |
| 2008/0313159 A1 | 12/2008 | Hedloy | |
| 2011/0119624 A1* | 5/2011 | Coldefy | G06F 3/0481 715/810 |
| 2012/0197857 A1* | 8/2012 | Huang | G06F 3/0488 707/706 |
| 2012/0294520 A1* | 11/2012 | Mei | G06K 9/00335 382/164 |
| 2013/0138674 A1* | 5/2013 | Jeong | G06F 16/90335 707/758 |
| 2013/0227490 A1* | 8/2013 | Thorsander | G06F 3/0482 715/841 |
| 2013/0326340 A1* | 12/2013 | Woo | G06F 3/0484 715/243 |

(Continued)

*Primary Examiner* — Mandrita Brahmachari
(74) *Attorney, Agent, or Firm* — Jefferson IP Law, LLP

(57) ABSTRACT

A method of operating an electronic device is provided. The method includes selecting at least one particular location in content displayed on a display, identifying text included in the at least one particular location, and executing at least one program based on the text.

14 Claims, 23 Drawing Sheets

(56) References Cited

U.S. PATENT DOCUMENTS

| | | | |
|---|---|---|---|
| 2013/0339891 A1* | 12/2013 | Blumenberg | G01C 21/26 715/771 |
| 2014/0007012 A1* | 1/2014 | Govande | G06Q 30/02 715/835 |
| 2014/0223372 A1* | 8/2014 | Dostie | G06F 3/0482 715/813 |
| 2014/0351242 A1* | 11/2014 | Burns | G06F 3/04842 707/722 |
| 2015/0074113 A1* | 3/2015 | Ito | H04N 21/432 707/740 |
| 2015/0169067 A1* | 6/2015 | Hong | G06F 16/9032 715/863 |
| 2015/0331557 A1* | 11/2015 | Fish | G06F 3/04847 715/773 |
| 2015/0356509 A1* | 12/2015 | Tretikov | G06Q 10/107 705/342 |
| 2016/0196055 A1* | 7/2016 | Park | G06F 17/2765 715/768 |
| 2016/0283055 A1* | 9/2016 | Haghighat | G06F 16/957 |

* cited by examiner

METHOD OF PROCESSING CONTENT AND ELECTRONIC DEVICE THEREOF

CROSS-REFERENCE TO RELATED APPLICATION(S)

This application claims the benefit under 35 U.S.C. § 119(a) of a Korean patent application filed on Aug. 18, 2014 in the Korean Intellectual Property Office and assigned Serial number 10-2014-0107188, the entire disclosure of which is hereby incorporated by reference.

TECHNICAL FIELD

The present disclosure relates to a method of processing content or data included in the content and an electronic device thereof.

BACKGROUND

The popularity of mobile devices, which are not specified for a particular function but have various applications installed therein to provide a variety of conveniences to users, is increasing. Functions provided by respective devices such as a navigator (or a navigation device), an electronic note, a mobile phone, a multimedia player, and a recorder are integrated into one device, such as a smart phone, and the smart phone maximizes availability thereof. Further, as an operating system installed in the smart phone has been improved, operating systems such as Linux or Windows used in personal computers (PCs) of the related art are applied, thereby supporting a more stable system.

The above information is presented as background information only to assist with an understanding of the present disclosure. No determination has been made, and no assertion is made, as to whether any of the above might be applicable as prior art with regard to the present disclosure.

SUMMARY

As mobile devices support various applications, supporting of interactions between applications has become an import element in a performance evaluation of the mobile device.

For example, when a mobile device receives a text message including uniform resource locator (URL) information expressing a particular webpage address, a user may access the corresponding URL by using the URL information and a browser. The user should end a text message app and execute the browser again while remembering the URL information included in the text message, and then enter the remembered URL information in an address bar of the browser, so as to access the corresponding URL. If the URL information has a simple form, the URL information is easy to remember, so it is not a serious problem. However, if the URL information is long, complicated, or otherwise difficult to remember, the user should make a separate note or copy the corresponding address to store the address in a clipboard, execute the browser, and then paste the address.

Aspects of the present disclosure are to address at least the above-mentioned problems and/or disadvantages and to provide at least the advantages described below. Accordingly, an aspect of the present disclosure is to provide an electronic device and a content processing method for easily executing a related different application in one application.

According to various embodiments of the present disclosure, in order to execute a second program in a first program, an electronic device may directly or indirectly execute the related second program based on a data format output in the first program. For example, the second program related to the data format may be predefined. In such a state, when an input of the first program is detected, the electronic device may identify the data format existing in an area of the output first program corresponding to the input and execute the second program corresponding to the identified data format. At this time, the electronic device may directly execute the second program or finally execute the second program through additional stages.

In accordance with an aspect of the present disclosure, a method of operating an electronic device is provided. The method includes selecting at least one particular location in content displayed on a display, identifying text included in the at least one particular location, and executing at least one program based on the text.

In accordance with another aspect of the present disclosure, an electronic device is provided. The electronic device includes a display configured to display content and to receive a selection of at least one location in the content, and at least one processor configured to select at least one particular location in the content, identify text included in the at least one particular location, and executing at least one program based on the text.

In accordance with another aspect of the present disclosure, a method of operating an electronic device is provided. The method includes selecting a particular location in content displayed on the display, determining an icon identical or similar to an image of the selected location, and calling a program corresponding to the icon.

In accordance with another aspect of the present disclosure, an electronic device is provided. The electronic device includes a display configured to display content and to receive a selection of at least one location in the content, and at least one processor configured to select a particular location in the content, determine an icon identical or similar to an image in the selected location, and call a program corresponding to the icon.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
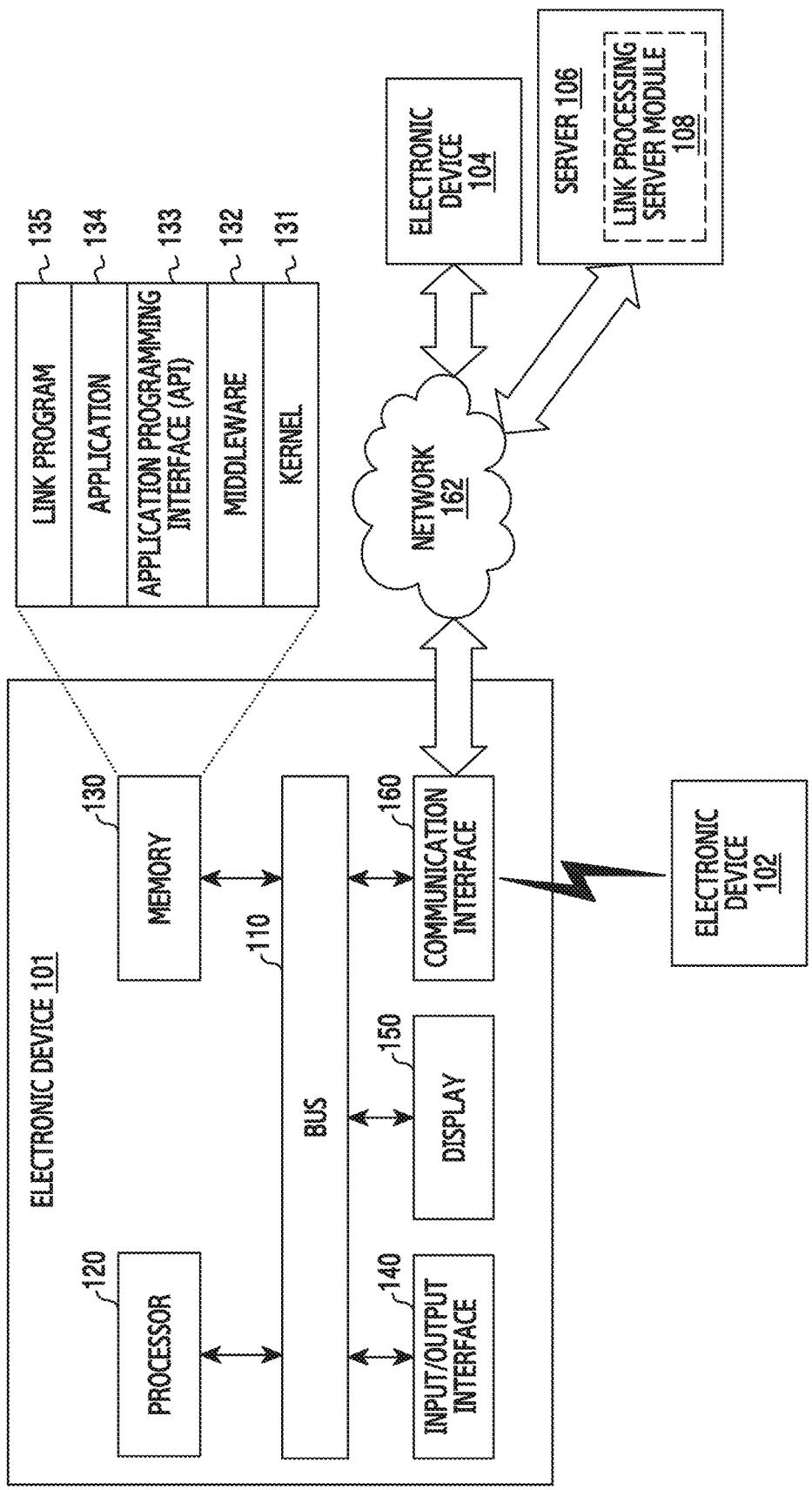
FIG. 1 illustrates a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions are omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, operations, elements, parts, or a combination thereof described in the specifications, and do not preclude the presence or addition of one or more other features, numbers, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although terms such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. A first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. On the other hand, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a central processing unit (CPU) or an application processor (AP), capable of performing a corresponding operation by executing one or more software programs stored in a memory device.

The terms as used herein are used merely to describe certain embodiments and are not intended to limit the present disclosure. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

The module or programming module according to various embodiments of the present disclosure may further include at least one or more constitutional elements among the aforementioned constitutional elements, or may omit some of them, or may further include additional other constitutional elements. Operations performed by a module, programming module, or other constitutional elements according to various embodiments of the present disclosure may be executed in a sequential, parallel, repetitive, or heuristic manner. In addition, some of the operations may be executed in a different order or may be omitted, or other operations may be added.

An electronic device according to various embodiments of the present disclosure may be a device including a communication function. For example, the electronic device according to various embodiments of the present disclosure may include at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); an moving picture experts group (MPEG) audio layer 3 (MP3) player; a mobile medical device; a camera; or a wearable device (e.g., a head-mounted-device (HMD), an electronic glasses, an electronic clothing, an electronic bracelet, an electronic necklace, an electronic appcessory, an electronic tattoo, a smart mirror, or a smart watch).

In various embodiments of the present disclosure, an electronic device may be a smart home appliance including a communication function. For example, of such appliances may include at least one of: a television (TV); a digital versatile disc (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync®, Apple TV®, or Google TV®); a game console (e.g., Xbox® PlayStation®); an electronic dictionary; an electronic key; a camcorder; or an electronic frame.

In various embodiments of the present disclosure, an electronic device may include at least one of: medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine); a navigation device; a global positioning system (GPS) receiver; an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller machine (ATM) of a financial institution, point of sale (POS) device at a retail store, or an internet of things device (e.g., a lightbulb, various sensors, an electronic meter, a gas meter, a sprinkler, a fire alarm, a thermostat, a streetlamp, a toaster, a sporting equipment, a hot-water tank, a heater, or a boiler and the like).

In certain embodiments of the present disclosure, an electronic device may include at least one of: a piece of furniture or a building/structure; an electronic board; an electronic signature receiving device; a projector; and various measuring instruments (e.g., a water meter, an electricity meter, a gas meter, or a wave meter), each of which includes a communication function.

An electronic device according to various embodiments of the present disclosure may also include a combination of one or more of the above-mentioned devices.

Further, it will be apparent to those skilled in the art that an electronic device according to various embodiments of the present disclosure is not limited to the above-mentioned devices.

Herein, the term "user" may indicate a person who uses an electronic device or a device (e.g., an artificial intelligence electronic device) that uses the electronic device.

Hereinafter, various embodiments of the present disclosure will describe a technology for sharing content by an electronic device.

FIG. 1 is a block diagram of an electronic device according to an embodiment of the present disclosure.

Referring to FIG. 1, the electronic device 101 may include a bus 110, a processor 120, a memory 130, an input/output (I/O) interface 140, a display 150, and a communication interface 160. In various embodiments of the present disclosure, at least one of the components of the electronic device 100 may be omitted, or other components may be additionally included in the electronic device 100.

The bus 110 may be a circuit that connects the processor 120, the memory 130, the I/O interface 140, the display 150, or the communication interface 160 and transmits communication (e.g., control messages) between the above described components.

The processor 120 may include one or more of a CPU, an AP, and a communication processor (CP). For example, the processor 120 may carry out operations or data processing related to control and/or communication of at least one other component of the electronic device 100.

The memory 130 stores an instruction or data received from the processor 120 or other elements (e.g., the I/O interface 140, the display 150, the communication interface 160, or the content reproducing module 170, etc.), or generated by the processor 120 or other elements. The memory 130 includes, for example, programming modules such as a kernel 131, middleware 132, an application programming interface (API) 133, an application 134, or a link program 135. Each of the programming modules may be configured using software, firmware, hardware, or a combination of two or more of these.

The kernel 131 controls or manages system resources (e.g., the bus 110, the processor 120, or the memory 130, etc.) used for executing an operation or a function implemented in the rest of the programming modules, for example, the middleware 132, the API 133, or the application 134. Also, the kernel 131 provides an interface for allowing the middleware 132, the API 133, or the application 134 to access an individual element of the electronic device 101 and control or manage the same.

The middleware 132 performs a mediation role so that the API 133 or the application 134 may communicate with the kernel 131 to provide and receive data. Also, in connection with task requests received from the application 134, the middleware 132 controls (e.g., schedules or load balances) a task request using, for example, a method of assigning priority that may use a system resource (e.g., the bus 110, the processor 120, or the memory 130, etc.) of the electronic device 101 to at least one application 134.

The API 133 is an interface for allowing the application 134 to control a function provided by the kernel 131 or the middleware 132, and may include at least one interface or function (e.g., an instruction) for file control, window control, image processing, or character control, etc.

According to an embodiment of the present disclosure, the application 134 may include a short message service/multimedia messaging service (SMS/MMS) application, an e-mail application, a calendar application, an alarm application, a health care application (e.g., an application for measuring a quantity of motion or a blood sugar level, etc.), or an environmental information application (e.g., an application providing atmospheric pressure, humidity or temperature information, etc.). Additionally or alternatively, the application 134 may be an application related to information exchange between the electronic device 101 and an external electronic device (e.g., the electronic device 104). The application related to the information exchange may include, for example, a notification relay application for transferring certain information to the external electronic device or a device management application for managing the external electronic device.

For example, the notification relay application may include a function for transferring notification information generated from a different application (e.g., an SMS/MMS application, an e-mail application, a health care application, or an environmental information application) of the electronic device 101 to an external electronic device (e.g., the electronic device 104). Additionally or alternatively, the notification relay application may, for example, receive notification information from an external electronic device (e.g., the electronic device 104) and provide the same to a user. The device management application may manage (e.g., install, delete, or update) a function (e.g., turn-on/turn-off of an external electronic device itself (or some constituent part) or luminance (or resolution) control of a display) of an external electronic device (e.g., the electronic device 104) communicating with the electronic device 101 and an application operating in the external electronic device or a service (e.g., a communication service or a message service) provided by the external electronic device.

According to an embodiment of the present disclosure, the application 134 includes a designated application depending on an attribute (e.g., a kind of an electronic device) of the external electronic device (e.g., the electronic device 104). For example, in the case where the external electronic device is an MP3 player, the application 134 includes an application related to music reproduction. Similarly, in the case where the external electronic device is a mobile medical health care device, the application 134 includes an application related to health care. According to an embodiment of the present disclosure, the application 134 may include at least one of an application designated in the electronic device 101 and an application received from the external electronic device (e.g., the server 106 or the electronic device 104).

The memory 130 may further include a link program 135. The link program 135 may be provided while included in the applications 134, or may be stored in the memory 130 as a separate program.

The link program 135 may select a particular location in content, identify text included in the particular location, and execute at least one program based on the text. According to an embodiment of the present disclosure, the link program 135 may process content including at least one of a still image, a moving image, text, audio data, and link. According to an embodiment of the present disclosure, the link program 135 may process text including a data type processed in the program or a program name. According to an embodiment of the present disclosure, the link program 135 may process at least one of an email address, a phone number, a location address, a location coordinate, a location name, and a person name in the data type. According to an embodiment of the present disclosure, when the number of particular locations is two or more, the link program 135 may execute at least one program based on text identified in the two or more selected particular locations. According to an embodiment of the present disclosure, when the number of particular locations is two or more, the link program 135 may call all programs determined based on the text identified in the two or more particular locations and input the text determined to call the program into the program. According to an embodiment of the present disclosure, the link program 135 may transmit the same data to a recipient corresponding to the text through each program. According to an embodiment of the present disclosure, when the particular location is a link, the link program 135 may identify text corresponding to a preset data type included in other content linked. According to an embodiment of the present disclosure, the link program 135 may process text in the program. According to an embodiment of the present disclosure, when the program is a navigation device, the link program 135 may input the text as a starting point, a destination, or a stopover and process the input text.

The link program 135 may select a particular location in content, determine an icon identical or similar to an image in the selected location, and call a program corresponding to the icon. According to an embodiment of the present disclosure, the link program 135 may detect at least one text included in the image and determine an icon based on at least one of the image and the text in the selected location.

The link program 135 may determine, based on particular data distinguished through analysis of a character string included in each of the content or multimedia content, a second program which can be called by a first program outputting the corresponding content. An independent application may be an example of the program. The application refers to software in an executable state in each device, and may be made and generated in each device by itself and installed in the corresponding device through an auxiliary memory such as a universal serial bus (USB) memory, an external hard disc, a compact disc (CD), or a DVD. Further, the application may be downloaded through a wired/wireless network and installed in the corresponding device.

Software which is not independent software but can complement or assist other software may be another example of the program. For example, there is a module provided by dynamic linked library (DLL) or Linux. The software may operate as a part that performs a particular function within each application. Further, the program may be a function unit of software functionally divided. Particularly, in a recent object-oriented software environment that lays stress on reusability of software, separate applications share the same software module in many cases, so separation between the first program and the second program may be unclear. Accordingly, it is important to include a function corresponding to the smallest unit identified by software in a range of the program. Accordingly, the range of the program may include an independently executable application, a module set that cannot independently operate but perform a particular function within an application, and functions included in each module.

In designation of the first program and the second program, a program related to particular data existing on content output through the first program may be the second program. The first program and the second program are all relative, and another program related to particular data existing on the first program may be the second program. A program that is currently outputting content on the screen may be the first program, and a program called by the first program may be the second program. For example, when a message program has a URL informing of a particular website, the user may execute an Internet browser by selecting the URL in the message program. In this case, the first program may be the message program, and the second program may be the Internet browser when the user selects the URL through the message program and then the Internet browser is executed. When the user selection is completed and thus the website corresponding to a selected URL address is output while the Internet browser is executed, information contained in the corresponding website is shown on the screen and the message program corresponding to the first program may be moved to the background by the Internet browser. In this case, the Internet browser existing in the foreground may serve as the first program. When the website includes a phone number and the phone number is recognized as particular data, if the user selects the phone number in the website, a dialer program or a program such as an address book related to the particular data corresponding to the phone number may be executed. In this scenario, the Internet browser may be the first program, and the dialer program or the address book which can be executed through the Internet browser may be the second program.

The second program executed through the first program may be directly called and executed through the first program, or the first program may induce the execution of the second program through a new medium program during an intermediate stage. The medium program that connects the first program and the second program may be an option window or a popup window that provides an option for allowing the user to select a program which the user desires to execute. Further, the medium program may refer to various types of hidden programs, through which the first program goes to execute the second program even if the medium program is not a graphical user interface (GUI) which can be recognized by the user. The medium program does not have a direct connection relation with the first program or the second program, but may be a program provided by an operating system or a software platform. In this case, when the first program delivers an event to the operating system, the operating system may induce the execution of the second program in response to the delivered event. At this time, the operating system may be the medium program.

Further, the second program may exist in a different device from a device having the first program. For example, when a phone number exists in a site visited through a web browser installed in a smart phone, the user may select the phone number and execute an address book or a dialer application related to particular data such as the phone number. The first program may be the web browser and the second program may be the address book or the dialer application. The first program may be executed in the smart phone, but the second program may be executed in an accessory, a wearable computing device, or an output device such as a three-dimensional (3D) printer, which is connected to the smart phone. Similarly, the first program may be executed in an accessory, a wearable computing device, or an output device such as a 3D printer, and the second program may be executed in a mobile electronic device such as the smart phone.

In order to execute the second program, the first program should output a screen for the user. This is because the user can execute the second program by selecting information on a screen output by the first program. The entirety or part of the screen shown to the user by the first program may be referred to as content, and each of individual content output on the screen may be also referred to as content. Further, the content may include a set of content. In addition to the first program, if the second program should also show a screen to the user, the screen may be referred to as content as well. More specifically, content may include various multimedia content as well as character string information or only text, or may refer to only multimedia content such as images, videos, or voice files. Alternatively, in the content, text and multimedia content may be combined. Further, the content may be connected to other content or include other content. Similarly, some areas currently shown through the content may be content, and each of multimedia content such as an image, a video, or a voice file, which is contained in the content, may be admitted as one content.

Content displayed on the screen by each program may have various data types. For example, the data types include a general character string, number, hyperlink, URL, file directory information, phone number, home address, coordinate value, and figures for a 3D printer. Particular data may refer to a data type in which the second program can be executed through the first program. In order to execute the second program through the first program, various data types may exist on the screen output by the first program. The various data types may include data types in which the second program can be executed. Such data types may be referred to as particular data. Accordingly, the data type may be a particular data type defining an executable program of the particular data. In other words, the particular data may refer to data types which can be identified by the first program outputting the content displayed on the current screen in order to execute the second program, for example, a phone number, an address, information informing of a geographical location (including a coordinate, information for calculating the coordinate, and the like), an email address, user contact information (e.g., user address book), and information for identifying each online account (social networking service (SNS), mobile messenger, and the like).

For example, when the user selects an email address in the content output by the first program, the selection of the email address may automatically execute an email program, which has a highest relation with the email address corresponding to the data type selected by the user, based on the idea that the email address is associated with the email program. The data type of the "email address" may be particular data which can be identified to execute a related program (e.g., the email program). The particular data may be a name of the particular program. When the content includes the sentence "send me a message", the word "message" that specifies a program installed in the device may be identified as the particular data and thus the message program may be executed if the user selects the word "message".

In the particular data, it may be predefined which second program is related to the particular data, (i.e., whether the second program can be executed), before the second program is executed in the first program. In order to designate the second program related to each piece of the particular data, various methods may be used. One of the simplest methods may be a method of fixing a particular application executable for the particular data in advance and allowing the first program to refer to the application. An email program and a program such as Facebook or Twitter may be fixedly linked to the particular data corresponding to an email address. When the first program outputs content and the particular data corresponding to the email address exists in the content, if the user selects the email address, the first program may execute one of the email program, Facebook, and Twitter or induce the user to select one of the three programs. In this case, the implementation may be simple, but the initially fixed type of particular data or a program list related to the particular data cannot be edited by the user. As a more dynamic method, the user may make an edit such as adding new particular data or deleting the particular data. In this case, the electronic device may add new particular data or generate new particular data by linking a particular program of the data type, which has been not used in the related art.

Similarly, the program lists linked to the existing particular data may be also edited by the user. For example, when there is initially only a data type but there is no particular data, the user may designate a phone number and a URL as particular data. In this case, the user may edit a program list corresponding to the phone number and the URL and link a dialer program to the phone number and an Internet browser to the URL. After the editing is completed, when the content output by the first program includes the phone number and the URL, the dialer program may be executed if the user selects the phone number, and the Internet browser may be executed when the user selects the URL. As another method, the electronic device may analyze a use pattern of the user and automatically add proper particular data although the user does not directly edit or generate particular data. When a new program is installed, the program may be added to the particular data as a related program. When there is not a defined data type related to the newly installed program, the new particular data may be defined by generating a new data type and then linking the newly installed program to the data type. In order to perform such an operation, an operating system of each device or a software platform executing each program may require supporting of providing each program with a software interface that performs an operation for adding new particular data, deleting the existing particular data, or changing, for example, adding, deleting, or editing the program related to the particular data.

Detailed information on each piece of particular data may be included. Particular data such as a "phone number" may include detailed information suitable for a phone number format of "010-1213-3123". Similarly, particular data such as an "email address" may include detailed information suitable for an email address format of "test@test.com". Information corresponding to detailed substances existing in each piece of particular data, and detailed information on particular data included in the first program may be transmitted to the second program as necessary. For example, when the user selects the detailed information "test@test.com", an "email writing program" corresponding to the second program related to the detailed information may be executed, the first program may transmit "test@test.com" to the email writing program, and "test@test.com" may be automatically filled in an address box of a recipient of the email writing program.

The I/O interface 140 transfers an instruction or data input from a user via an I/O unit (e.g., a sensor, a keyboard, or a touchscreen) to the processor 120, the memory 130, the communication interface 160, or the content reproducing module 170 via the bus 110, for example. For example, the I/O interface 140 may provide data regarding a user's touch input via the touchscreen to the processor 120. Also, the I/O interface 140 may, for example, output an instruction or data received via the bus 110 from the processor 120, the memory 130, and the communication interface 160, or the content reproducing module 170 via the I/O unit (e.g., a speaker or a display). For example, the I/O interface 140 may output voice data processed by the processor 120 to a user via a speaker.

The display 150 displays various types of information (e.g., multimedia data or text data, etc.) to a user.

The communication interface 160 establishes communication between the electronic device 101 and an external device (e.g., the electronic device 104 or the server 106). For example, the communication interface 160 may be connected to a network 162 via wireless communication or wired communication to communicate with the external device. The wireless communication may, for example, include at least one of Wi-Fi, Bluetooth (BT), near field communication (NFC), a GPS, or cellular communication (e.g., long term evolution (LTE), LTE advanced (LTE-A), code division multiple access (CDMA), wideband CDMA (WCDMA), universal mobile telecommunications system (UMTS), wireless broadband (WiBro), or global system for mobile communications (GSM), etc.). The wired communication may include, for example, at least one of a USB, a high definition multimedia interface (HDMI), recommended standard 232 (RS-232), and plain old telephone service (POTS).

According to an embodiment of the present disclosure, the network 162 may be a telecommunications network. The telecommunications network may include at least one of a computer network, the Internet, an internet of things, and a telephone network. According to an embodiment of the present disclosure, a protocol (e.g., a transport layer protocol, a data link layer protocol, or a physical layer protocol) for communication between the electronic device 101 and an external device may be supported by at least one of the application 134, the API 133, the middleware 132, the kernel 131, or the communication interface 160.

According to an embodiment of the present disclosure, the server 106 supports driving of the electronic device 101 by performing at least one operation among the operations (or functions) implemented in the electronic device 101. For example, the server 106 may include a link processing server module 108 which can support the link program 135 implemented in the electronic device 101. For instance, the link processing server module 108 may include at least one constituent element of the link program 135, and perform (e.g., act for) at least one operation among the operations performed by the link program 135.

Figure 2:
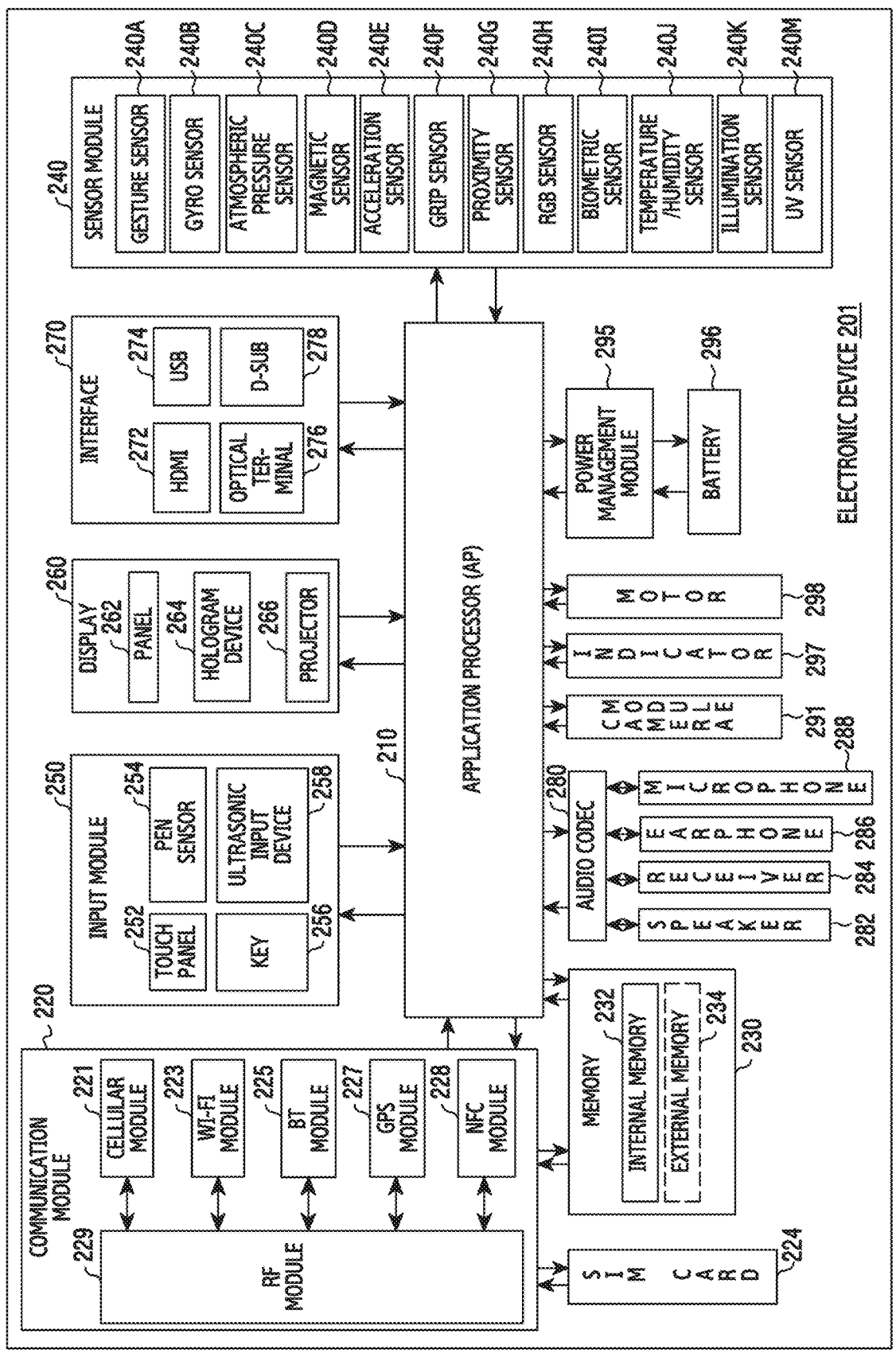
FIG. 2 is a block diagram of an electronic device according to an embodiment of the present disclosure.

FIG. 2 is a block diagram illustrating an electronic device according to an embodiment of the present disclosure.

Referring to FIG. 2, the electronic device 201 may configure, for example, all or a portion of the electronic device 21 illustrated in FIG. 1.

The electronic device 201 may include one or more APs 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, or a motor 298.

The AP 210 may drive an operating system (OS) or an application to control a plurality of hardware or software elements connected to the AP 210, and perform various data processes including multimedia data and operations. The AP 210 may be implemented, for example, as a system on chip (SoC). According to an embodiment of the present disclosure, the AP 210 may further include a GPU (not shown).

The communication module 220 (e.g., the communication interface 160) may perform data transmission/reception in communication between the electronic device 201 (e.g., the electronic device 21) and other electronic devices (e.g., the electronic device 24 or the server 26) connected via a network. According to an embodiment of the present disclosure, the communication module 220 may include a cellular module 221, a Wi-Fi module 223, a BT module 225, a GPS module 227, an NFC module 228, and a radio frequency (RF) module 229.

The cellular module 221 may provide voice communication, image communication, a short message service, or an Internet service, etc. via a communication network (e.g., LTE, LTE-A, CDMA, WCDMA, UMTS, WiBro, or GSM, etc.). Also, the cellular module 221 may perform discrimination and authentication of an electronic device within a communication network using, for example, a SIM (e.g., a SIM card 224). According to an embodiment of the present disclosure, the cellular module 221 may perform at least a portion of functions that may be provided by the AP 210. For example, the cellular module 221 may perform at least a portion of a multimedia control function.

According to an embodiment of the present disclosure, the cellular module 221 may include a CR Also, the cellular module 221 may be, for example, implemented as an SoC. Though elements such as the cellular module 221 (e.g., a communication processor), the memory 230, or the power management module 295, and the like are illustrated as elements separated from the AP 210 in FIG. 2, according to an embodiment of the present disclosure, the AP 210 may be implemented to include at least a portion (e.g., the cellular module 221) of the above-described elements.

According to an embodiment of the present disclosure, the AP 210 or the cellular module 221 (e.g., a communication processor) may load an instruction or data received from at least one of a non-volatile memory and other elements connected thereto onto a volatile memory, and process the same. Also, the AP 210 or the cellular module 221 may store data received from at least one of other elements or generated by at least one of other elements in a non-volatile memory.

Each of the Wi-Fi module 223, the BT module 225, the GPS module 227, or the NFC module 228 may include, for example, a processor for processing data transmitted/received via a relevant module. Though the cellular module 221, the Wi-Fi module 223, the BT module 225, the GPS module 227, or the NFC module 228 are illustrated as separate blocks in FIG. 2, according to an embodiment of the present disclosure, at least a portion (e.g., two or more elements) of the cellular module 221, the Wi-Fi module 223, the BT module 225, the GPS module 227, or the NFC module 228 may be included in one Integrated Circuit (IC) or an IC package. For example, at least a portion (e.g., a communication processor corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (LNA), and the like, though not shown. Also, the RF module 229 may further include a part for transmitting/receiving an electromagnetic wave on a free space in wireless communication, for example, a conductor or a conducting line, etc. Though FIG. 2 illustrates the cellular module 221, the Wi-Fi module 223, the BT module 225, the GPS module 227, and the NFC module 228 share one RF module 229, at least one of the cellular module 221, the Wi-Fi module 223, the BT module 225, the GPS module 227, or the NFC module 228 may perform transmission/ reception of an RF signal via a separate RF module.

The SIM card 224 may be a card including a SIM, and may be inserted into a slot formed in a specific position of the electronic device. The SIM card 224 may include unique identification information (e.g., integrated circuit card identifier (ICCID)) or subscriber information (e.g., international mobile subscriber identity (IMSI)).

The memory 230 (e.g., the memory 120) may include a built-in memory 232 or an external memory 234. The built-in memory 232 may include, for example, at least one of a volatile memory (e.g., dynamic random access memory (DRAM), static RAM (SRAM), synchronous DRAM (SDRAM)) and a non-volatile memory (e.g., one time programmable read only memory (OTPROM), PROM, erasable and programmable ROM (EPROM), electrically EPROM (EEPROM), mask ROM, flash ROM, not and (NAND) flash memory, not or (NOR) flash memory, etc.).

According to an embodiment of the present disclosure, the built-in memory 232 may be a solid state drive (SSD). The external memory 234 may further include a flash drive, for example, compact flash (CF), secure digital (SD), micro-SD, mini-SD, extreme digital (xD), or a memory stick. The external memory 234 may be functionally connected with the electronic device 201 via various interfaces. According to an embodiment of the present disclosure, the electronic device 201 may further include a storage device (or a storage medium) such as a hard drive.

The sensor module 240 may measure a physical quantity or detect an operation state of the electronic device 201, and convert the measured or detected information to an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, blue (RGB) sensor), a living body sensor 240I, a temperature/humidity sensor 240J, an illuminance sensor 240K, or an ultra violet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 240 may further include a control circuit for controlling at least one sensor belonging thereto.

The input unit 250 may include a touch panel 252, a (digital) pen sensor 254, a key 256, or an ultrasonic input unit 258. The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone (e.g., a microphone 288) in the electronic device 201 via an input tool generating an ultrasonic signal, and enables wireless recognition. According to an embodiment of the present disclosure, the electronic device 201 may receive a user input from an external device (e.g., a computer or a server) connected to the communication module 220 using the communication module 220.

The display 260 (e.g., the display 150) may include a panel 262, a hologram device 264, or a projector 266. The panel 262 may be, for example, a liquid crystal display (LCD), or an active-matrix organic light-emitting diode (AM-OLED), etc. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included, for example, in the communication interface 160 illustrated in FIG. 1. Additionally or alternatively, the interface 270 may include, for example, a mobile high-definition link (MHL) interface, an SD card/multi-media card (MMC) interface, or an infrared data association (IrDA) standard interface.

The audio module 280 may convert a sound and an electric signal in dual directions. At least a partial element of the audio module 280 may be included, for example, in the I/O interface 140 illustrated in FIG. 1. The audio module 280 may process sound information input or output via, for example, a speaker 282, a receiver 284, an earphone 286, or a microphone 288, and the like.

The camera module 291 is a device that may shoot a still image and a moving picture. According to an embodiment of the present disclosure, the camera module 291 may include one or more image sensors (e.g., a front sensor or a rear sensor), a lens (not shown), an image signal processor (ISP) (not shown), or a flash (not shown) (e.g., an LED or xenon lamp).

The power management module 295 may manage power of the electronic device 201. Though not shown, the power management module 295 may include, for example, a power management integrated circuit (PMIC), a charger IC, or a battery or a battery or fuel gauge.

The PMIC may be mounted, for example, inside an IC or an SoC semiconductor. A charging method may be classified into a wired charging method and a wireless charging method. The charging IC may charge a battery and prevent introduction of an overvoltage or an overcurrent from a charger. According to an embodiment of the present disclosure, the charging IC may include a charging IC for at least one of the wired charging method and the wireless charging method. The wireless charging method may be, for example, a magnetic resonance method, a magnetic induction method, or an electromagnetic wave method, and the like, and may additionally include an additional circuit for wireless charging, for example, a circuit such as a coil loop, a resonance circuit, or a rectifier, and the like.

The battery gauge may measure, for example, remaining charge of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (e.g., the AP 210), for example, a booting state, a message state, or a charging state, and the like. The motor 298 may convert an electric signal to mechanical vibration. Though not shown, the electronic device 201 may include a processor (e.g., a GPU) for supporting a mobile TV. The processor for supporting the mobile TV may process media data corresponding to standards, for example, such as digital multimedia broadcasting (DMB), digital video broadcasting (DVB), or a media flow, etc.

Figure 3:
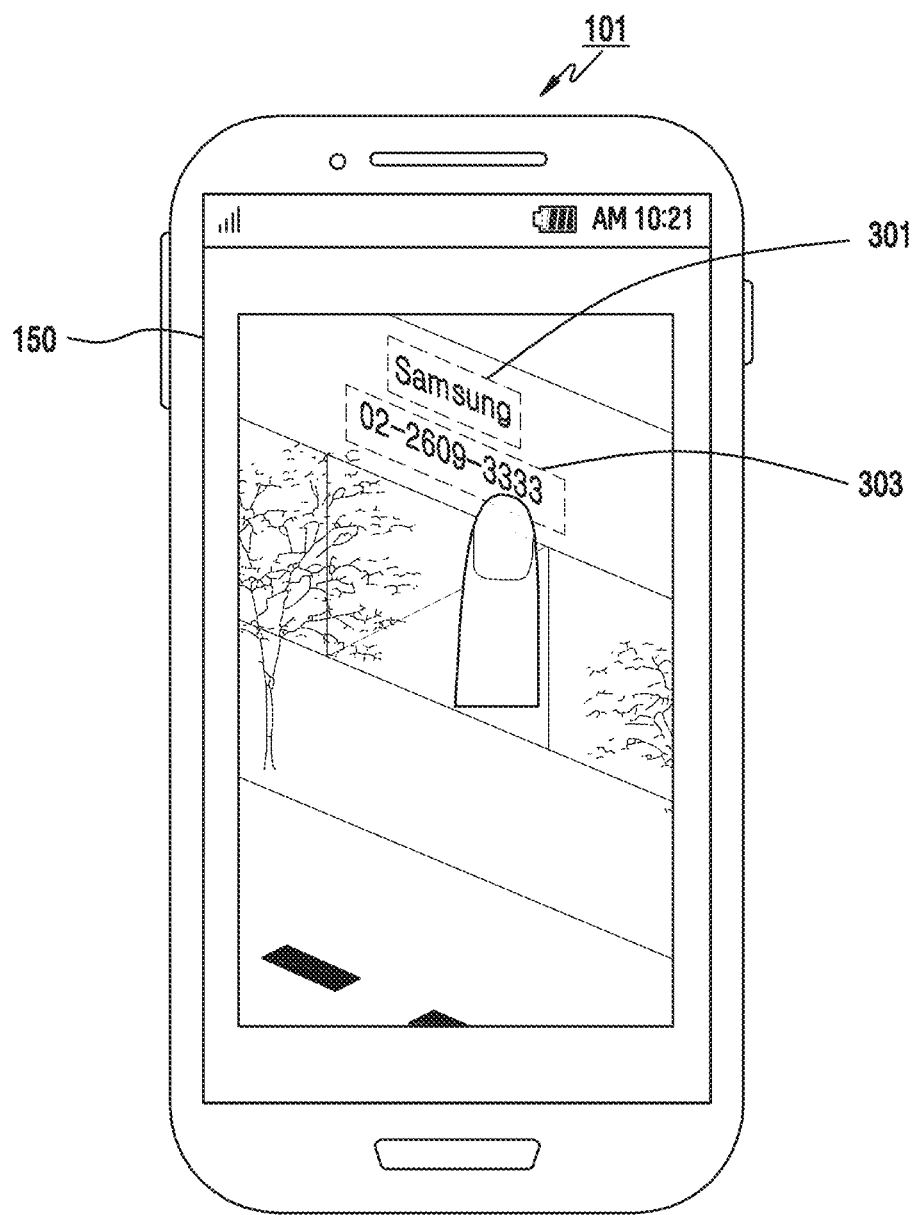
FIG. 3 is a view illustrating that an electronic device acquires and provides predetermined type information included in content according to an embodiment of the present disclosure.

FIG. 3 is a view illustrating acquisition and provision of a predetermined type of information included in content by an electronic device according to an embodiment of the present disclosure.

Referring to FIG. 3, an electronic device 101 may provide various pieces of information to the user based on content displayed on a display. The content may include a predetermined type of data (predetermined data type or predetermined data format). According to an embodiment of the present disclosure, the predetermined type of data (or predetermined data, hereinafter referred to as a character string) may include a contact (e.g., a phone number), an email address, a URL, a number, a character, a character string, a special symbol, and the like, which are included in the content. The electronic device 101 may acquire (or detect) a predetermined type of data included in content by performing an operation of analyzing the content through a program such as an optical character reader (OCR). According to an embodiment of the present disclosure, the electronic device 101 may display at least one content or at least a part of content (e.g., an image) on the display 150. The electronic device 101 may determine data (e.g., a predetermined type of data corresponding to a touch location) of a corresponding touch location based on a user input (e.g., a touch)

detected on the display 150 and may provide at least one predetermined function (e.g., program or application) based on the determined data.

For example, the electronic device 101 may detect a touch action performed at a particular location of the image displayed on the display 150. The electronic device 101 may determine a phone number 303 corresponding to a touch location of the display 150 and perform a function (e.g., a phone call making function) predetermined to be executed by the electronic device 101 based on the phone number 303. Alternatively, when the electronic device 101 can perform two or more functions based on the phone number 303 (e.g., the phone call making function and a message sending function), the electronic device 101 may perform one or more predetermined functions or provide information on the two or more functions to the user (e.g., display the information on the display 150 or output the information through a sound). The electronic device 101 may perform one or more functions (e.g., one or more of the phone call making function or the message sending function) based on the phone number 303 selected on the display 150, or use other information (e.g., Samsung 301) included in the image displayed on the display 150 together with the phone number 303 when providing information to allow the user to select the one or more functions).

According to an embodiment of the present disclosure, an analysis operation may refer to a process for finding a predetermined type of data (or a data format) included in the content output by the first program. The electronic device 101 may identify what data formats exist on the content currently output by the first program and whether a particular type of data (or a particular data format, hereinafter referred to as particular data), which can be configured (or has been configured) to execute the second program, exists in the data formats. The electronic device 101 may detect all data formats included in the currently output content, and detect particular data which can execute the second program in all the data formats. In order to determine the particular data, the electronic device 101 may identify detailed information of the particular data, analyze the type of the information, and determine the particular data based on a result of the analysis. For example, when the electronic device 101 receives a message from a counterpart (e.g., a counterpart electronic device, another electronic device, or an electronic device 102), a message app (or program) may output the received message for the user. When the message includes a "simple character string", a "phone number", a "URL", and a "number", the content currently output through the analysis operation may include data formats such as the "simple character string", "phone number", "URL", and "number". When the second program associated with the data formats such as the "phone number" and the "URL" is predetermined, the "phone number" and the "URL" may be identified as the particular data. As described above, the term "analysis" may be used for the process for identifying the particular data existing in the content. The electronic device 101 does not need to distinguish particular data after distinguishing all data formats during a process for identifying the particular data in content, and simultaneously distinguishes the data format and particular data through simultaneous recognition thereof, or may output the data format already distinguished at a time point of outputting the content.

According to an embodiment of the present disclosure, another operation included in the analysis is to prepare a following operation after the types of particular data in the currently output content are identified. A basic operation of the analysis may be an operation for identifying which types of particular data exist in the content or may include a preparation operation for executing the second program connected to the identified particular data. For example, the content, which is output to the display 150 through an Internet browser, may include various types of character strings and image information, and may include a phone number, an email address, and another URL. The electronic device 101 may perform a basic operation corresponding to an operation for preparing the executable second program connected to particular data selected by the user or extracting information corresponding to the selected particular data. According to an embodiment of the present disclosure, when a message received from another electronic device includes a URL such as "http://test.com" and the user selects the URL, if the Internet browser is required to be executed, an operation for identifying particular data of the URL from the message and then identifying which second program is associated with the corresponding particular data may be needed. Further, when the user designates "http://test.com" in the message, the electronic device 101 should transmit detailed content of the URL such as "http://test.com" designated by the user to the Internet browser, a preparation operation for extracting information of "http://test.com" which should be transmitted to the Internet browser and transmitting the extracted information to the Internet browser may be performed. The electronic device 101 may identify particular data in the first program, and insert the preparation operation of the executable second program and/or the preparation operation for transmitting detailed information corresponding to the particular data to the second program in the analysis operation.

The detailed information corresponding to the particular data of the first program to be transmitted to the second program may be directly extracted and/or stored by the first program, or extracted and/or stored by a medium program (e.g., the link program 135) between the first program and the second program. In addition, the detailed information may be extracted by the second program and stored before the second program is executed. As described above, in order to extract and store detailed information of the particular data, the first program, the second program, and the medium program of the electronic device 101 may manage a database, a file, or a directory that store data separately, partially in common, or fully in common, or a storage space that may store identically thereto.

When the analysis operation is completed, the electronic device 101 may identify which type of particular data exists in the currently output content, and identify detailed information corresponding to the particular data. For example, when the user executes a note pad program and inputs a character string such as "test@test.com", the electronic device 101 may determine that the character string "test@test.com" corresponds to particular data of an "email address" through the analysis operation.

The electronic device 101 may explicitly inform the user which data form corresponds to the particular data in the content currently output to the display 150 through a method such as a particular indication or a particular sound output. According to an embodiment, when particular data of the email address "test@test.com" is identified in the note pad program, the electronic device 101 may display information of "test@test.com" to be distinguished from surrounding information, so as to allow the user to intuitively understand that the information "test@test.com" is a different type from the surrounding information. For example, the electronic device 101 may underline the information "test@test.com", display the information "test@test.com" with a different color, or make a character font or character size of the information "test@test.com" different. In addition, the electronic device 101 may display the associated second program around the information. In addition, the electronic device 101 may apply various methods for indicating that the information is different from surrounding information. The electronic device 101 may apply a different method of performing a display according to particular data (according to a type of a data format). For example, a display method may vary depending on particular data in such a manner that an email address is displayed with a "blue color", a URL is displayed with an underline, and a phone number is displayed with a red color. As described above, an operation for differently displaying particular data recognized in outputting content to be distinguished from each other may be expressed using the term "marking". However, the marking operation is not a necessary operation, and it is apparent that particular data may be output on the display 150 without a separate marking indication although the particular data is recognized.

Figure 4:
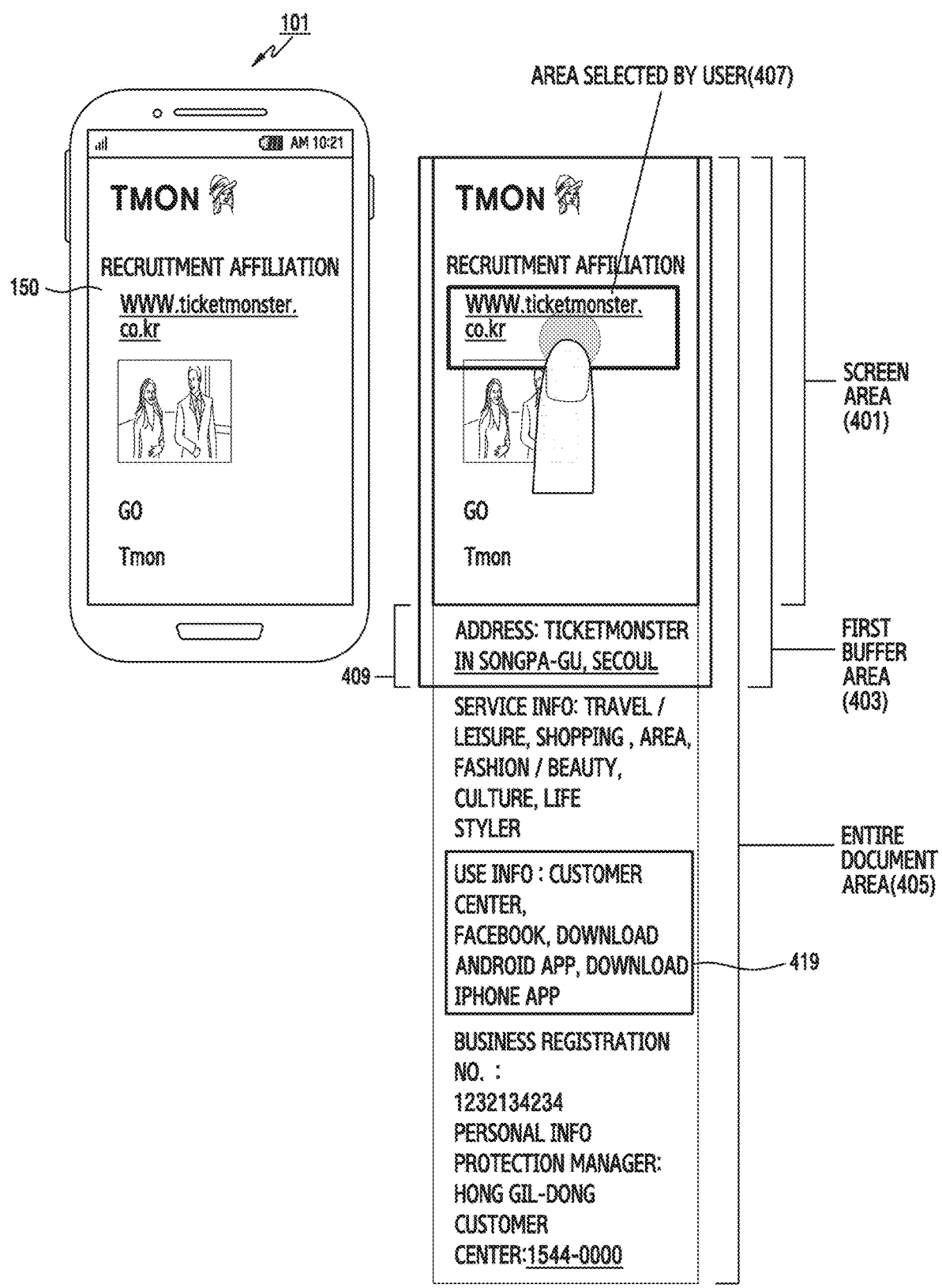
FIG. 4 illustrates an operation in which an electronic device analyzes content displayed on the display according to an embodiment of the present disclosure.

FIG. 4 illustrates an operation in which the electronic device analyzes content displayed on a display according to an embodiment of the present disclosure.

Referring to FIG. 4, according to an embodiment of the present disclosure, the electronic device 101 may perform an operation for analyzing content displayed on the display 150 or content configured to be displayed on the display 150. The electronic device 101 may detect at least one data format included in content by analyzing the content and may determine a predetermined type of particular data to be connected to at least one function of the electronic device 101.

According to an embodiment of the present disclosure, the electronic device 101 may classify the analysis operation for distinguishing particular data included in content according to a time point when the analysis operation is performed into a case where the analysis is completed before the corresponding content is output on the screen and a case where the analysis is performed after the content is output. The phrase "after the content is output" may mean a state after all of the content is output, or some of the content or some of the particular data existing in the content are output. For example, when the electronic device 101 outputs a webpage (or a website) through an Internet browser (e.g., the first program), information on a phone number, an email address, an image, and a 3D printer drawing may be located at one screen displayed on the display 150. Before all of the information has been output on the screen, information such as "before content is output on the screen" may be displayed. When some of the webpage is output on the screen (i.e., when only the phone number and the email address are output), information such as "after output or being output" may be displayed for the phone number and the email address, and information such as "before output" may be displayed for the image and the 3D printer figure, which have been not yet output.

According to an embodiment of the present disclosure, before outputting content or some of the content on the display 150 by the first program, the electronic device 101 may analyze data formats such as a character string, an image, a moving image, a voice file, a phone number, an address, a URL, and a 3D printer figure included in the corresponding content or some of the content, so as to detect what particular data is included in the content. For example, when the electronic device 101 accesses a particular site through an Internet browser and receives content to be shown on an Internet browser screen from the corresponding site, the electronic device 101 may analyze in advance which particular data exist in the corresponding content before outputting the content received through the Internet browser on the display 150. When the analysis is completed and the electronic device 101 determines whether the particular data exists, the electronic device 101 may output the content or some of the content for which the analysis is completed on the display 150. Since the electronic device 101 has already analyzed the content to identify particular data included in the corresponding content before outputting the content on the display 150, an additional analysis operation is not required after or during the output, and may be performed based on a user's selection or a preset period.

For example, in the analysis of the content displayed on the display 150, when it is determined that the content is displayed on the display 150 by the user, the electronic device 101 may perform the analysis operation for an entire area 405 of the content as well as a screen display area 401 of the content displayed on the display 150. The electronic device 101 may display the content (e.g., a different area from the entire area of the content such as the screen display area 401 or a first buffer area 403 according to a user input) on the display 150 after completing the analysis operation. The electronic device 101 may determine particular data corresponding to a location touched based on a user input (e.g., a touch) detected on the display 150. When displaying an image 419 included in the content on the display 150, the electronic device 101 may analyze the image 419 at a time point when the content are analyzed before the screen display area 401 is displayed, so as to detect one or more particular data. The electronic device 101 may display the image 419 while one or more particular data included in the image 419 are detected at a time point when the image 419 is displayed. When the electronic device 101 detects selection of particular data, such as an Android app download in the image 419, based on a user input, the electronic device 101 may link to a corresponding Android app download page. Similarly, when the electronic device 101 detects selection of an iPhone app download in the image 419, the electronic device 101 may link to a corresponding iPhone app download page.

According to an embodiment of the present disclosure, when analyzing the content displayed on the display 150, the electronic device 101 may analyze content corresponding to the screen display area 401 determined to be displayed on the display 150 and display the content on the display 150. The electronic device 101 may determine some of the areas having a range predetermined to display another area of the content other than the screen display area 401 displayed on the display 150. The electronic device 101 may analyze some of the areas of the content determined to be displayed. When the electronic device 101 completes analysis of the determined areas, the electronic device 101 may display the areas on the display 150. For example, in the operation of analyzing the determined areas, the areas may be content including uniformly divided areas like pages, and the electronic device 101 may analyze the content in the unit of pages based on a user input and display the content on the display 150.

According to an embodiment of the present disclosure, when analyzing the content displayed on the display 150, the electronic device 101 may analyze content corresponding to the screen display area 401 determined to be displayed on the display 150 and display the content on the display 150. The electronic device 101 may perform an operation for analyzing a predetermined area 409 after the screen display area 401 displayed on the display 150 based on a user input. For example, a user input detected by the electronic device 101 may be an action of scrolling the display 150 (e.g., scrolling). The electronic device 101 may determine a range of the predetermined area 409 based on a strength (e.g., a scrolling speed) of the user input detected on the display 150. When the electronic device 101 detects a scrolling input having a strength higher than or equal to a predetermined strength through the display 150, the electronic device 101 may perform the analysis operation for areas after the predetermined area 409 without performing the analysis operation for the predetermined area 409. When determining the range of the predetermined area 409 for which the analysis operation has not been performed, the electronic device 101 may determine the range based on the strength of the scrolling input detected on the display 150.

According to an embodiment of the present disclosure, the electronic device 101 may perform the analysis operation for distinguishing particular data included in the content while or after the corresponding content is output. The analysis about whether particular data exists in the corresponding content is not performed before the content is output on the display 150. Instead, the analysis is performed after the content is output. For example, when the electronic device 101 accesses a particular webpage through an Internet browser and receives content to be shown on an Internet browser screen through the display 150 from the corresponding webpage, the electronic device 101 may output the content on the display 150 to allow the user to immediately identify information contained in the webpage without performing the analysis operation for the corresponding content, and may perform the analysis operation for the corresponding content after the content are completely output on the screen. When the analysis is completed, the electronic device 101 may explicitly mark which particular data exists in the corresponding webpage for the user as necessary. When information contained in the content is output on the display 150, the electronic device 101 does not automatically start the analysis, and, when a particular event is generated after the content are output, the electronic device 101 may perform the analysis operation in response to the event.

According to an embodiment of the present disclosure, the electronic device 101 may request a particular event for starting the analysis operation in order to start particular data analysis after the content is output on the display 150. For example, when the webpage is output on the display 150 through the Internet browser screen, the electronic device 101 may perform the analysis operation if an event of "output completion" is detected. The event "output completion" may be generated in various cases. According to an embodiment of the present disclosure, the event "output completion" may be generated when the content selected by the user are completely output on the display 150. In this case, information contained in the content may be smaller or equal to the screen size of the display 150. After the content is output, the electronic device 101 may detect the generated event "output completion".

According to an embodiment of the present disclosure, the content to be output may be larger than the size of the display 150 of the electronic device 101. The electronic device 101 may detect the event "output completion", which is generated when the content in a range predetermined to be displayed on the display 150 among the selected content are completely displayed. When the content in the range predetermined to be displayed on the display 150 of the electronic device 101 are completely output even though the remaining content is not output, it is considered that the output is completed based on the screen area of the display 150 of the electronic device 101, so that the event "output completion" may be generated.

According to an embodiment of the present disclosure, the electronic device 101 may detect an event of "output completion" generated when all content is ready to be output as well as the event "output completion" generated based on the screen size of the display 150. In a state where some areas of all the content are output on the display 150 and the remaining screens, which have not been output, are completely prepared to be output next time (e.g., where the content are prepared as images suitable for a form of the display 150 in a graphic buffer), an event of "screen output" may be generated.

According to an embodiment of the present disclosure, the electronic device 101 may detect an event that is generated when a particular area of the content output on the display 150 is designated in various methods. According to an embodiment of the present disclosure, the event may be an event such as selection through a touch on the display 150 of the electronic device 101 or selection of a range through a drag. Unlike the aforementioned event "output completion", the electronic device 101 may not perform the analysis operation after the output on the display 150 is completed, and may perform the analysis operation in response to an event detected at a predetermined time point. Accordingly, the electronic device 101 may perform the analysis operation according to a particular event input into the currently output content, determine particular data included in the corresponding content based on a result of the analysis, and extract information corresponding to the particular data.

According to an embodiment of a "particular event applied at a predetermined time after the content is output", the electronic device 101 may detect an operation for designating (e.g., selecting) a part requiring the analysis in the content. For example, the electronic device 101 may detect an operation for selecting some areas which the user desires to identify in the content output on the display 150 through a user's finger or an input means (or a pointing device) such as a pen, a mouse, or the like. When the selection is completed, the electronic device 101 may recognize "selection completion" as an event and analyze a character string (or number, character, symbol, etc.) of the areas selected by the user, so as to perform an analysis operation for determining particular data corresponding to the corresponding character string and determining related detailed information.

The "selection completion" may be explicitly designated based on a user input to process a separate command or may be generated after it is automatically determined whether selection is completed through analysis of a system input event. When the touch action is detected through the input means (e.g., finger or touch pen), the electronic device 101 may determine that the "selection" for a particular area is "completed" at each moment when the particular area of the display 150 is touched or the finger is removed from the particular area after the touch, and the event "selection completion" may be generated at each moment according to a predefined method. The event generation is not limited to the user input of touching the display 150, and an event identical or similar to the event may be generated through an input device such as a keypad or a mouse. Further, the event "selection completion" may be generated in a driver end of the system included in the electronic device 101 or generated through a combination of states in higher layers thereof. When the electronic device 101 designates a particular area based on a user input and starts an analysis operation of output content through the particular area, the electronic device 101 may perform the analysis operation only for the area selected by the user or may analyze in advance character string or multimedia content of the remaining content other than the area designated by the user to distinguish particular data.

According to an embodiment of a "particular event applied at a predetermined time point after the content are output", the event may be an event informing that a new content area appears by scrolling the content on the display 150 of the electronic device 101 or the content reaches the end of the display 150. When it is difficult to output all the content on one screen due to a large amount of information contained in the content, the electronic device 101 may output, on the display 150, some of the content corresponding to parts which can be currently output on the screen of the display 150. In this case, the user may move the content within the display 150 in order to view the remaining areas of the content, and the electronic device 101 may scroll up or scroll down the content displayed on the display 150 through a user input (e.g., a touch or drag) detected through the display 150 by using a pointing device such as a finger or a pen or may enlarge, reduce, or move the screen. Such an event may be processed as a "particular event applied at a predetermined time point after the content is output".

The electronic device 101 may newly output the part, which has not been shown on the screen, on the display 150 by each event, determine the event as an event applied to the content, and analyze a character string or multimedia content in the newly appearing part, so as to identify particular data suitable for the corresponding character string or multimedia content. For example, in order to raise the content currently output on the screen of the display 150 to the uppermost part or lower the content to the bottommost part, the electronic device 101 may detect a user input for fast scroll up or scroll down or screen movement. At this time, the electronic device 101 may perform an analysis operation for new content areas, which have not been previously shown on the screen, by respective event.

According to an embodiment of the present disclosure, one of the problems, which should be considered when an event related to the screen movement is processed, is a screen movement speed. Since the analysis operation of each screen may correspond to an additional operation for the newly appearing screen, a screen output speed may be delayed due to the analysis operation. In this case, users may feel inconvenience. Accordingly, when the screen output is performed at a particular speed or faster, the electronic device 101 may stop the analysis for the character string or the multimedia content while the scrolling action is made. After the screen output is completed, the electronic device 101 may make a maximum delay for performing the analysis operation to process the fast screen output and may perform the analysis operation only for the content shown on the screen at a time point when the scrolling stops. In this case, an event applied to start the analysis operation for the content may be a "scrolling stop". The "scrolling stop" may be generated when the content reaches the uppermost or bottommost of the display screen or generated when the scrolling operation stops by a user input or automatically stops while the screen is scrolled up or down.

Controlling of the screen movement of the content output on the display 150 of the electronic device 101 may use various input methods of switching a current screen to another screen such as a keyboard, a keypad, a screen tilt, and a voice input as well as the aforementioned user's finger or pointing device. The electronic device 101 may perform an operation similar to scrolling the screen through the keyboard or a direction key, a page down key, or a page up key of the keypad, generate a screen movement event by tilting or making the electronic device 101 stand, and perform the screen movement through the voice input. The electronic device 101 may determine an event according to each of the aforementioned input methods as an "event applied to the content" according to an actual implementation.

According to an embodiment of a "particular event applied at a predetermined time point after the content is output", the event may be determined through a device (e.g., the electronic device 101) immersion according to a user's state. The device immersion refers to whether the user requires an immediate response from the electronic device 101 and may be determined by detecting a user's state. According to an embodiment of the present disclosure, when the electronic device 101 performs an Internet search through a browser based on a user input, a loading time of the accessed webpage may be required. The time may be a time during when the electronic device 101 downloads the webpage from a web server and a time during which the electronic device 101 outputs the downloaded webpage in the browser. Due to the time for downloading the webpage, outputting the webpage in the browser may take more time than outputting a document stored in the electronic device 101 on the screen. Accordingly, the electronic device 101 may perform an operation for reducing the time for outputting the webpage in the browser as much as possible.

For example, when the electronic device 101 analyzes particular data from the webpage while outputting the webpage, the time for outputting the webpage may be longer, so that the electronic device 101 may perform the analysis after the output of the webpage is finished. However, if the user is not sensitive to the immediate output of the webpage when using the browser, the electronic device 101 may perform the analysis of the webpage before outputting the webpage or while outputting the webpage. According to an embodiment of a method of determining whether the user is sensitive to the output (i.e., determining the device immersion of the user), the electronic device 101 may determine the device immersion by detecting a user's sight when the webpage is loaded. For example, when the electronic device 101 detects the user's sight and determines that the user views a location other than the display 150 of the electronic device 101, the electronic device 101 may determine that the user performs a different operation other than the use of the electronic device 101 without waiting for the loading of the webpage and thus determine that the device immersion is low.

According to an embodiment of the "particular event applied at the predetermined time after the content is output", the event may be generated by a timer. When the electronic device 101 analyzes particular data of the content before the content is output on the display 150 or while the content is output on the display 150, the time for outputting the content becomes longer. Further, when the electronic device 101 analyzes the particular data of the content after outputting the content on the display 150, an analysis operation based on a user's scrolling operation and the scrolling operation may be simultaneously processed immediately after the content are output on the display 150, so that the scrolling operation may be unnatural. Accordingly, the electronic device 101 may perform the analysis after a time configured based on a preset timer value according to a user's use pattern passes. Further, the electronic device 101 may flexibly re-configure the timer value by analyzing the user's use pattern without following the timer value directly configured by the user.

Further, an event for starting the analysis generated in the aforementioned embodiments may be generated again when the electronic device 101 outputs a part to be newly analyzed due to a movement of content displayed on the display 150 of the electronic device 101. When the electronic device 101 identifies an area to be newly analyzed after the event for starting the analysis in one content has been already generated by the operation of a flag, the electronic device 101 may perform the analysis without waiting for an additional analysis starting event.

Figure 5:
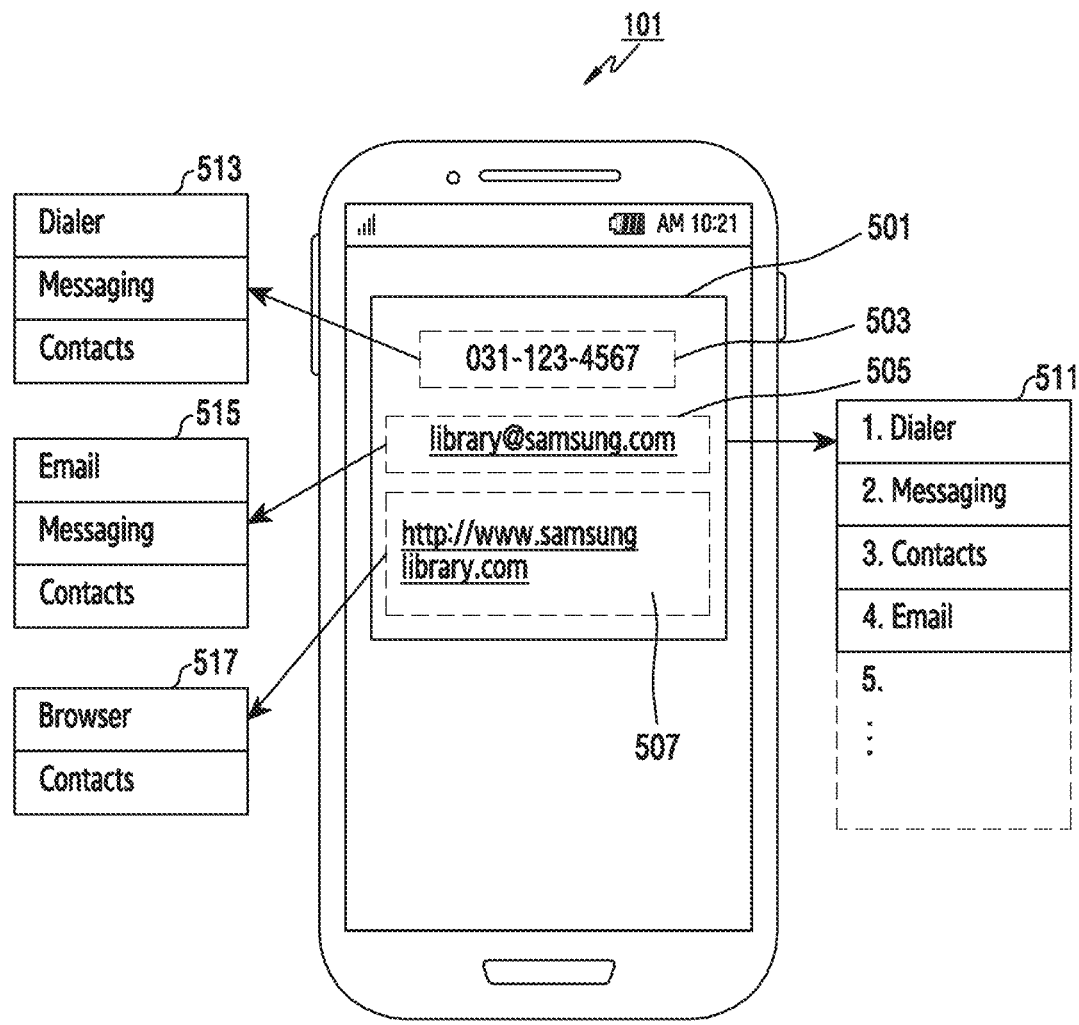
FIG. 5 is a view in which an electronic device determines at least one operation performed based on particular data included in content according to an embodiment of the present disclosure.

FIG. 5 is a view for determining at least one operation performed based on particular data included in content by an electronic device according to an embodiment of the present disclosure.

Referring to FIG. 5, according to an embodiment of the present disclosure, the electronic device 101 may perform an operation for analyzing content displayed on the display 150 or configured to be displayed on the display 150, so as to detect various types of data formats included in the content and determine particular data in the detected various data format. The electronic device 101 may determine at least one function of the electronic device 101 which can be performed in accordance with particular data. The function of the electronic device 101 may be execution of a program (or application) for processing particular data or an operation of a sensor for processing particular data. Alternatively, the function may be an operation of the electronic device 101 which can be executed based on particular data as input data. For example, when determining particular data based on various types of data formats included in the content, the electronic device 101 may determine data which meets a predetermined format as the particular data of the corresponding format according to configuration information based on composition, arrangement, or pattern of the data. For example, the electronic device 101 may determine first particular data 503 as a phone number based on a data format. The electronic device 101 may determine a call connecting function, a message sending function, a contact searching function, and/or a contact storing function as one or more functions of the electronic device 101 which can process a phone number. Further, the electronic device 101 may determine second particular data 505 as an email address based on a data format. The electronic device 101 may determine an email sending function, a message sending function, a contact searching function, and/or a contact storing function as one or more functions of the electronic device 101 which can process an email address. Further, the electronic device 101 may determine third particular data 507 as a URL based on a data format. The electronic device 101 may determine a browser executing function, a contact searching function, and/or a contact storing function as one or more functions of the electronic device 101 which can process a URL. Some or all of particular data may constitute a particular data list 501, and the electronic device 101 may display the particular data list 501 on the display 150.

According to an embodiment of the present disclosure, the electronic device 101 provides the user with one or more functions, which can be processed by the electronic device (e.g., display the functions on the display 150), based on one or more particular data selected from the list 501 displayed on the display 150 and perform predetermined functions based on configuration information. According to an embodiment of the present disclosure, when the first particular data 503 is selected from the particular data list 501, the electronic device 101 may display the call connecting function, the message sending function, the contact searching function, and/or the contact storing function of the electronic device 101 determined based on the phone number on the display 150 as a first available list 513. According to an embodiment of the present disclosure, the electronic device 101 may configure a predetermined function (e.g., the call connecting function) based on the phone number, which is the first particular data 503, as a basic function. When the first particular data 503 is selected, the electronic device 101 may perform the predetermined call connecting function without displaying the first available list 513 in response to the function of processing the phone number. The electronic device 101 may display a second available list 515 or a third available list 517 on the display 150 with respect to the second particular data 505 or the third particular data 507 according to the aforementioned operation, or may perform a predetermined function corresponding to the second particular data 505 or the third particular data 507 based on configuration information.

According to an embodiment of the present disclosure, the present disclosure is not limited to providing each of the available functions (e.g., the first available list 513, the second available list 515, or the third available list 517) with respect to the particular data (e.g., the first particular data 503, the second particular data 505, or the third particular data 507) as described above, the electronic device 101 may provide the available function(s) corresponding to the particular data as one list (e.g., a fourth available list 511). In order to provide available functions corresponding to a plurality of particular data through one list (e.g., the fourth available list 511), the electronic device 101 may determine designated functions displayed in the fourth available list 511 or a list display method such as an order (e.g., priority) for displaying the functions.

According to an embodiment of the present disclosure, the electronic device 101 may determine the functions and/or the list display method of the electronic device 101 corresponding to particular data according to a weighted value assigned to each of the functions. For example, when particular information is selected from content output on the display 150 based on a user input, the electronic device 101 may allow particular data corresponding to the selected information to be linked with at least one second program. According to an embodiment of the present disclosure, when the particular data corresponds to a phone number, the electronic device 101 may determine the related second program as at least one of a dialer app, a messaging app, and an address book. Further, when particular detailed information is not selected based on a user input but some areas of the screen (or content) output on the display 150 are selected, the electronic device 101 may identify that there are a plurality of particular data such as a phone number, an email address, and a URL as well as particular data in the corresponding areas.

In order to provide the user with the second program most suitable for each of the particular data, the electronic device 101 may assign a proper weighted value to each program and sequentially output the second programs based on a result of the calculation thereof. For example, the electronic device 101 may determine the analyzed particular data as a phone number, an email address, or a URL. The electronic device 101 may execute at least one of a dialer app for making a call, a message app for sending a message, and an address book for storing and modifying a phone number when the particular data is a phone number, may execute at least one of the messaging app, an email app for sending email, and an address book for storing and modifying an email address when the particular data is an email address, and may execute at least one of an Internet browser for a web search and an address book for storing and modifying a URL when the particular data is a URL. The electronic device 101 may assign a weighted value to each program by predicting which program will be executed by the user according to each program (or application). Based on the assigned weighted value, the electronic device 101 may add weighted values of the second programs which can be executed using analyzed particular data to calculate a result value such as dialer app:1, messaging app:2, address book:3, email app:1, and Internet browser:1, determine rankings according to the calculated weighted value, and output at least one of the second program list including the address book, the messaging app, and other programs (dialer app, email app, and Internet browser) output on the screen according to a sequence having a highest weighted value. Based on the calculated weighted values, various arrangement references may be applied to the sequences, such that the programs are arranged in an order of the lower weighted value, the program having the highest weighted value may be automatically executed or the program having the lowest weighted value is excluded. When determining the aforementioned display method, the present disclosure is not limited to the fourth available list 511, and it is apparent that the display method can be applied to the available list (e.g., the first available list 513, the second available list 515, or the third available list 517) corresponding to each piece of particular data (e.g., the first particular data 503, the second particular data 505, or the third particular data 507).

According to an embodiment for determining the weighted value according to each program, when costs are generated when the second program is executed, the electronic device 101 may use the second program based on the generated costs. For example, when costs are generated due to the use of a data network when the second programs are executed, the electronic device 101 may configure priorities of the programs using the data network generating the costs to be low. However, when costs are not generated even though the data network is used like a case where Wi-Fi is connected, the priorities of the programs using the data network may not be influenced (e.g., the electronic device 101 may not configure the priorities to be low). Further, when the second programs are executed, the present disclosure is not limited to whether the costs are generated, and the electronic device 101 may configure the priorities to be high or low according to the size of the costs. In addition, the costs generated when the second programs are executed are not limited to money, and various factors such as resources, an execution speed, and a power consumption degree required for executing the second programs may be considered. As another embodiment of the method of determining the output sequence of the second program list which can be executed based on the particular data, a combination of two or more of the methods or the already known methods of the related art may be additionally used, a method of predicting a user's intention described below may be used.

According to an embodiment of the present disclosure, the electronic device 101 may determine the functions and/or the list display method of the electronic device 101 corresponding to particular data by using information on the program executed by the electronic device 101.

According to an embodiment in which the accuracy of the operation for determining a user's intention can be improved, the electronic device 101 may use information on currently executed programs. When the first program is executed, the electronic device 101 may be in a state where a processor of the first program resides in a memory. When the second program is executed in a state where the first program is not terminated, both a first process and a second process may reside in the memory. The electronic device 101 may execute the first program corresponding to the first process in the background and execute the second program corresponding to the second process in the foreground. Completely terminating the first program in the electronic device 101 and not removing the process from the memory may mean that the first program is highly likely to be reused, and accordingly the user may predict an operation to be performed later based on such a premise by using information on programs corresponding to respective processes existing in the memory. For example, the electronic device 101 may recognize particular data such as an address of an Internet browser or a phone number in a state where a navigation program is executed in the background, and may predict that the Internet browser would be used (or would be highly likely) to search for a destination to be input into the navigation program. Similarly, when the electronic device 101 detects selection of particular data such as a phone number of a mobile messenger currently executed in the foreground while executing a dialer app in the background based on a user input, the electronic device 101 may determine (predict) that the second program which the user desires to execute is the dialer app by selecting a phone number. The determined information itself may be used for predicting a user's intention, but also may be used for calculating the weighted values of the executable second programs based on particular data selected by the user in the currently output content as described above. The determination may be made additionally using a combination of two or more of the methods or the already known methods of the related art.

According to an embodiment in which the second program which the user desires to execute can be predicted, a method of reflecting location information of the electronic device 101 may be considered. According to an embodiment of the present disclosure, the electronic device 101 may collect information on a use type (or a motion type) according to a location, store a history of a program which the user frequently uses at a particular location through a process of analyzing a use pattern, and, when the electronic device 101 is placed in a predetermined location, predict the second program which the user desires to execute. According to an embodiment of the present disclosure, the electronic device 101 may acquire a regular behavior pattern having a predetermined level or more based on a use record generated by using the electronic device 101 by users. For example, according to an embodiment for determining the behavior pattern, a worker may have a somewhat regular commuting time or lunch time on weekdays, and a commuting way or route may not be significantly changed. The worker may have a regular pattern such as leaving home at 7 a.m., taking a bus or subway, and arriving in an office at 8 a.m. When the worker moves through the subway, the worker habitually watches mobile TV through a smart phone or reading morning news. If the user's smart phone can analyze the behavior pattern (or a pattern of using the electronic device 101) as described above, the electronic device 101 may predict which program would be highly likely to be executed by the user based on location information of the user (or location information of the electronic device 101) at a particular time. Accordingly, when the user frequently watches mobile TV while moving through the subway between 7 a.m. and 8 a.m. as in the above example, if the user selects any character string through a webpage displayed on the display 150 in the subway at the corresponding time, the electronic device 101 may perform an operation of identifying whether the character string is information related to a TV program, and, when the character string is the information related to the TV program, may link to the mobile TV. Similarly, when the user's smart phone is placed at home, a program such as a browser, a message, or a messenger, which is frequently used at home, is highly likely to be executed. When the electronic device 101 is placed within a car, a program such as navigation or map, which is frequently used in the car, is highly likely to be executed. Accordingly, when the electronic device 101 receives a message related to an address from a counterpart (e.g., a counterpart electronic device or an electronic device 102), the navigation program may be automatically executed.

According to an embodiment for implementing the aforementioned scenario, a method of determining a location of the electronic device 101 may include a method using an identification (ID) code (e.g., a cell ID) of the electronic device 101. When a GPS is used, the location of the electronic device 101 may be determined using GPS location information. Further, when Wi-Fi is used, the electronic device 101 may determine location information of the electronic device 101 through an identification number of an AP connected to the electronic device 101 and location information of the AP. When BT is used, the electronic device 101 may determine a location of the electronic device 101 according to a type of a device paired with the electronic device 101 or a device identification number or through a direct input by the user. In order to determine user intention analysis information based on the determined location information, the electronic device 101 may predict a user's intention by using only the information. However, as described above, the information may be used for calculating the weighted values of the executable second programs based on particular data selected by the user in the currently output content. The determination may be made by additionally using a combination of two or more of the methods or the already known methods of the related art.

According to an embodiment for improving the accuracy of the user's intention, there is a method using a program execution history of the electronic device 101. According to an embodiment of the present disclosure, the electronic device 101 may predict the user's intention based on statistics of the second program which is most frequently executed by the user according to each piece of particular data, and a method of calculating the statistics may use various schemes. According to an embodiment of the present disclosure, the electronic device 101 may predict the second program based on a total number of times by which the second program executed for each piece of particular data is used up to now. For example, when the electronic device 101 has a history in which a dialer app is most frequently executed in response to selection of particular data corresponding to a phone number based on a user input in the first program displayed on the display 150, the electronic device 101 may predict that the user would highly likely execute the dialer app if the phone number is selected in the first program. Further, the electronic device 101 may use a predetermined time window to add the number of executions of each of the second programs executed according to each piece of particular data. For example, the electronic device 101 may track the related second program, which has been most frequently executed in a webpage for one month when a phone number is selected. Although the time window is configured as "one month", a configuration value may increase or decrease and another time window may be used. Unlike this, the present disclosure is not limited to the addition of the number of executions of the related second program. Further, the present disclosure may use information on an average value of the number of executions and/or information on a use time, and may combine two or more of the aforementioned methods depending on the situation. Further, the electronic device 101 may analyze a trend through time series analysis of the statistical values calculated by the aforementioned methods and predict the user's intention by using a result of the analysis. For example, based on an analysis result of information for one month, when the second program, which has been most frequently executed for a phone number is a dialer app, but the use frequency of the dialer app has decreased for two weeks and the number of executions of an address book gradually increases, the electronic device 101 may analyze (or determine) that the address book is more likely to be executed when the user select the phone number.

According to an embodiment of the present disclosure, the aforementioned method may be applied to the same type of second programs. For example, when particular data selected in the first program is an email address, the electronic device 101 may determine an email app as the representative second program using the email address, but the electronic device 101 of the user may have a plurality of email apps. The electronic device 101 may apply the aforementioned method to predict the email app that the user most prefers.

When predicting the user's intention through the program execution history, the electronic device 101 may perform the prediction through analysis of execution correlation between the first program and the second program as well as the method of analyzing statistics related to the number of executions of the previous use history or the time. For example, the electronic device 101 may have a plurality of mobile messengers and email apps such as a mobile messenger A, a mobile messenger B, an email app C, and an email app D which are installed therein. Based an analysis result of the program execution history, when the electronic device 101 receives an email address from a counterpart through the mobile messenger A, the email app D may be frequently executed. When the electronic device 101 receives an email address through the mobile messenger B, the email app C may be frequently executed. The electronic device 101 may determine that the user prefers the email app D with respect to the mobile messenger A and the email app C with respect to the mobile messenger B regardless of the number of executions of the email apps C and D. As described above, the electronic device 101 may predict the user's intention based on the determined information. However, the information may be used for calculating the weighted values of the executable second programs based on particular data selected in the content currently output by the electronic device 101, and the determination may be made additionally using a combination of two or more of the methods or already known methods of the related art.

One of the factors, which should be considered when the second program for particular data selected in the first program is executed, is how much the selection of the second program corresponding to the selected particular data reflects the user's intention. Such a problem may occur when the related second program is automatically executed when the electronic device selects particular data in the first program based on a user input. When the user having received email from a counterpart (counterpart electronic device or electronic device 102) selects a phone number included in the context of the email to add the phone number to an address book, if the electronic device 101 enters a call making mode while a dialer program operates unlike the user's intention, inconvenience may be caused to the user. Accordingly, the electronic device 101 may perform an operation for accurately reflecting the user's intention indicating which operation should be performed for particular data selected by the user in the first program. The electronic device 101 may perform an operation for giving accuracy to the prediction of the user's intention. The accuracy may be classified into "accuracy of program execution" for executing a proper program which the user desires and "accuracy of information" for accurately determining information which the user selects.

According to an embodiment of the present disclosure, a method of analyzing information contained in the content may correspond to a method of analyzing information contained in the content based on the context to increase the analysis accuracy and determine a result which meets the user's demand as well as a character string-based analysis scheme. In the character string-based scheme, if the character string has a particular data format, a link to the corresponding character string may be generated. For example, when a character string of an email address format such as "abc@defg.com" is identified, the electronic device 101 may recognize the corresponding character string as particular data corresponding to email based on delimiters such as "@" and ".". When an email writer or user selects the corresponding information, the electronic device 101 may display the second program such as an email program or an address book, which is related to the email particular data, on the display 150. In this case, the electronic device 101 may additionally perform an operation of allowing the user to select one of a plurality of second programs or an operation of making in advance only the email program unconditionally and fixedly executed with respect to the email particular data, which does not reflect the user's intention at all. In order to compensate for such a problem, a method of performing the analysis based on context may be considered.

According to an embodiment of the present disclosure, the method of performing the analysis based on context may include a method of determining which information is selected by the user and/or which second program is an appropriate second program which the user most desires to execute for corresponding information with reference to context (state or history) of a time point when the first program is used, states of other programs which are simultaneously executed at present, analysis of character strings before and after the information selected based on a user input, and other information related to the selected information. The analysis based on context may be implemented in various ways, and different methods may be applied to find context information specific for each piece of particular data.

According to an embodiment of the present disclosure, in order to acquire accurate information included in a picture found during a webpage search based on a user input, the electronic device 101 may use geo tagging information on the corresponding picture. As described above, the picture (or image) may be recognized as content, and individual information included in the picture may be identified as the particular data. Accordingly, when the electronic device 101 identifies selection of a phone number of a restaurant within a picture based on a user input, the electronic device 101 may extract characters from the picture through an OCR scheme and recognize detailed information of particular data of the phone number based on the extracted characters. However, it is obvious that the extracted information may be different according to a state of the photographed picture or a photographed time. For example, the electronic device 101 may incorrectly recognize an individual number of the phone number like 8 as 3 or 4 as 9 since at least some of the photographed picture is unclear. Further, the phone number may have been changed if the picture had been taken a long time ago. Accordingly, when determining particular data and detailed information after performing the analysis based on the character string simply extracted through the picture, the electronic device 101 may apply a method through which meaningful information related to the corresponding text can be acquired, and may use geo tagging information in a case of the picture according to an embodiment. For example, the electronic device 101 may include a GPS device. In a case of a camera or a smart phone, when a picture is taken, a technology of detecting photographing location through the GPS and adding location information as metadata of the picture and a program for providing various conveniences through the information may be applied.

As described above, when a phone number is selected within the picture based on a user input, the electronic device 101 may search for information on a store or a restaurant located at a place where the picture is taken (or in a predetermined range from a photographing location) by using geo tagging information of the picture, and may compare the corresponding information with the phone number extracted from the picture to determine that information equal or closest to the phone number is information selected by the user. Alternatively, the electronic device 101 may determine the accuracy of the selected information by comparing the information with other pictures taken at the place or around the place and pictures taken by another user, and may reflect a result thereof. The electronic device 101 may receive the location of the store or restaurant positioned in the place where the picture is taken through a database (e.g., the server 106) or may include the location within the electronic device 101. Further, the electronic device 101 may remotely access another electronic device (e.g., the electronic device 102) or the server through a wired or wireless network.

The electronic device 101 may apply a method for increasing the accuracy of the information selected in the first program based on a user input. According to an embodiment of the present disclosure, when information selected in the content output on the display 150 through the first program is grammatically incorrect and thus is not effective, the information may be automatically corrected. In this case, the electronic device 101 may perform a correction process through at least one program included in the electronic device 101 or the server 106 based on a user input, analyze particular data on the corresponding information by converting the information into proper information which the user desires, and execute the second program related thereto. For example, when information such as "Samsung electronics" output in the content of the first program is selected based on a user input, the electronic device 101 may recognize the information as a character string of "Samsung electronics" to make a link to related information or execute the related second program. The electronic device 101 may automatically replace the existing character string with the modified character string and display the modified character string on the display 150, but the electronic device 101 may extract and process only related information based on the modified information without the change in the modified matter. According to an embodiment of the present disclosure, the electronic device 101 may generate additional information by using text similar to the character string included in the content. For example, when a character string "Jomes" is selected in the content, the electronic device 101 may search for the corresponding character string in the address book, also find a contact of "James", which is different from "Jomes" but similar to "Jomes", and generate information. When a contact which the user desires to search for does not exist in the phone address book, the electronic device 101 may search for text having a high similarity with the contact to generate information, and link to the second program related to particular data of the corresponding information.

According to an embodiment of the present disclosure, when text of the content is cut in the middle thereof or omitted, the electronic device 101 may generate additional information by using automatically completed text. For example, when a name of a restaurant is selected in the picture, the electronic device 101 may extract a character string from a selected area through an analysis process by an OCR scheme and determine particular data on related information. When a part of the name of the restaurant is cut in the picture or the name is not accurately identified, the electronic device 101 may complete the name through a correction process (e.g., perform a character string correction). When correcting the character string, the electronic device 101 may search for a selected or input character string in a particular typing error keyword database through at least one program (e.g., the link program 135). When there is the corresponding keyword, the electronic device 101 may know the correct keyword mapping thereto, or search for a character string having a similarity higher than or equal to a predetermined level in a database such as an address book which can be referred to. The electronic device 101 may determine the similarity based on the number of characters. Alternatively, when some of the whole characters match, the electronic device 101 may determine that there is the similarity. The aforementioned correction method may be applied to detailed information selected based on the user input in the content of the first program output by the electronic device 101, but also applied to a case where the electronic device 101 inputs information into the content output through the display 150.

According to an embodiment of the present disclosure which can be used for correcting a character string which is being input or has been input, when a user input is processed through a keyboard layout, the electronic device 101 may correct a character, which the user may usually incorrectly input (or the user incorrectly inputs). The electronic device 101 may analyze a relation between characters having a typing error through histories of a keyboard input pattern of the user. Based on the analysis, when it is determined that a typing error identical or similar to the previously generated typing error is generated, the typing error may be automatically corrected. For example, when the electronic device 101 detects an input of a character string of "Facebook" in the content, the electronic device 101 may determine that "G", which is close to "F" on the keyboard, is incorrectly input and thus "Gacebook" is input into the content, and may determine that the user made a typing error by pressing G instead of F based on a user's past pattern. Accordingly, the electronic device 101 may automatically modify "Gacebook" into "Facebook" or provide an opportunity (or menu) to modify the character string. The electronic device 101 may also apply the aforementioned character string correction method to determine that "Gacebook" is the typing error of "Facebook".

According to an embodiment in which the user's intention can be reflected through the analysis based on context, the electronic device 101 may provide a program about information related to selected information based on a user input. For example, when a character string of "Samsung electronics" is selected in the content output by the first program, the electronic device 101 may determine that information of "Samsung electronics" is not particular data for making a link to the second program, and may determine particular data based on another piece of information related to "Samsung electronics". The electronic device 101 may determine a phone number, a URL, or an email address of a service center related to "Samsung electronics", or information on a location of the service center closest to a current location as particular data. When "Samsung electronics" is selected based on a user input, the electronic device 101 may provide the user with detailed information related thereto and the second program related to the corresponding particular data through various methods. According to an embodiment of the present disclosure, the electronic device 101 may provide the user with latest information on incorrect data included in the content. For example, when the electronic device 101 desires to provide phone number information, location information, or an address of neighboring "Starbucks" to a counterpart (or a counterpart electronic device or the electronic device 102) based on a user input through a mobile messenger, whether the information on the phone number, location information, and address to be transmitted may be provided matches latest information may be provided through a database (e.g., the server 106) located separately from the electronic device or may be included in the electronic device 101. Further, the electronic device 101 may remotely access a second device or the server 106 through a wired or wireless network.

According to an embodiment of the present disclosure which can improve the accuracy of the user's intention, the electronic device 101 may predict the user's intention by analyzing information indicating a type in which the user grasps the electronic device 101. The electronic device 101 may apply a characteristic making the type in which the user grasps the electronic device 101 with his/her hand different according to a program which the user currently uses. For example, when the user of the electronic device 101 is chatting with a counterpart (e.g., the electronic device 102) through a mobile messenger, the electronic device 101 may detect a state where the user holds the electronic device 101 with both hands and inputs a character string. Further, when an Internet browser is used, the electronic device 101 may detect a user input in a state where the user grasps the electronic device 101 with one hand. Based the reflection of the aforementioned characteristic in the prediction of the user's intention, when the user searches for a webpage and selects particular data such as a phone number while grasping the electronic device 101 with one hand, the electronic device 101 may determine that a dialer program or an address book program, which is the second program executable in the state where the electronic device is grasped with one hand, is highly likely to be executed. When the user selects particular data such as the phone number while grasping the electronic device 101 with both hands, the electronic device 101 may determine that the user has a greater intention to use a mobile messenger or a messaging program rather than the dialer program.

When determining a grasp type of the electronic device 101 by the user, the electronic device 101 may apply a more precise determination method as well as the method of determining whether the electronic device 101 is grasped with one hand or both hands. For example, the electronic device 101 may be grasped by the user with one hand and may detect another touch input while there is no change in the position of a finger or palm. At this time it may be determined that the input is performed by the other hand while the electronic device 101 is grasped with one hand and execution of a program such as the Internet browser may be predicted. The electronic device 101 may use at least one sensor included in the electronic device 101 to more precisely determine the grasp position (or state). For example, when the user grasps the electronic device 101, the electronic device 101 may use a grip sensor to detect where the user's hand is placed on the electronic device 101 (i.e., to detect a location where the user's hand grasps the electronic device), may recognize a finger making an input on the screen of the display 150 through a touch sensor, and may finally determine an accurate grasp position (or state) of the electronic device 101 by the user through a combination of pieces of information input from the sensors. In addition, the electronic device 101 may predict a more detailed grasp position (or state) of the electronic device by additionally using other sensors. The determined information itself may be used for predicting the user's intention, but also may be used for calculating the weighted values of the executable second programs based on particular data selected by the user in the currently output content as described above.

Figure 6:
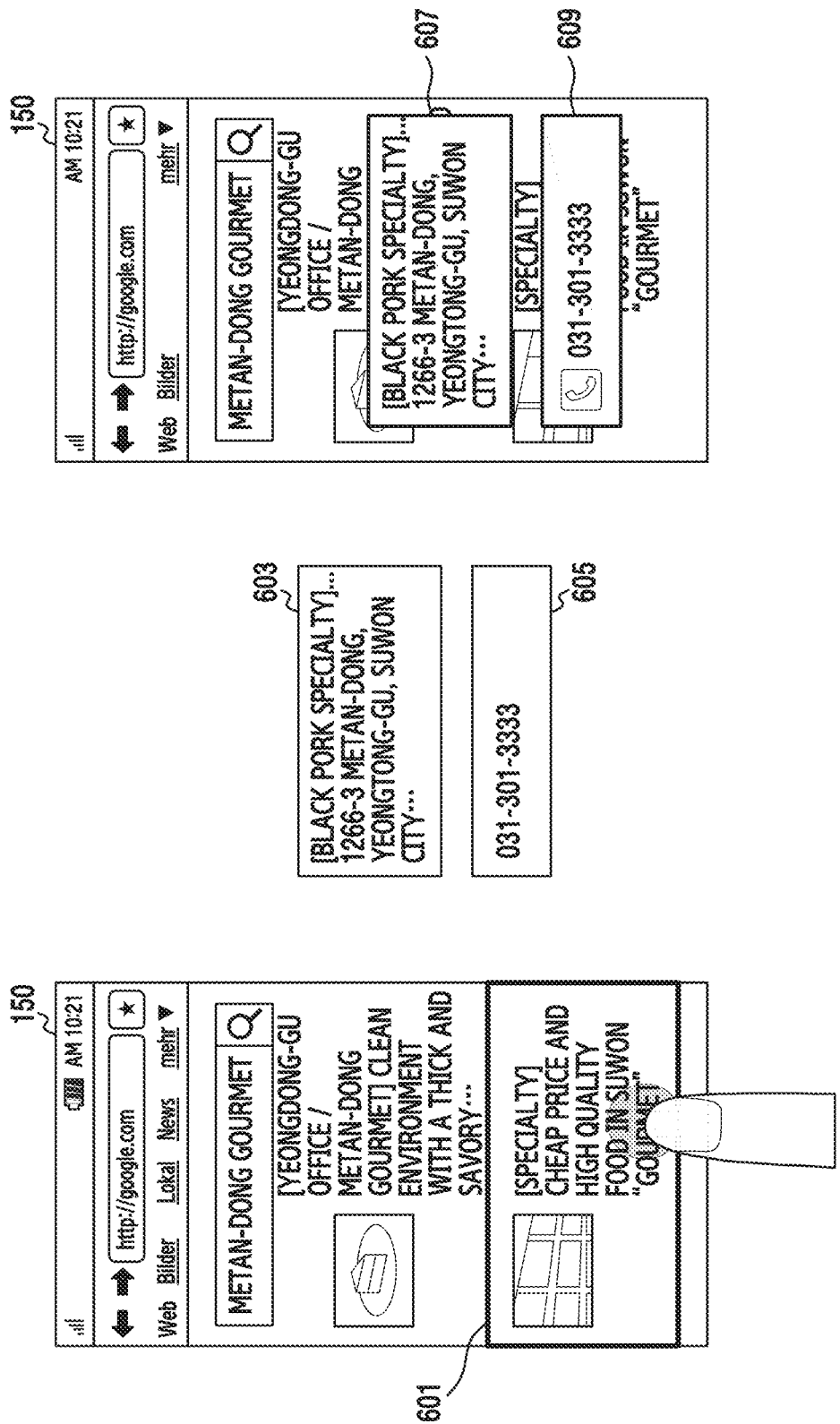
FIG. 6 illustrates an operation in which an electronic device analyzes content displayed on a display according to an embodiment of the present disclosure.

FIG. 6 illustrates an operation in which an electronic device analyzes content displayed on a display according to an embodiment of the present disclosure.

Referring to FIG. 6, according to an embodiment of the present disclosure, the electronic device 101 may analyze the content displayed on the display 150 based on a user input, and acquire at least one piece of particular data displayed in the content. The electronic device 101 may display the content or some of the content in a range of the screen of the display 150, and detect a selection of particular data of the content based on an input of particular information through a pointing device or a finger. When displaying some of the content, which are not output on the screen of the display 150, the electronic device 101 may move the content output on the display 150 to an area of the content which the user desires based on a user input (e.g., a touch or drag through an input means such as a finger or a touch pen on the display 150).

The electronic device 101 may output a predetermined area on the screen of the display 150 based on a user input and detect selection of another piece of information within the output area. For example, when the electronic device 101 displays a webpage on the display 150 through an Internet browser, the webpage may include address information on a place in which the user is currently interested in the form of a character string. Further, some areas of the webpage may include a picture (or image), and the picture may include a photographed store name or phone number of a restaurant which the user desires to identify. The electronic device 101 may detect a user input for selecting address information in a character string area of the webpage (e.g., content) output by the Internet browser (e.g., first program) or detect a user input for selecting a location where information on the phone number or store name is displayed in the picture area. In cases where the area selected by the user is the character string area and the picture, characters of selected targets to be analyzed may be different and analysis methods may be also different. In a case of the character string, the electronic device 101 may directly extract character string information through character string parsing in the selected area. However, in a case of the image area, the electronic device 101 may use an additional character string extraction scheme such as an OCR scheme through image analysis. Accordingly, the electronic device may 101 determine the target to be analyzed to analyze particular data with respect to the information selected by the user in the content output by the first program, and, only when a type of the target selected according to a location of the information selected in the content based on a user input is selected, may classify data formats of detailed information included in the target and determine whether each data format corresponds to particular data.

When the currently output whole content are divided into a character string area and a multimedia area, the electronic device 101 may perform an analysis process for the character string in the character string area, perform an analysis process in the multimedia area according to the multimedia type (i.e., the content type such as an image, a picture, a moving image, or a sound source), and generate information on the related second programs according to a result of the performance of the analysis processes. A module (e.g., a program or application) performing the analysis may be included in each of related programs, or may exist as a separate program therefrom. For example, when the module is configured as a separate program, in order to call the module for performing the analysis process of the first program or the second program, the electronic device 101 may call an API related thereto. Alternatively, the analysis module may independently operate even though there is no direct call corresponding to the first program or the second program.

The electronic device 101 may analyze the character string in partial or entire areas output on the screen of the display 150. When analyzing the entire or partial character string output in the content, the electronic device 101 may determine a selected location in the content based on a user input. The electronic device 101 may sequentially perform operations of deciding (or determining) an area before/after the selected location, extracting a character string included in the determined area, determining a data format and particular data, and then determining the related second program, but some of the operations may be omitted or sequences thereof may be switched.

When the electronic device 101 determines the character string included in the selected area based on the user input and determines whether the corresponding character string corresponds to particular data, the electronic device 101 may generate a link to detailed information (address information, email address, or phone number) of the second program related to the determined particular data, which is selected by the user, provide a list of the related second programs (e.g., display the list on the display 150), and automatically execute the second program related to the corresponding character string. Further, separately from the second program, which can be executed by the first program for the corresponding particular data, the electronic device 101 may provide a link to the second program which can be executed by the system for the corresponding particular data and may provide a list of the corresponding second program. As a method of selecting a particular area in the content, the electronic device 101 may use a particular touch event such as a touch for a predetermined time or longer (e.g., long press) or use a gesture.

According to an embodiment of the present disclosure, after searching for desired information through an Internet browser corresponding to the first program, the electronic device 101 may generate a particular touch (e.g., long press) event with respect to a found result to designate a particular area. When the electronic device 101 detects an input of long-pressing a part of the character string, the electronic device 101 may perform an operation of separating the areas around the long-pressed area according to a predefined reference area (e.g., areas in the front/rear/left/right of the input coordinate, in the unit of frames including the input coordinate in the content of a hypertext markup language (HTML) type), and may perform an operation of extracting the character string from the determined areas, generating a link to the second program related to the corresponding character string, and marking a part related to the particular data. For example, the electronic device 101 may receive one or more result content based on a search word input through the Internet browser (e.g., the first program) displayed on the display 150 and display the content on the display 150.

The electronic device 101 may analyze one or more result content 601 selected from the displayed result content. The result content 601 may include a link to a particular webpage or may be image data connected to the link. The result content 601 may be an image including at least one character string (e.g., particular data such as a store name or a phone number) included in the connected link. When the result content 601 is selected, the electronic device 101 may acquire the character string included in the result content 601 by using an image OCR scheme. The electronic device 101 may determine a data format corresponding to the character string based on the acquired character string. The electronic device 101 may divide the acquired character string into particular data 603 and particular data 605 based on the data format corresponding to the character string, and mark the particular data based on configuration information. The electronic device 101 may determine second programs to be executed based on particular content by applying the aforementioned data analysis scheme, and connect each of the determined second programs to the particular data 603 or the particular data 605. The electronic device 101 may display the particular data 603 and/or the particular data 605 linked to one or more second programs on a part of the display 150 displaying the web browser (e.g., the first program). When displaying the particular data linked to the second program, the electronic device 101 may display an object including a character string such as particular data 607 illustrated in FIG. 6 or an image. Further, when displaying the particular data linked to the second program, the electronic device 101 may display an object including a character string and/or an icon of the second program such as particular data 609. According to an embodiment of the present disclosure, the electronic device 101 may access data (e.g., a webpage) connected to the selected result content 601, analyze the character string or image included in the connected data, and detect particular data included in the connected data. The electronic device 101 may perform an operation for analyzing the particular data included in the connected data in a state where the data connected based on configuration information is not displayed on the display 150.

Figure 7:
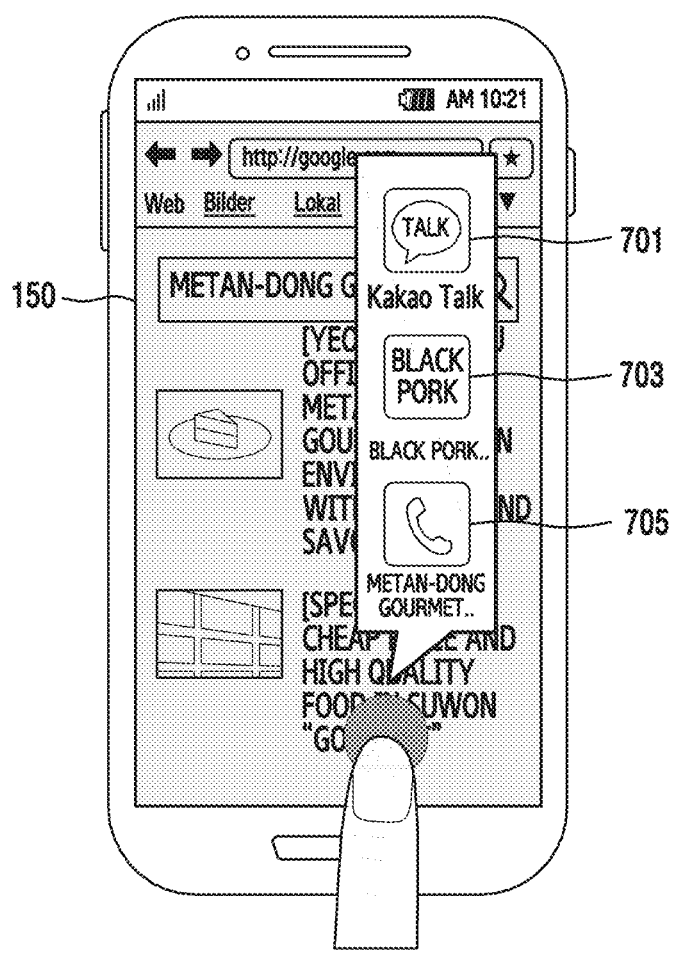
FIG. 7 is a view illustrating a second program linked to content selected in an electronic device according to an embodiment of the present disclosure.

FIG. 7 is a view illustrating a second program linked to selected content in an electronic device according to an embodiment of the present disclosure.

Referring to FIG. 7, according to an embodiment of the present disclosure, the electronic device 101 may select a plurality of content displayed on the display 150 based on a user input, analyze each of the content (or two or more content), determine particular data and/or second programs linked to the particular data according to each of the analyzed content, and provide the user with the determined particular data and/or second programs (e.g., display the determined particular data and/or second programs on the display 150).

According to an embodiment of the present disclosure, the electronic device 101 may select two or more divided particular areas based on a user input detected in the first program and display related information corresponding to each of the areas on the display 150 in a preview form (e.g., an icon or image) by using a main character string included in the divided area as a keyword. For example, the electronic device 101 outputs a webpage showing a result of the search based on a user input in the Internet browser corresponding to the first program, and may display (e.g., display in the form of a list) two or more search results on the display 150 as the result of the search (e.g., result content). When each of the search results is selected, the electronic device 101 may move to a linked webpage. Before the movement to the corresponding search result, the user may desire to identify more detailed information on each of the search results. When the electronic device 101 moves to the selected webpage, it may take time according to a state of the network or an additional communication fee may be charged according to situations. Further, since the moved webpage may contain information irrelevant to the information which the user desires, the user may want to identify in advance more detailed information in the current webpage corresponding to the search result even if the information is not complete before completely moving to the corresponding webpage. The information, which is shown in advance, may contain a larger amount of information extracted from some data of the existing webpage or information summarized through an abstract service. For example, the electronic device 101 may select two or more content from the content displayed on the display 150 through a user input detected based on the first program displayed on the display 150.

The electronic device 101 may divide a selected particular area and extract two or more content from the divided areas, and may display related information based on a keyword corresponding to a main character string included in one or more of the content on the display 150 in a preview form. When particular data which can execute the second program exists within the preview, the electronic device 101 may determine the second program related to the corresponding particular data, and the determined second program may have a direct link or a list of the second programs may be provided to the user. According to an embodiment of the present disclosure, the electronic device 101 may determine two or more particular data based on a result of an analysis operation performed through selection of a plurality of content in the first program. The electronic device 101 may provide the determined particular data and/or a linked program corresponding thereto (e.g., display the particular data and/or the linked program on the display 150). For example, the electronic device 101 may display the determined particular data and/or a linked program corresponding thereto in an icon form such as Kakao Talk 701, a black pork specialty 703, and a Metan-dong Gourmet 705. The electronic device 101 may display the determined particular data and/or the linked program corresponding thereto in respective popup windows of the display 150 as indicated by reference numeral 603 or 605 of FIG. 6, or may display the determined particular data and/or the linked program corresponding thereto in one popup window of the display 150 as indicated by reference numeral 701, 703 or 705 of FIG. 7. Similarly, before executing the preview, the electronic device 101 may link the particular data, which is included in divided abstract screens according to a search result, to the second program.

Figure 8:
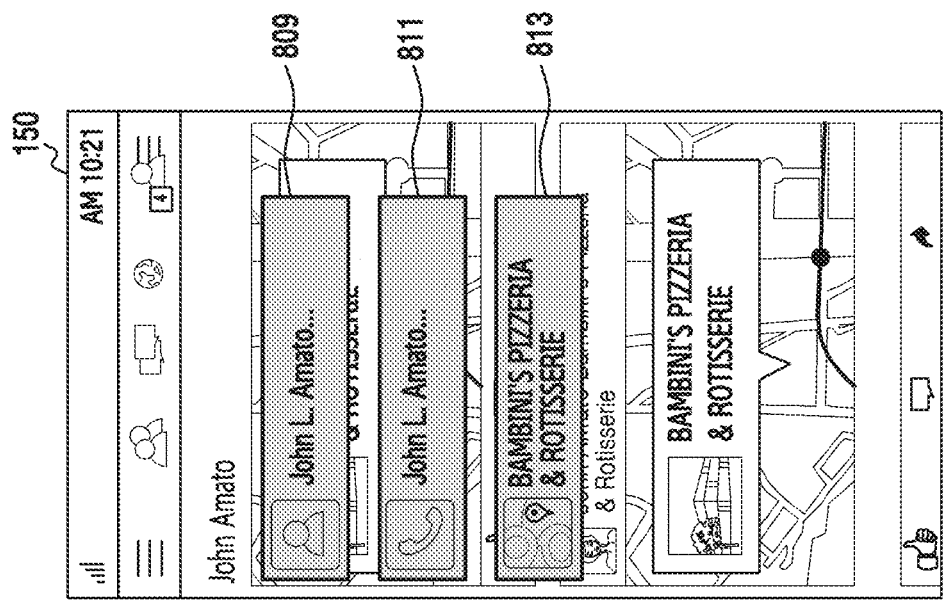
FIG. 8 illustrates an operation in which an electronic device determines particular data based on an acquired character string according to an embodiment of the present disclosure.
Figure 8:
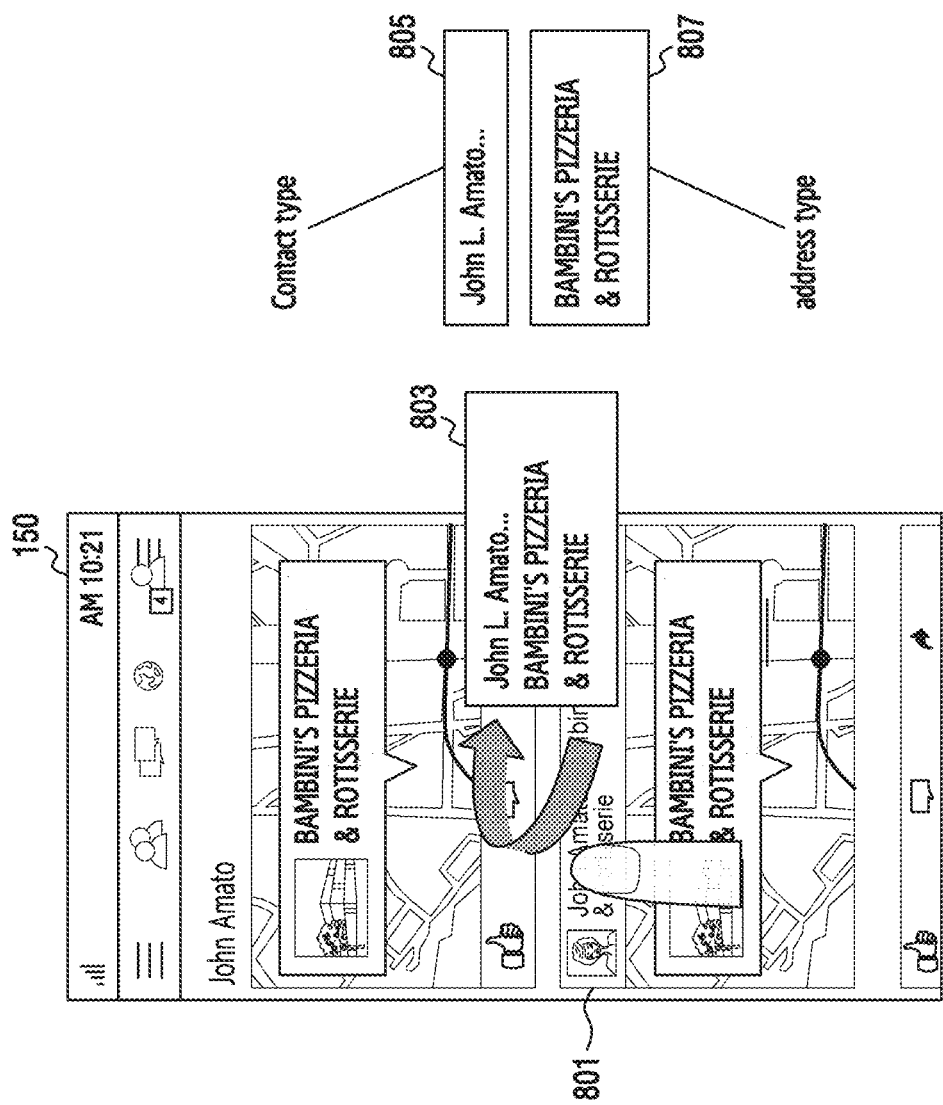

FIG. 8 illustrates an operation in which an electronic device determines particular data based on an acquired character string according to an embodiment of the present disclosure.

Referring to FIG. 8, the electronic device 101 may link a character string, which is not designated as particular data based on a data format, to a particular second program with reference to a database of the electronic device 101. According to an embodiment of the present disclosure, since the character string "John L. Amato" 801 selected from the content displayed on the display 150 through the first program (e.g., a social network service) is not recognized as particular data by the first program, the character string may not be link to the second program. When the user selects the information "John L. Amato 801" in the first program, the electronic device 101 may determine whether the information corresponds to particular data, which can execute the second program, through analysis of the selected character string, and may determine that the second program, which can be executed for the corresponding information by the first program, is not determined. The electronic device 101 may perform secondary analysis for the selected information based on a function provided by the system independent from the first program. When related particular data is identified, the electronic device 101 may link the information to a related second program. When the corresponding character string is selected through a method such as a particular user input (e.g., long press), the electronic device 101 may link the related second program through a service provided by the system (e.g., a separate program continuously executed in the background) regardless of the decision of the first program.

Referring to FIG. 8, even though the electronic device 101 extracts a character string of John L. Amato and related information 803 from a selected area based on a particular user input through a character string analysis process, a map app, which is currently executed, recognizes the information of John L. Amato as a simple data format and thus cannot find a correlation with a second program related to the information. The electronic device 101 may perform an analysis operation with reference to the database included in the electronic device 101 through a predetermined service (e.g., the link program 135). The electronic device 101 may identify that the name John L. Amato is registered in the address book, and determine that the character string John L. Amato is particular data 805 corresponding to a name. The electronic device 101 may link John L. Amato to the related second program corresponding to the name, and display data linked to one or more second programs (e.g., display of information on John L. Amato in the address book 809 or call connection to John L. Amato 811), which can be linked to John L. Amato based on the address book, on the display 150. Further, when information (e.g., an address) related to John L. Amato is detected during the analysis process of the selected information of John L. Amato 801, the electronic device 101 may access a second program (e.g., a map program 813), which can be linked in connection with the address and display the second program on the display 150.

Figure 9:
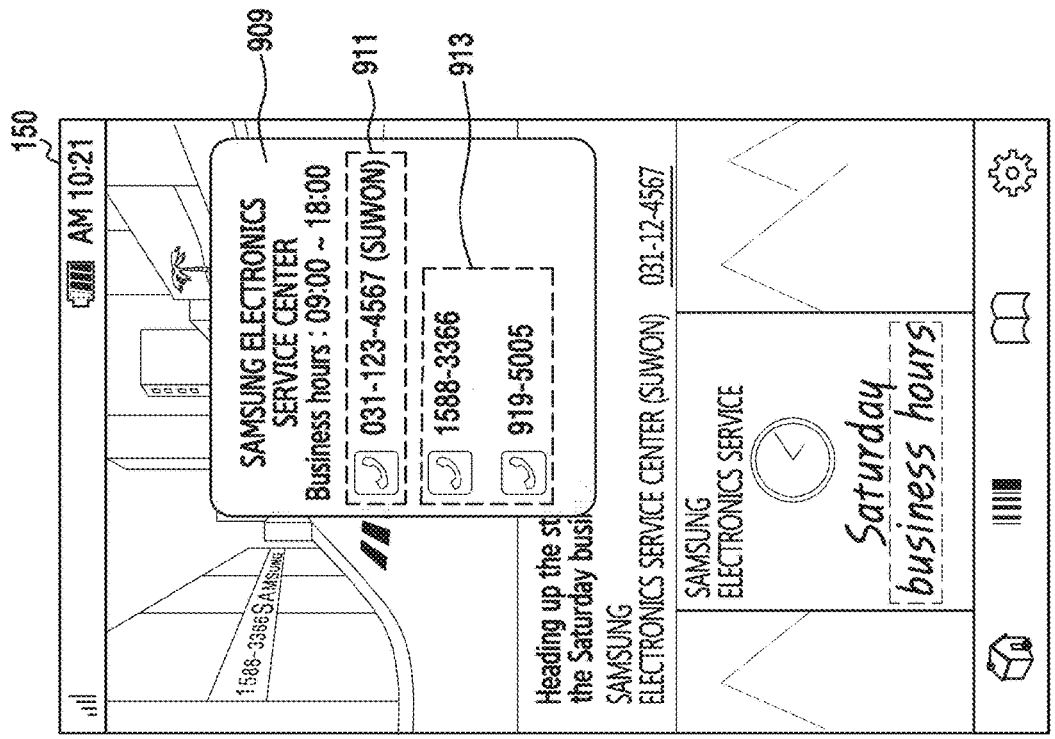
FIG. 9 illustrates an operation in which an electronic device combines data selected through content and provides particular information according to an embodiment of the present disclosure.
Figure 9:
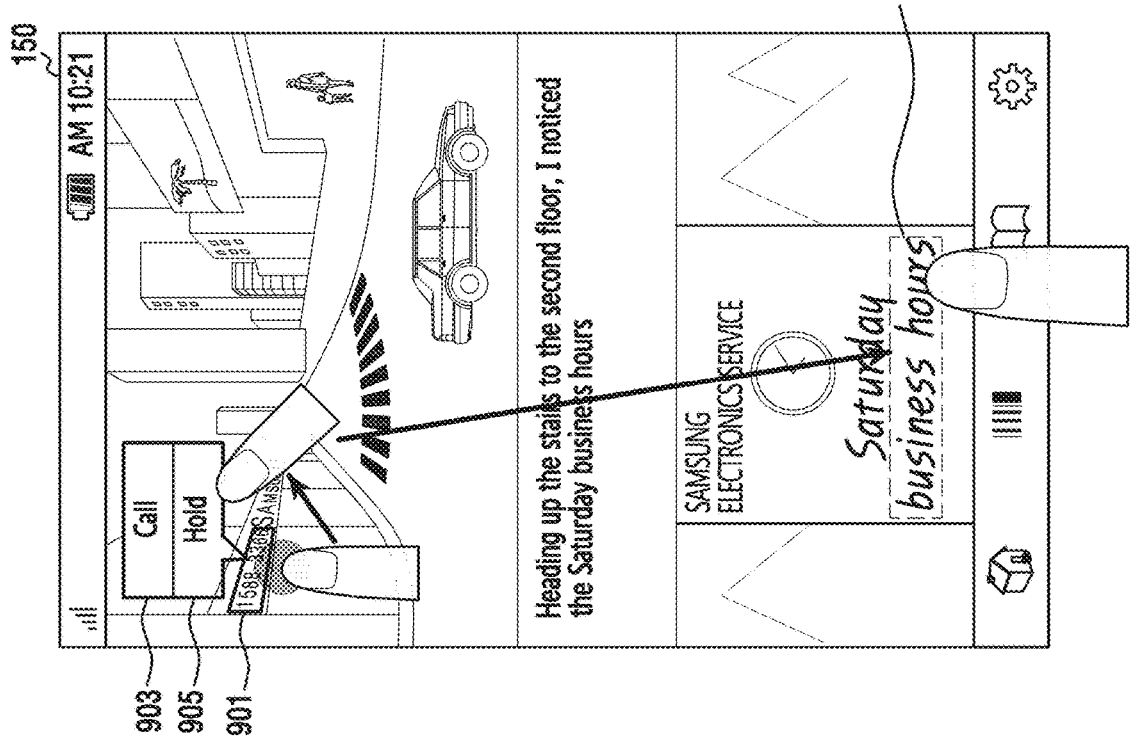

FIG. 9 illustrates an operation in which an electronic device combines two or more data selected through content and provides particular information according to an embodiment of the present disclosure.

Referring to FIG. 9, according to an embodiment of the present disclosure, the electronic device 101 may detect selection of two or more content from the content of the first program displayed on the display 150 based on a user input. The electronic device 101 may determine particular data corresponding to a character string of the selected content through an analysis operation, determine information related to the two or more pieces of particular data and/or second programs, and output the determined particular data and/or second programs on the display 150. According to an embodiment of the present disclosure, when the electronic device 101 detects a particular user input (e.g., long press) in a first location of the content displayed on the display 150 through the first program (e.g., a gallery program (not shown)), the electronic device 101 may display at least one menu which can be provided at the selected location. For example, when the electronic device 101 detects selection of the content displayed on the display 150 and the particular user input (e.g., long press), the electronic device 101 may perform an analysis operation for the whole content or the corresponding location of the content. When the electronic device 101 performs the analysis operation for the whole content or the selected location of the content or when the electronic device 101 determines one or more data formats corresponding to the content after the analysis operation is performed, the electronic device 101 may display a menu corresponding to a user input in the selected location.

The electronic device 101 may display a second program (e.g., a call connection 903) or a hold function 905 connected based on first particular data 901 (e.g., 1588-3366) in the selected location according to a particular user input. The hold function 905 may be a function of selecting a plurality of data formats or particular data by additionally selecting another location of the content (e.g., image) displayed on the display 150 while the selected location is maintained. The electronic device 101 may detect a user input for selecting second particular data (e.g., business hours 907) of another location while the particular data 901 is selected and held by the hold function 905. The electronic device 101 may search for related information in a database of the electronic device 101, the server 106 through network communication, and/or an Internet database based on the selected first particular data 901 and second particular data 907. According to an embodiment of the present disclosure, the electronic device 101 may acquire a store name of "Samsung electronics service center (hereinafter, referred to as Samsung electronics)" based on the first particular data 901, and acquire information related to "Samsung electronics" (e.g., business hours 09:00~18:00 or phone number) based on the second particular data 907. For example, the electronic device 101 may acquire a phone number 911 (e.g., 031-123-4567) of "Samsung electronics" near the electronic device 101 based on location information of the electronic device 101 acquired through a GPS. The electronic device 101 may display the acquired information (e.g., related information 909 of the first particular data 901 and the second particular data 907) on the display 150. When displaying the related information 909, the electronic device 101 may also display the information (e.g., phone number 911 and/or phone number 913) acquired in connection with the first particular data 901 and/or the second particular data 907 together with the related information 909 or may display the information in a separate area from the related information 909.

Figure 10:
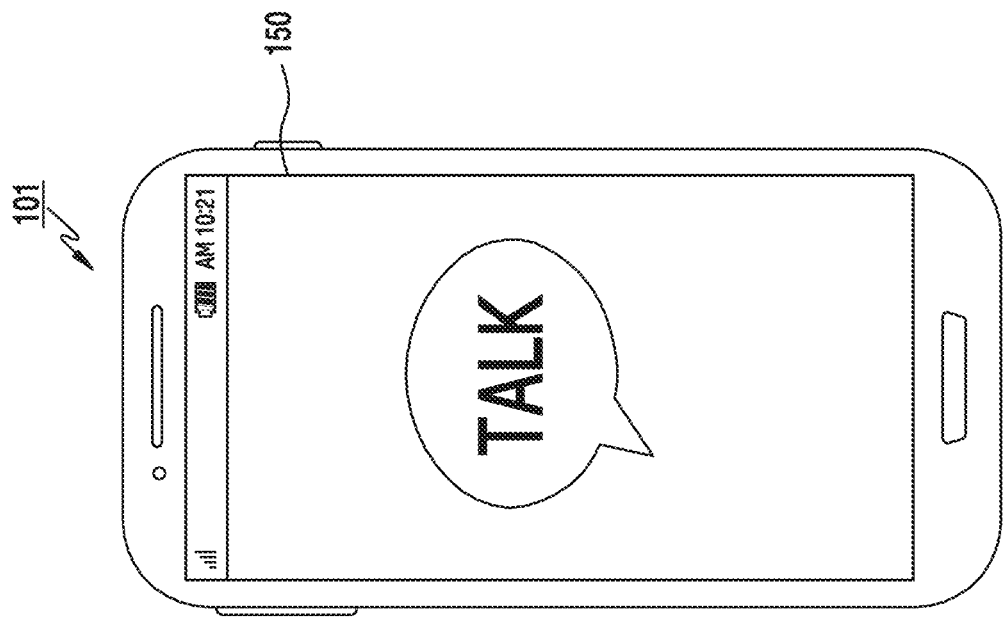
FIG. 10 is a view in which an electronic device executes a predetermined program based on a character string included in content according to an embodiment of the present disclosure.
Figure 10:
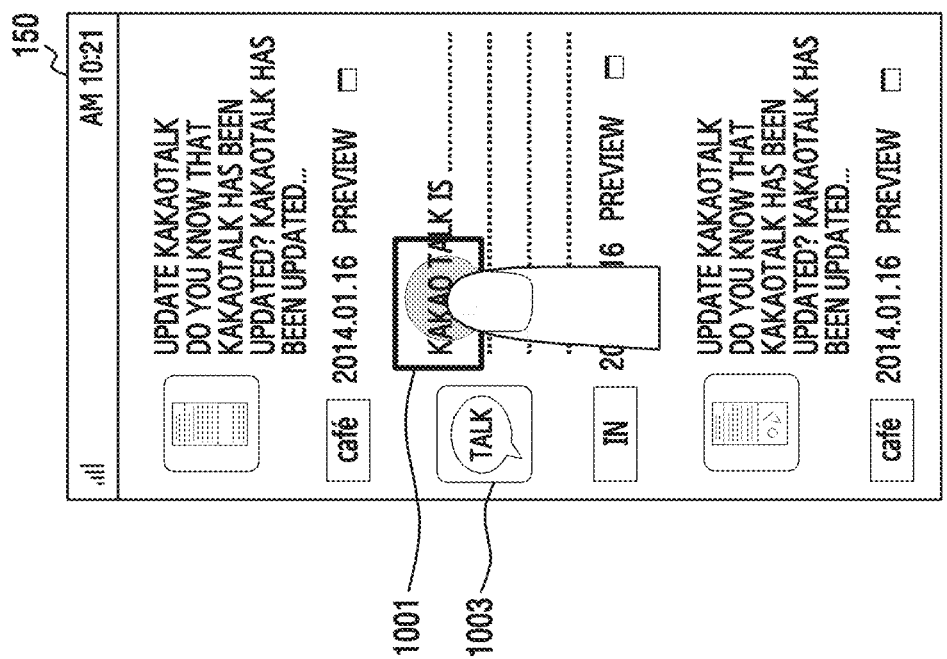

FIG. 10 is a view for executing a predetermined program based on a character string included in content by an electronic device according to an embodiment of the present disclosure.

Referring to FIG. 10, the electronic device 101 may extract one or more data formats by analyzing content and determine particular data, which is configured to execute one or more programs based on the data formats, based on a character string included in the content or an image included in the content.

According to an embodiment of the present disclosure, the electronic device 101 may recognize the image itself in the content displayed on the display 150 as particular data. Embodiments of the present disclosure are not limited to the extraction of the character string within the picture or image, and the electronic device 101 may determine some of the picture or image as particular data and perform an operation for a link to the second program, so as to link an object included in the content to the second program without a process of converting the extracted image into the character string.

Referring to FIG. 10, the electronic device 101 may execute the related second program through detailed image information included in an image area selected based on a user input 1001 by analyzing the image itself without an operation of extracting the character string from the content displayed on the display 150. The electronic device 101 may identify information on a mobile messenger program of "Kakao Talk" through the first program (e.g., Internet browser). When a representative icon part of "Kakao Talk" is selected through a method such as a particular user input 1001 (e.g., long press) in the webpage, the electronic device 101 may extract a representative icon image 1003 of "Kakao Talk" from the corresponding webpage. The electronic device 101 may identify whether an icon having the same image as the selected representative icon image 1003 of "Kakao Talk" exists through a comparison between icon images with reference to a database in which a program list installed in the electronic device 101 is registered, and acquire a program ID corresponding to program identification information (e.g., an ID) of the corresponding program. The electronic device 101 may execute "Kakao Talk" which is the related program by using the corresponding program ID.

The electronic device 101 may use an image recognition engine as a method of extracting a partial image of the content output on the display 150 to search for images related to the programs installed in the electronic device 101. Representative types of image recognition engines may include a scheme for performing a pixel-by-pixel comparative search between a source image and a target image and an outline of object recognition scheme. Further, since the image selected in the content is not always the same as the original image of the corresponding program, the electronic device 101 may extract feature components, which correspond to descriptor information indicating inherent characteristics, from the image and use the extracted feature components for the image comparison as a method of performing the search regardless of the difference between image scales or rotations. When the descriptor information is prepared, the electronic device 101 may perform a sub-window search as an operation for identifying whether a desired icon is included in an input image. When a similarity is within a threshold, the electronic device 101 may determine that the desired icon is included in the corresponding area. Such a process may be more accurately performed using a machine learning scheme (cascade booster classifier or support vector machine).

When the image comparison using the descriptor information is performed, the electronic device 101 may determine that the representative icon 1003 is the same as the execution icon of "Kakao Talk" even though the representative icon 1003 is not the same as the execution icon of "Kakao Talk". After the user draws a rough image through an image creation program, the electronic device 101 may search for an execution icon similar to the drawn image in a program installed in the electronic device 101. In the determination of the image related to the selected image, the image is not limited to an execution icon of a particular program. The image may include images, which can represent corresponding programs, among image resources of particular programs such as a representative layout of the corresponding program, a special color, a related mascot, and a button shape. For example, when images disclosed in the webpage includes a picture indicating a chatting using "Kakao Talk", if the user selects the program "Kakao Talk" in the corresponding picture, the electronic device 101 may make a link to the second program, which provides the most similar layout, through a program layout of the selected part although the selected part does not correspond to the execution icon of "Kakao Talk".

According to an embodiment of the present disclosure, a particular icon image may include the character string information TALK based on the content displayed on the display 150. Although a particular image is not selected based on a user input, an area within the image is divided into a character string area and an image area through an analysis operation when the corresponding image is output on the screen, and the electronic device 101 may link the related particular data to the second program in different methods according to the area selected by the user between the two areas of the image. When the character string area is selected in the image, the electronic device 101 may extract the corresponding character string by using the aforementioned image—OCR ("content image—character string analysis scheme") scheme, and then decide particular data related to the corresponding character string and execute the second program related to the particular data.

In FIG. 10, the electronic device 101 may extract character string information of "TALK" from the image 1003 and search for a program related to TALK in the program list installed in the electronic device 101. The electronic device 101 may search for the same program as detailed information of TALK, but may identify the program list related to a TALK function. Even when the detailed information selected based on a user input refers to a function, rather than particular data or a name of a particular program, the electronic device 101 may make a link to the related second program. For example, in order to search for the program related to the function, the electronic device 101 may add, to installation registration information, information related to a representative function among information on the programs installed in the electronic device 101. For example, when programs corresponding to keywords such as "chatting", "talk", and "friend" are registered in the electronic device, a mobile messenger program may be also linked, and then the corresponding information may be referred to when the second program is linked through the function. Accordingly, when the character string "TALK" is selected based on a user input, the electronic device 101 may search for information on the selected character string and search for one or more programs, which provide the talk (chatting) function.

The electronic device 101 may apply the above description to a case where the character string is extracted from the image through the image analysis and also the character string extracted through the aforementioned various methods (e.g., the method of extracting the character strings in FIGS. 3 to 9). The electronic device 101 may compare programs related to the function of "TALK" extracted from the image with character strings of a main menu to find "Kakao Talk", "Google talk" and the like, which are programs including the character string "talk" in the program name, and also determine "Facebook", "Twitter", "messenger" and the like, which are other programs providing a talk function, as a function related to "TALK" (or a related program). The electronic device 101 may distinguish the programs identified based on a search result through inherent IDs thereof (e.g., program IDs) and know information such as an execution command of the corresponding program by using each program ID. Thereafter, the electronic device 101 may display all pieces of information of the programs on the display 150 through a separate UI or may directly execute one predetermined program.

According to an embodiment of the present disclosure, when the image part is selected in the image based on a user input, rather than the character string part, the electronic device 101 may determine the second program by using the aforementioned "content image—image analysis scheme". After the comparative search of the "Kakao Talk" icon image 1003 in the webpage displayed on the display 150 in the program list installed in the electronic device 101, the electronic device 101 may identify identification information of the corresponding program (e.g., program ID) and directly execute the program "Kakao Talk" corresponding to the program ID. As described above, the electronic device 101 may divide the image selected by the user into an image area and a character string area again. The electronic device 101 may divide in advance the image through image analysis at a time point where the corresponding image is output, or may perform a process for dividing the area of the image selected by the user.

According to an embodiment of the present disclosure, when a name of a particular program is included in the character string based on a result of the analysis of the character string in area selected based on the user input, the electronic device 101 may recognize the corresponding program as the second program. A particular area of the website displayed on the display 150 may include the character string "Kakao Talk". When a particular character string including "Kakao Talk" is selected in the corresponding area based on a user input, the electronic device 101 may recognize the character string "Kakao Talk" as a data format indicating a name of the second program and link the program "Kakao Talk" to the character string "Kakao Talk". When it is determined that the user selects the character string "Kakao Talk" in the character string area, the electronic device 101 may determine whether a program having the same name exists in the program list installed in the electronic device 101. When the program exists, the electronic device 101 may link to the corresponding program to the selected character string to directly execute the program. When "Kakao Talk" exists in the installed program list, the electronic device 101 may recognize an ID of the corresponding program and then execute the corresponding program through the program ID. The electronic device 101 may directly execute the desired program to be executed based on the user input in the currently output content without searching for the program in the main menu or the program list.

The method of executing the second program related to the "function" indicated by the character string is not limited to a method which can be used only when the image area is divided in advance, and may be applied if the character string finally extracted from the area selected by the user in the currently output content is related to a "function" regardless of the division of the image area or a time point of the division.

Figure 11:
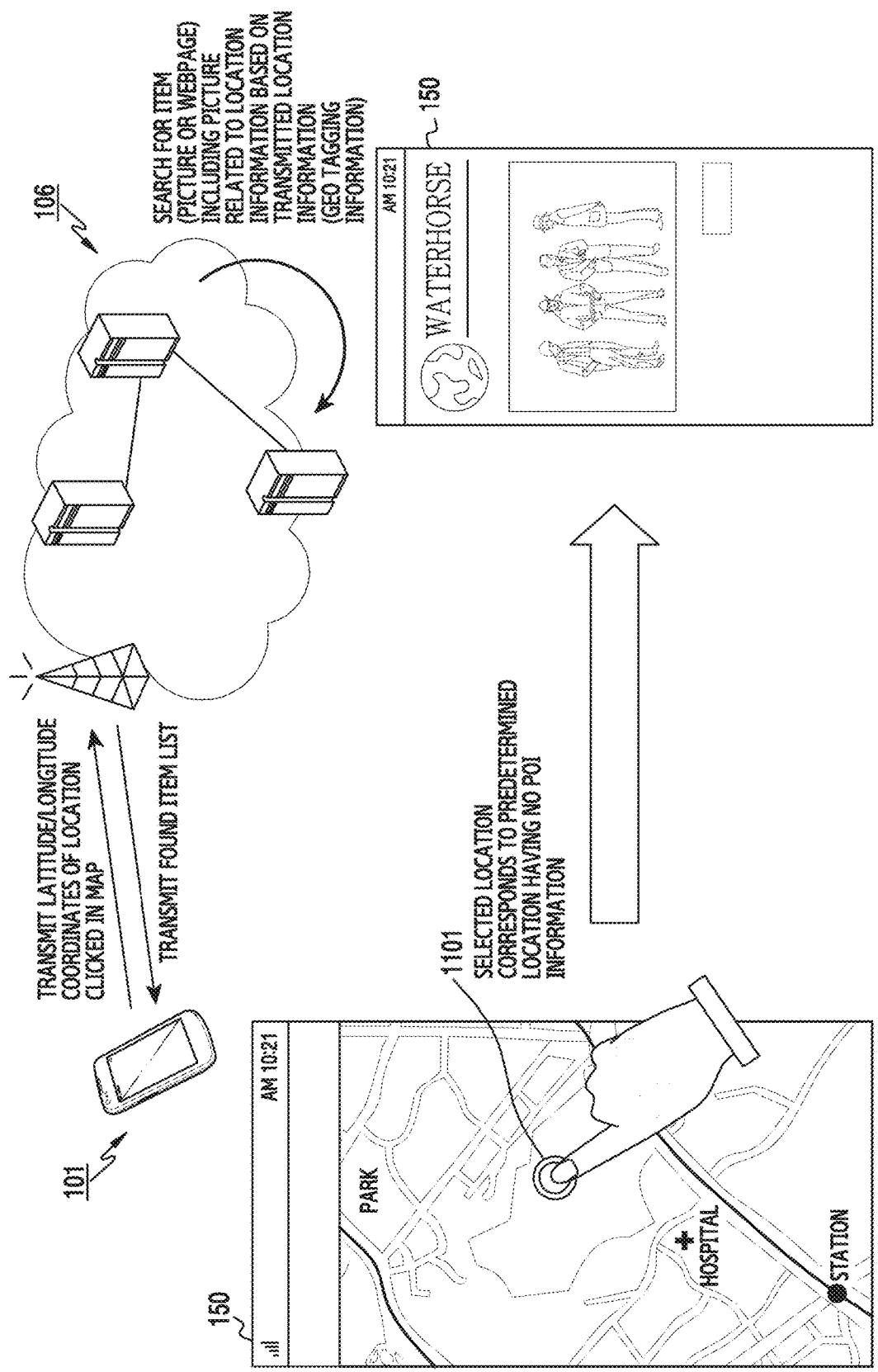
FIG. 11 illustrates an operation in which an electronic device acquires information corresponding to selected content through network communication according to an embodiment of the present disclosure.

FIG. 11 illustrates an operation in which an electronic device acquires information corresponding to selected content through network communication according to an embodiment of the present disclosure.

Referring to FIG. 11, an example in which the electronic device 101 desires to identify information on areas other than an area corresponding to information provided by the first program (e.g., map program) or a supplier of the first program may be described. According to an embodiment of the present disclosure, the electronic device 101 may select a predetermined location 1101 on the map of the first program (e.g., map program) based on a user input. The electronic device 101 may acquire latitude/longitude coordinates of the selected position through a GPS and transmit the coordinates to a related server (e.g., the server 106) of the network. The server 106 may search for pictures having geo tagging information including a location value in meta data among pictures in the webpage based on the location information transmitted from the electronic device 101 and determine whether a distance between two positions is close, and may transmit a picture including an adjacent picture and an image, a webpage including a picture, and a link to the electronic device 101 through the server of the network. The electronic device 101 may use the information received from the server 106 as data of the first program, and provide information corresponding to the location selected based on the user input (e.g., display the information on the display 150). For example, when providing the information acquired from the server 106, the electronic device 101 may display the information on the display 150 in a list type and/or a block type, and provide the information in the form of a UI which can be controlled through a motion sensor. The corresponding UI may interwork with a wearable device of the user and select a search result based on the user input received from the wearable device.

According to an embodiment of the present disclosure, the electronic device 101 may select a character string related to location information in the content output on the display 150 by the first program based on the user input and execute a program such as navigation or a map app as the second program. According to an embodiment of the present disclosure, when the location information corresponds to a character string type such as a detailed address or coordinate value, the electronic device 101 may execute an app or navigation as the second program by using the corresponding detailed information. Alternatively, when a particular area is selected in the map based on a user input, the electronic device 101 may execute a program related to the selected area as the second program. When a map-related program is executed, the electronic device 101 may select a position, which is stored in the electronic device 101 or an external server (e.g., the server 106) and is not stored in a map database. When a map service provider does not possess a database of parts other than distinguishing areas such as a point of interest (POI), a landmark, and the like, the electronic device 101 may access the server 106 based on network communication, and may receive and provide information shared in connection with locations selected by a plurality of users through various channels such as pictures and articles including the locations.

Figure 12:
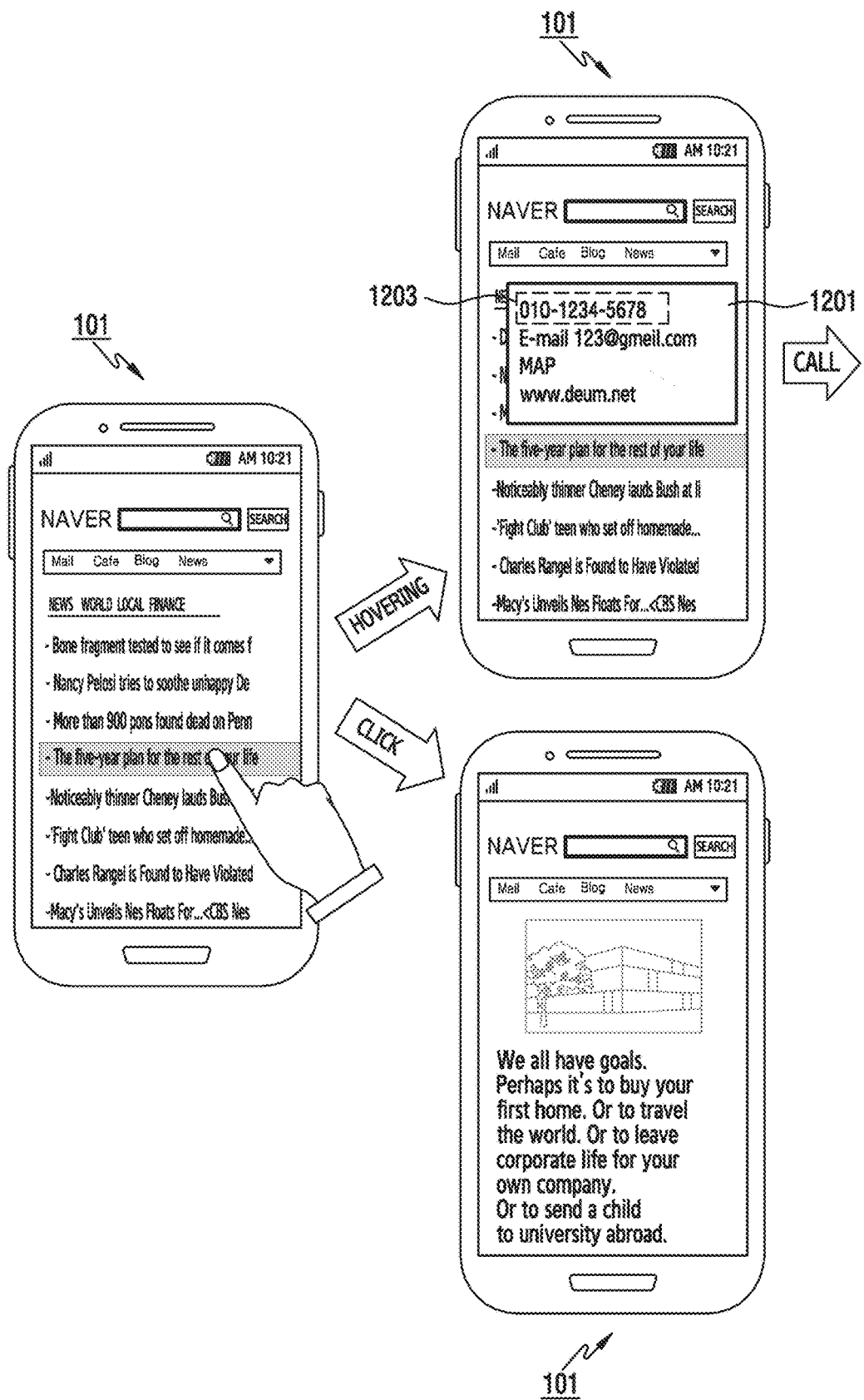
FIG. 12 is a view in which an electronic device determines an operation performed based on a user input according to an embodiment of the present disclosure.

FIG. 12 is a view for determining an operation performed by an electronic device based on a user input according to an embodiment of the present disclosure.

Referring to FIG. 12, the electronic device 101 may mark particular information in content output by the first program based on a user input and execute a second program related to particular data including the corresponding information.

A detailed method in which the electronic device 101 executes the second program according to various types of user inputs detected in the first program is described below.

Referring to FIG. 12, the electronic device 101 may distinguish types of inputting content displayed on the display 150 and perform a predetermined operation according to the input type. According to an embodiment of the present disclosure, the electronic device 101 may select a particular article by placing a finger on the particular article among search results made through an indirect touch input (e.g., a hovering action) by an input means (e.g., a finger) or may select the particular article by touching the particular article. When the particular article is selected through the hovering, the electronic device 101 may analyze in advance the related article without entering the related article (e.g., analyze the corresponding article by accessing the selected article in the background). The electronic device 101 may provide contacts, email, and location information acquired through the analysis operation in the form of a list 1201. When a phone number 1203 is selected from the display information, the electronic device 101 may execute a dialer app that originates a call to the selected phone number while interworking with the second program such as a call or a contact search, which operates based on a phone number.

According to an embodiment of the present disclosure, the electronic device 101 may detect an input for selecting a corresponding list by touching the list by an input means, and move to a webpage linked to the selected list in response to the touch input based on configuration information. The present disclosure is not limited to the hovering or the touch input, and the electronic device 101 may configure various input types such as a touch or click of a soft or hard button included in the electronic device or an event such as long press. The input types may be applied all operations in which the user desires to identify only some articles, rather than all articles of the selected link.

According to an embodiment of the present disclosure, the electronic device 101 may include various types of data formats, such as a character string, an image, and a moving image in the content displayed on the display 150, and may classify the character string into detailed data formats such as a number, a letter, a phone number, and an email address. The electronic device 101 may link particular data, which corresponds to the data format linked to the second program, to the related second program, and execute, through an input of designating corresponding information by the user in the currently output content, the second program related to the designated information in a state where an additional action is minimized. When the user selects desired information in the content currently output by the first program, the electronic device 101 may automatically execute the second program related to the corresponding information. For example, when a message transmitted from a counterpart (e.g., the electronic device 102) includes phone number information, the electronic device 101 has a structure in which a dialer app is automatically executed if the user selects the phone number. The electronic device 101 may show a list of the second programs related to the selected information and allow the user to execute a desired program in the list in order to accurately reflect the user's intention.

According to an embodiment of the present disclosure, the information selected based on the user input may be particular data having a particular format, but the selected information itself may indicate a particular program. The electronic device 101 may determine that a particular program name, a keyword related to the program, or a keyword related to a particular menu within the device is included in the character string corresponding to the selected information extracted based on the user input in the first program, extract the corresponding keyword, link the keyword to the particular program or menu, then display the link, and execute the related program when selection is made by the user. For example, the electronic device 101 may identify that a keyword indicating the program "Kakao Talk" exists in the extracted data. When the electronic device 101 detects a user input for selecting the character string "Kakao Talk" in the corresponding content, the electronic device 101 may directly execute the corresponding program. The electronic device 101 may display the link in the extracted detailed information, so as to allow the user to easily recognize the link or may execute the second program through various methods such as indication of an icon or menu for the execution.

According to an embodiment of the present disclosure, the information selected based on the user input may be a general character string, which does not indicate a particular program or may be a function provided by the electronic device 101. When character string information "picture" is selected through a website based on a user input, the electronic device 101 may link programs having a picture-related function provided by the electronic device 101, which is used together with a camera function or a gallery, to the corresponding character string information. The electronic device 101 may directly execute related programs according to preset information or provide the user with a list of available second programs through various methods.

According to an embodiment of the present disclosure, the electronic device 101 may provide a character string area and a multimedia area as areas which can be selected within the content. The electronic device 101 may select a desired area of the multimedia area based on a user input. Further, the electronic device 101 may divide the information selected within the multimedia area into character string information and image information. In a case of the character string information, the electronic device 101 may convert the character string existing in the selected area through an OCR scheme and then determine the corresponding character string as particular data. The electronic device 101 may then directly execute the related second program or display a list of the second programs on the display 150. Further, when the selected information corresponds to another part of an image, the electronic device 101 may analyze whether a program, which matches the corresponding image, is installed in the electronic device 101. When the corresponding second program exists, the electronic device 101 may directly execute the second program or provide a list of the related second programs (e.g., display the list on the display 150). The electronic device 101 may add (e.g., mark) a separate visual effect to the selectable character string of the image or image information and thus allow users to identify that the character string or image information is selectable.

According to an embodiment of the present disclosure, the electronic device 101 may access a search engine through an Internet browser based on a user input to search for predetermined information (e.g., information of interest) and display a list of search results related to the information on the display 150. The electronic device 101 may output both a title of the corresponding result and predetermined information (e.g., information in one or two lines) extracted from the corresponding link in the list of the search results. When the size of the screen displaying the content on the display 150 is reduced, the electronic device 101 may not output the title completely. In order to display detailed information on the display 150 based on the user input, the user should select the corresponding link and directly visit the corresponding webpage. Accordingly, when a mouse pointer is placed on the corresponding search result or a finger hovering is made on the corresponding search result, the electronic device 101 may provide a preview function of displaying details in a part of the screen of the display 150. The electronic device 101 may not determine the corresponding information before acquiring or displaying the information, and may not provide selection of another link in the preview. When the preview of each search is output, the present disclosure is not limited to a simple extracting of the linked webpage, and the electronic device 101 may provide an abstract of the corresponding website summarized through an abstract engine. Further, the electronic device 101 may be implemented to select another link in a preview state.

The electronic device 101 may execute the second program through the aforementioned character string or image analysis with respect to information such as a contact, an email address, a location, and a URL of a website shown in the preview state of the list of search results. When the electronic device 101 identifies a user's intention to select a link of a particular result among results searched for through a search engine and then listed, for example, when the user intends to acquire various contact information such as phone numbers in the related search list, if the user designates some search result lists to select the corresponding intention without visiting all the corresponding search result lists, the electronic device 101 may analyze in advance information such as the contact, email, address, location, and URL in the selected search result lists and provide the user with the analyzed information. For example, the electronic device 101 may output 20 current search results on the display 150, and detect an input for designating 5 search result areas through an input means to perform the pre-analysis for 5 linked results in the high rank based on the user input. When the designation is completed, the electronic device 101 may analyze particular data which can be collected through the corresponding links, and provide the user a list of second programs executable through the particular data. That is, the electronic device 101 may identify that the 5 selected search results include information such as a phone number, an icon of a particular program, an email address, and location information, and may display a list of a dialer app, a message app, navigation, and an email app to inform the user that the list of the 5 selected search results includes information which can execute the displayed apps. When the email app is selected based on the user input, the electronic device 101 may display a list of the email addresses included in the list of the 5 selected search results again to allow the user to select the email address. The electronic device 101 may have a separate soft or hard button installed for the preview through a touch of the corresponding button or use a click input as well as the aforementioned hovering action for the preview, and the separate button may be applied to all operations such as an event of a long press in which the user desires to identify only some of the articles, rather than all the articles of the selected link.

Figure 13:
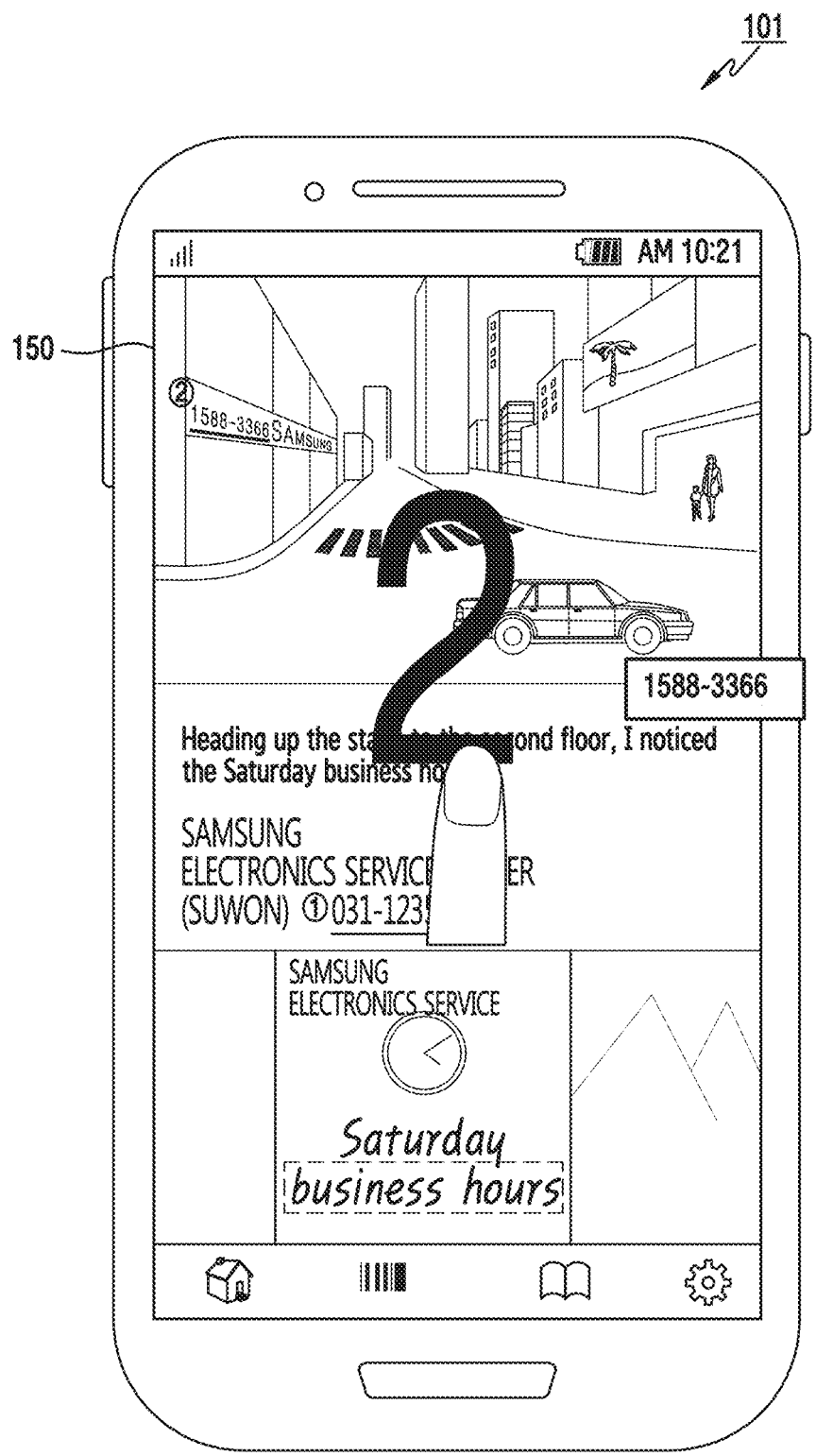
FIG. 13 illustrates a method in which an electronic device selects particular data included in content according to an embodiment of the present disclosure.

FIG. 13 illustrates a method in which an electronic device selects particular data included in content according to an embodiment of the present disclosure.

Referring to FIG. 13, when designating particular data, the electronic device 101 may number predetermined numbers as a method of selecting analyzed particular data. The electronic device 101 may select particular data by detecting an input of the numbered number, which is assigned to particular data based on the user input. For example, analyzing particular data, which can be used in the second program such as a phone number, an email address, and a URL, the electronic device 101 may number the particular data in the first program according to predetermined rules. For example, the predetermined rules may include various methods such as sequences from top to bottom, sequences from bottom to top, and sequences from the largest number of appearances to the smallest number of appearances, but are not limited specially. The electronic device 101 may also display numbers when designating the particular data according to the determined sequences.

The electronic device 101 may determine particular data corresponding to the number input based on the user input and execute the second program corresponding to the particular data. According to an embodiment of the present disclosure, in a method of inputting a number of the numbered particular data, the electronic device 101 may use handwriting recognition through a touch and/or a drag on the display 150 of the electronic device 101. For example, the electronic device 101 may analyze the particular data from the first program and also display the number when designating the particular data according to a predefined rule. The electronic device 101 may detect a touch and/or a drag input of drawing a number corresponding to particular data in the display 150 or some areas of the display 150, and may recognize the input number, select particular data corresponding to the number, and execute the second program.

Referring to FIG. 13, the electronic device 101 determines sequences of pieces of particular data from bottom to top of the display 150. The electronic device 101 may configure a number 1 to particular data "031-123-4567" which can be selected by the user and configure a number 2 to 1588-3366, and display the particular data on the display 150. The electronic device 101 may detect a touch and/or a drag input of drawing "2" on the display 150 based on the user input and execute the second program based on the phone number "1588-3366" numbered by the number 2.

According to an embodiment of the present disclosure, the electronic device 101 may use the number of touches as another method of inputting the number of numbered particular data. For example, the electronic device 101 may analyze particular data of the content displayed on the display 150 through the first program and also display numbers when designating the particular data according to a predefined rule, so that the user may recognize a number corresponding to each piece of the particular data. When the electronic device 101 detects touches on the display 150 performed by the number of times corresponding to the sequence, the electronic device 101 may select particular data corresponding to the number and execute the second program. For example, the electronic device 101 may number sequences of particular data from top to bottom (or from bottom to top). The electronic device 101 may configure a number 1 to "052-294-2404" existing within the image, configure a number 2 to "031-123-4567" corresponding to a first text of the analyzed particular data, and configure a number 3 to "02-987-6543" corresponding to a second text of the analyzed particular data. When the electronic device 101 detects an input of touching the display 150 two times based on the user input, the electronic device 101 may select the phone number "031-123-4567", which is numbered by the number 2 and execute the second program based on the phone number corresponding to the selected number 2.

According to an embodiment of the present disclosure, the electronic device 101 may configure a number to each finger as another method of inputting the number of numbered particular data. For example, the electronic device 101 may analyze the particular data from the first program and also display the number when designating the particular data according to a predefined rule, so as to recognize the number corresponding to the particular data. When a corresponding finger touches the screen, the electronic device 101 may select particular data corresponding to the sequence and execute the second program. Finger print recognition may be used as one of the methods of distinguishing fingers. Other various methods may be also used for distinguishing fingers. According to an embodiment of the present disclosure in which fingers are distinguished using finger print recognition, the electronic device 101 may perform a pre-registration for all finger prints to identify the finger having the input finger print. The electronic device 101 may configure sequences of fingers of the right hand such that a thumb is the first, an index finger is the second, a middle finger is the third, a ring finger is the fourth, and a little finger is the fifth. The electronic device 101 may also determine the sequences of fingers of the left hand as necessary. The electronic device 101 determines sequences of particular data from top to bottom. The electronic device 101 may configure a number 1 to "052-294-2404", which exists within the image as selectable particular data, configure a number 2 to "031-123-4567", which is a first text of the analyzed particular data, and configure a number 3 to "02-987-6543", which is a second text of the analyzed particular data. When it is determined that the user's right index finger touches the display 150, the electronic device 101 may select the phone number "031-123-4567", which is numbered by the number 2 corresponding to the right index finger, and execute the second program by using the selected phone number.

Figure 14:
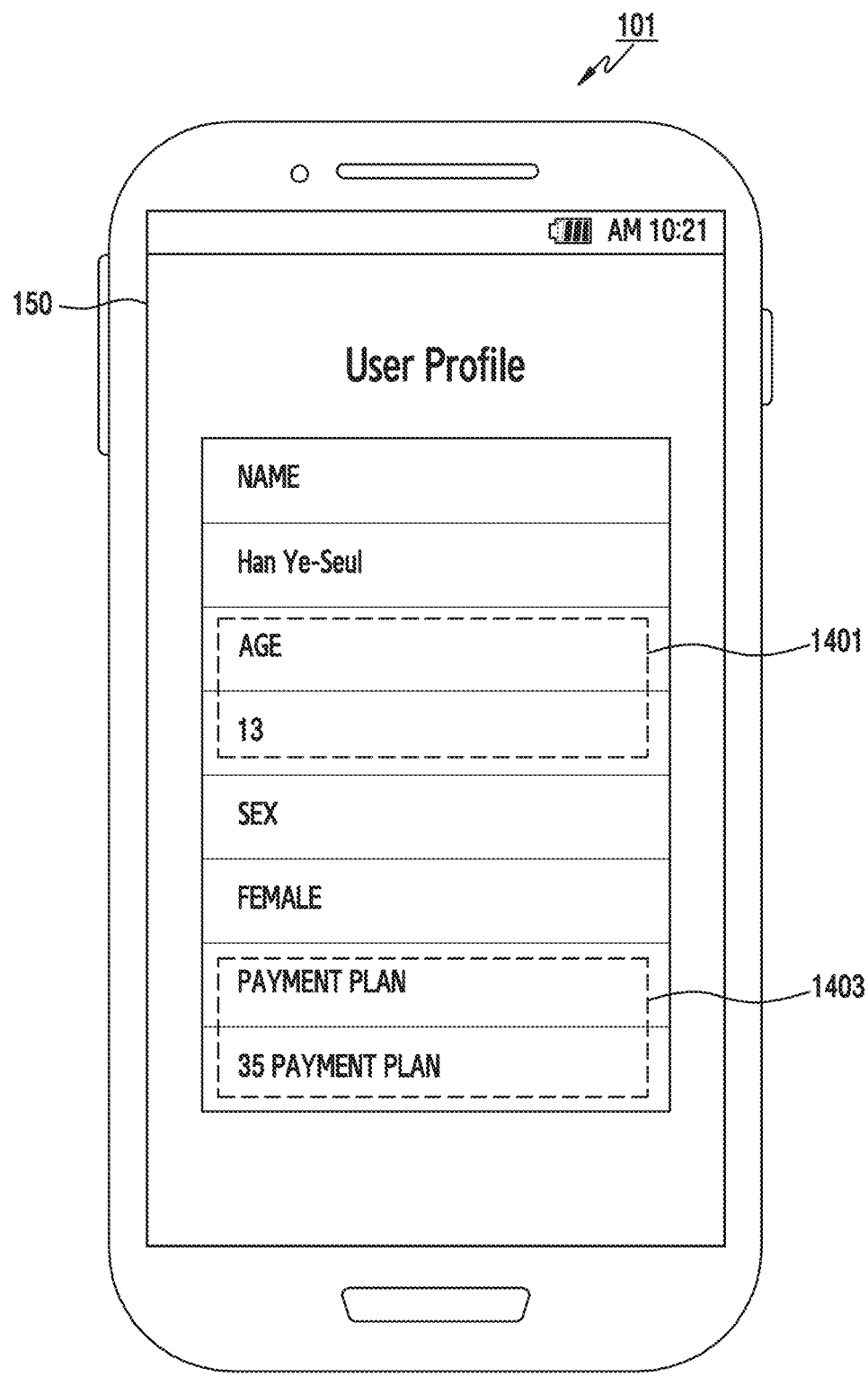
FIG. 14 illustrates a view in which an electronic device configures to turn on or off particular data based on a predetermined condition according to an embodiment of the present disclosure.

FIG. 14 illustrates a view of configuring particular data to be turned on or off in the electronic device based on a predetermined condition according to an embodiment of the present disclosure.

Referring to FIG. 14, according to an embodiment of the present disclosure, when the second program is executed through particular data analyzed in the first program, the electronic device 101 may distinguish the particular data such as a phone number, a URL, email, and an address, and execute the second program corresponding to the selected particular data. When executing the second program, which can be executed based on the particular data, the electronic device 101 may limit an operation of the particular data according to various conditions using age, sex, and biometric information included in a user profile registered in the electronic device 101. Information in the user profile may include various items such as a name, age, sex, biometric information, interests, and family, which can be used for a service of the electronic device 101. The items used for the profile may be determined by the user of the electronic device 101 or a service provider, and may be re-configured as necessary. The electronic device 101 may store and manage the user profile information in the server 106 or cloud (e.g., a cloud server) through the electronic device 101, another electronic device (e.g., the electronic device 102), or a service, and partially or totally limit an operation of the program used by the electronic device 101 through the user profile information. For example, when the electronic device 101 desires to execute the second program requiring an age limit through particular data analyzed in the first program, the electronic device 101 may deactivate designation or connection of the particular data or partially limit a function performed by the second program by using information configured in an age item 1401 of the user profile.

According to an embodiment of the present disclosure, the electronic device 101 may perform a process of deactivating particular data based on the user profile. The electronic device 101 may analyze the particular data from the first program and identify whether the user profile is registered in the electronic device 101. When the user profile is not registered in the electronic device 101, the electronic device 101 may move to an operation of registering and configuring the user profile and may provide the unlimited selection of the particular data. When the user profile is registered in the electronic device 101, the electronic device 101 may compare conditions of the second program to be executed by the selection of the particular data and age information existing in the user profile to identify whether access to the particular data is possible. The electronic device 101 may activate or deactivate the particular data according to whether the access to the particular data is possible.

According to an embodiment of the present disclosure, the conditions for limiting the particular data may include age information. For example, when the analyzed particular data corresponds to an adult website or a bar phone number which has a bad influence on minors, the electronic device 101 may check the age information 1401 of the user profile. When the user is a minor, particular data is not designated and thus no particular data is recognized as selectable particular data, and the electronic device 101 may deactivate the related second program so that the second program is not executed even though the particular data is selected. The electronic device 101 may determine a condition of the second program to be executed through the selection of the particular data in order to limit the analyzed particular data, and use a storage space such as a database, which stores information on the second program. The storage space of the electronic device 101 may be generated within the electronic device 101 or the electronic device 101 may access the server 106 or cloud through a network to use documents stored therein. The information on the programs of the electronic device 101 may be analyzed and generated when the programs are initially installed in the electronic device 101, or the electronic device 101 may access the storage space based on a user input to perform a management operation of inputting, modifying, and deleting the information.

According to an embodiment of the present disclosure, the electronic device 101 may use a method of limiting the particular data through user's biometric information detected by the electronic device 101 as another method of the conditions for limiting the particular data. For example, the electronic device 101 may limit the execution of the second program through the selection of particular data by using user's finger print information except for registered users. When the particular data analyzed in the first program corresponds to data related to the private life of the preset main user or information incurring charges, if the electronic device 101 detects a touch for selecting the particular data, the electronic device 101 may determine whether the user is the main user of the electronic device 101 by using information on the finger print of the hand making the touch and determine whether to execute the second program. Further, if the electronic device 101 can determine in advance whether the user who currently uses the electronic device 101 is the main user of the electronic device 101 based on the finger print information through another touch before selecting the particular data, the electronic device 101 may deactivate the particular data of the second program, which is not allowed to be accessed by users other than the main user, so that the particular data cannot be designated and selected. Accordingly, the electronic device 101 may limit the access for a temporary user, and it is possible to prevent a user such as a child who has no judgement ability from thoughtlessly accessing data of the main user or performing an operation incurring charges. Further, not only the finger print information, but also any information such as iris information or voice information by which the user can be identified may be used as the user's biometric information for determining whether to activate or inactive the particular data in the electronic device 101.

According to an embodiment of the present disclosure, the conditions for limiting the particular data may include charge information. For example, when the electronic device 101 uses a call origination or data communication in executing the second program through particular data, the user may identify a payment plan 1403 registered in the user profile or no charge call or data amounts which the user can currently use and then use communication functions such as a phone call, browser execution, or multimedia file streaming, which may limit programs or functions thereof incurring charges. Such a limit may be made by deactivating the designation and selection of particular data in the first program or operations of the functions of the second program incurring changes may be partially limited after the second program is executed.

The electronic device 101 may provide different marking of particular data to the user as well as actually limiting the execution operation through a limit on the use of the particular data. For example, when particular data is analyzed and marked in the first program, if it is determined that the second program executed through the corresponding particular data incurs charges, the electronic device 101 may mark the particular data to be distinguished from other particular data by displaying a link of a character string of the particular data with a different color or use an image such as an icon, so that the user can recognize whether the particular data incurs charges.

Figure 15:
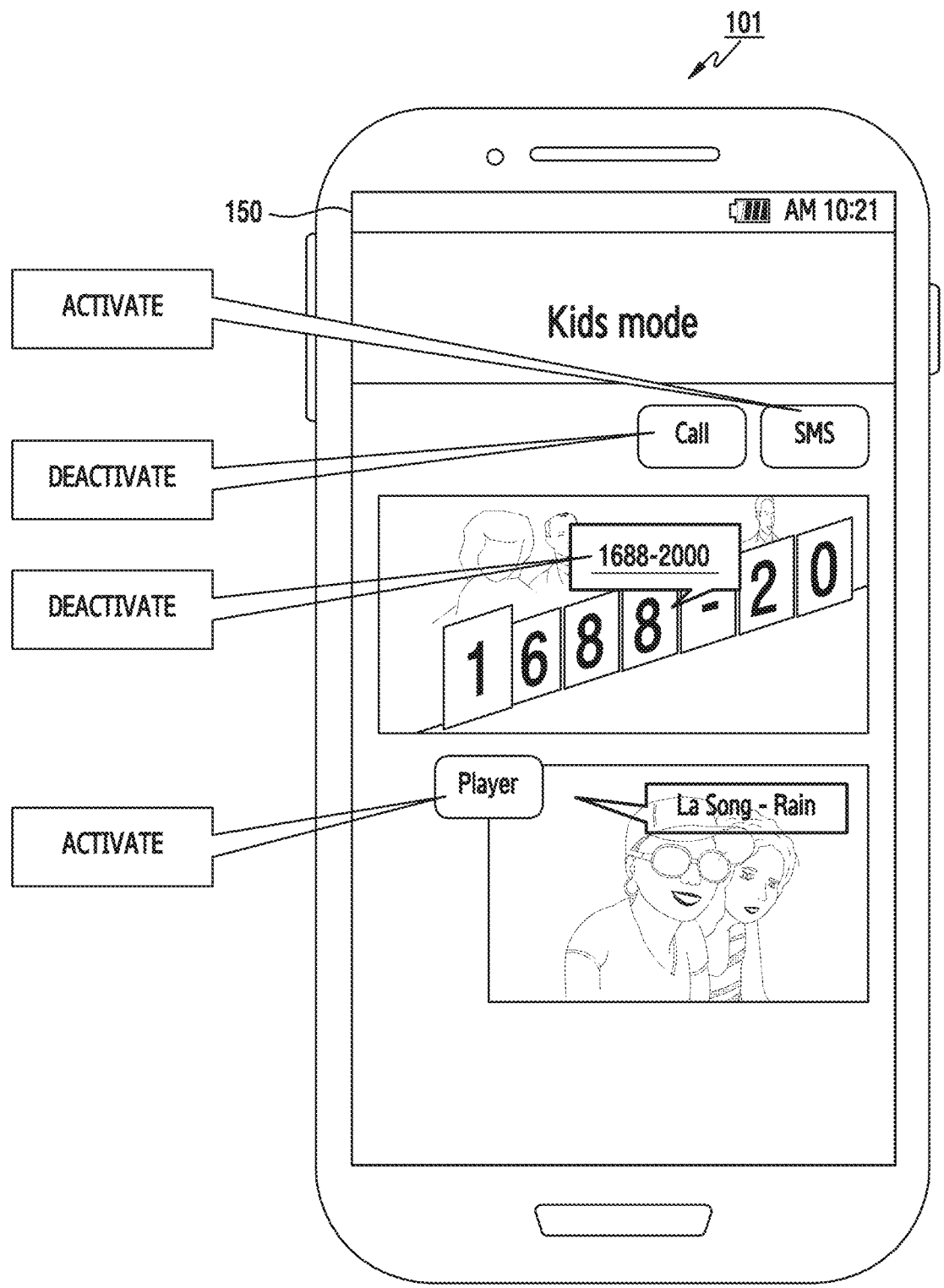
FIG. 15 illustrates a view in which an electronic device turns on or off particular data based on an executed mode according to an embodiment of the present disclosure.

FIG. 15 illustrates a view for turning on or off particular data based on a mode executed in an electronic device according to an embodiment of the present disclosure.

Referring to FIG. 15, according to an embodiment of the present disclosure, the electronic device 101 may limit particular data through a user mode. When a user is changed or a plurality of users use the electronic device 101 in common like a tablet PC, the user may change the mode of the electronic device 101 or drive the electronic device 101 by using a plurality of accounts.

According to an embodiment of the present disclosure, the electronic device 101 configures a particular mode with respect to a user who is not the main user of the electronic device 101 and temporarily uses the electronic device 101, so that programs such as a gallery or a message including personal information or an international telephone call incurring a large charge may be limited. Such modes may use, for example, a "guest mode" function. The electronic device 101 may configure in advance programs which are allowed to be used by the user in the "guest mode" to limit access to other programs. When the electronic device 101 operates in the "guest mode", it may be determined that the electronic device 101 is used by a temporary user who is not the main user of the electronic device 101. Accordingly, at least some of the functions for executing the second program through the use of the particular data analyzed in the first program may be limited. For example, the browser program is allowed to be used by a guest in the guest mode. However, when an international phone number exists in the particular data analyzed in the browser, the designation and selection of the international phone number may be limited if the use of the international telephone call is limited in the guest mode.

According to an embodiment of the present disclosure, in order to limit the thoughtless use of the device by children, the electronic device 101 may configure a particular mode such as a kids mode to limit the use. The kids mode is a mode configured when children use the electronic device 101. In the kids mode, the electronic device 101 may display only programs, which can be used by children, on the screen or provide a function of displaying programs, which are newly made to be angled towards children, on the screen. When the electronic device 101 operates in the kids mode, it may be determined that the electronic device 101 is used by children. Accordingly, in the kids mode, the electronic device 101 may limit the use of the function for executing the second program through the use of the particular data analyzed in the first program. For example, the electronic device 101 may deactivate the designation or selection of the particular data analyzed according to age of the child, as in the case where the use of particular data is limited through age information, or may limit the use of the particular data through charge information.

Figure 16:
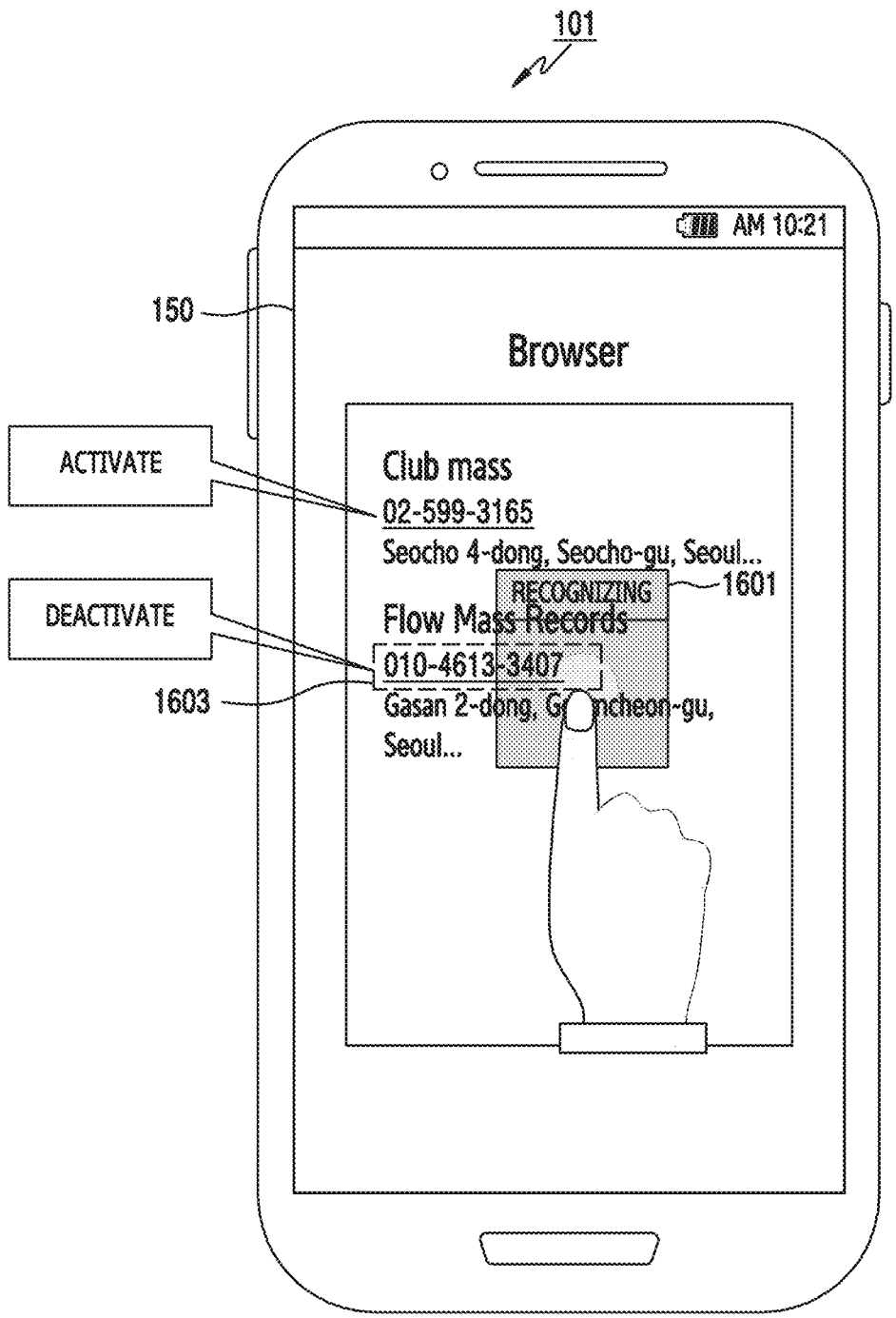
FIG. 16 illustrates an operation according to an input type in an electronic device according to an embodiment of the present disclosure.

FIG. 16 illustrates an operation according to an input type in an electronic device according to an embodiment of the present disclosure.

Referring to FIG. 16, when selecting particular data such as a phone number, a URL, email, or an address analyzed in the first program to execute the second program, the electronic device 101 may support various user input types and perform detailed configurations according to the input type. The electronic device 101 may include various input types, such as a touch, hovering, knocking, and finger print input. The electronic device 101 may improve an operation of a user input type, which requires to store and input values of functions for performing the second program in the first program through the analyzed particular data. However, when the unintended second program is executed due to an incorrect input based on a user input, the electronic device 101 may switch a currently used screen, which causes inconvenience. For example, although the user selects a particular area of the display 150 of the electronic device 101 in order to scroll the screen, the electronic device 101 may identify particular data corresponding to information included in the corresponding area through analysis of the area selected based on the user and show a list of executable second programs. Accordingly, as a method of preventing the incorrect operation, the electronic device 101 may perform the function only through a particular input type among various input types.

According to an embodiment of the present disclosure, as a method of executing the second program in a particular input type, the electronic device 101 may execute the second program only when particular data is selected by a particular finger. For example, when the search is performed using the first program corresponding to the browser based on the user input, the electronic device 101 may be configured to recognize only an input such as a touch using an index finger as an input intended to select marked particular data according to pre-configuration by the user. One method of distinguishing a particular finger may use finger print recognition through a finger print recognition sensor, which interworks with the display 150 of the electronic device 101; other various methods also can be used to distinguish between fingers. When finger print recognition is used, the electronic device 101 may perform finger print recognition for at least one finger in advance. When selecting particular data, the electronic device 101 may be configured to recognize only selection through an index finger as selection for the particular data. In this case, although the user freely performs an action such as a touch or scrolling by using other fingers including the thumb or middle finger while using the browser, the electronic device 101 does not perform the second program, but may perform a general operation corresponding to the touch or scroll input.

When the user desires to actually select the particular data to execute the second program based on the user input, the electronic device 101 may execute the second program only when detecting the input for selecting the particular data through the index finger. Further, the electronic device 101 may configure functions or particular programs to other fingers as well as the function of executing the second program configured to the index finger. When the ring finger is configured to particular data, the electronic device 101 may perform a message program according to an extended method. In addition, when executing the second program based on particular data selected by a particular finger, the electronic device 101 may perform a security authentication process based on the configured information.

According to an embodiment of the present disclosure, when the electronic device 101 detects a user input for selecting deactivated particular data 1603 in the configured mode (e.g., the kids mode or the guest mode), the electronic device 101 does not execute the second program linked to the particular data 1603 based on the executed mode, but may perform a function of the particular data 1603 based on a particular input. For example, when an operation for selecting the particular data 1603 displayed on the display 150 corresponds to an input (e.g., long press) for performing the configured security authentication process 1601, the electronic device 101 may acquire a finger print of the finger touched on the display 150. The electronic device 101 may compare the acquired finger print information with a finger print in the database. When the acquired finger print matches the finger print information registered as the main user, the electronic device 101 may perform the function of the deactivated particular data 1603 in the kids mode or the guest mode, and execute the predetermined second program.

According to an embodiment of the present disclosure, as another method of executing the second program in a particular input type, the electronic device 101 may execute the second program only when particular data is selected by an input using a hovering. For example, when a phone number is designated as particular data in a state where a note pad is executed as the first program, the electronic device 101 may perform an operation of designating or copying a text area or an operation of moving the screen in response to an input such as a general touch or scrolling, and recognize only an input such as hovering as the selection of the particular data. Accordingly, the electronic device 101 may execute the second program related to the selected particular data through the hovering input. When the number of executable second programs is plural, the electronic device 101 may display the second programs in a list form to allow the user to additionally select the second program.

According to an embodiment of the present disclosure, as another method of executing the second program in a particular input type, the electronic device 101 may determine whether to activate particular data by using a knocking action. The knocking action may be an action for detecting a touch action through a touch panel of the display 150 and/or a vibration having an intensity larger than or equal to an intensity configured to a vibration sensor included in the electronic device 101. When a knocking input is detected, the electronic device 101 may change a mode in response to the detected knocking action. For example, when the browser is executed as the first program, the electronic device 101 may not execute particular data for the analyzed particular data and not perform an operation for executing the second program in spite of user's selection. When knocking is detected, the electronic device 101 may switch the mode of the electronic device 101 to a mode for executing the second program according to a knocking input and execute the second program in response to the particular data and the user's selection for the analyzed particular data. In contrast, when the particular data and the user input for the particular data are activated, the electronic device 101 may switch the state of the particular data to a deactivated state through the knocking operation. The mode changed by the knocking action may include a plurality of modes in connection with the execution of the second program. For example, when the knocking action is detected two times based on the user input, the electronic device 101 may perform an operation of converting the mode into another mode such as the "kids mode" or the "guest mode". In the "kids mode" or the "guest mode", it may be determined that a different user other than the configured main user uses the electronic device 101, and particular data may be deactivated or a selection operation may be deactivated based on the user input.

According to an embodiment of the present disclosure, as another method of executing the second program in a particular input type, the electronic device 101 may use a combination of two or more of the input types. According to an embodiment of the present disclosure, particular data such as a phone number, email, and an address acquired by analyzing content of the electronic device 101 may have one or more executable second programs. By configuring in advance the second program according to each input type instead of an operation for selecting again one of the second programs, which can be additionally selected by the user with respect to the selected particular data, the electronic device 101 may execute the second program through the smaller number of operations. For example, when a phone number is determined as particular data in a browser program, when the particular data is selected through hovering, the electronic device 101 may execute a message program. When the particular data is selected using the index finger, the electronic device 101 may execute a call originating program. The program configuration according to the input type may be changed while the first program is used in the electronic device 101 based on the user input, and some input types may not be used or a new input type may be added. According to the above embodiment of the present disclosure, although the electronic device 101 is configured to execute the message program through the hovering, if the configuration is not intuitive or the hovering input causes user's inconvenience, the configuration may be change through a menu for configuring the input types.

Figure 17:
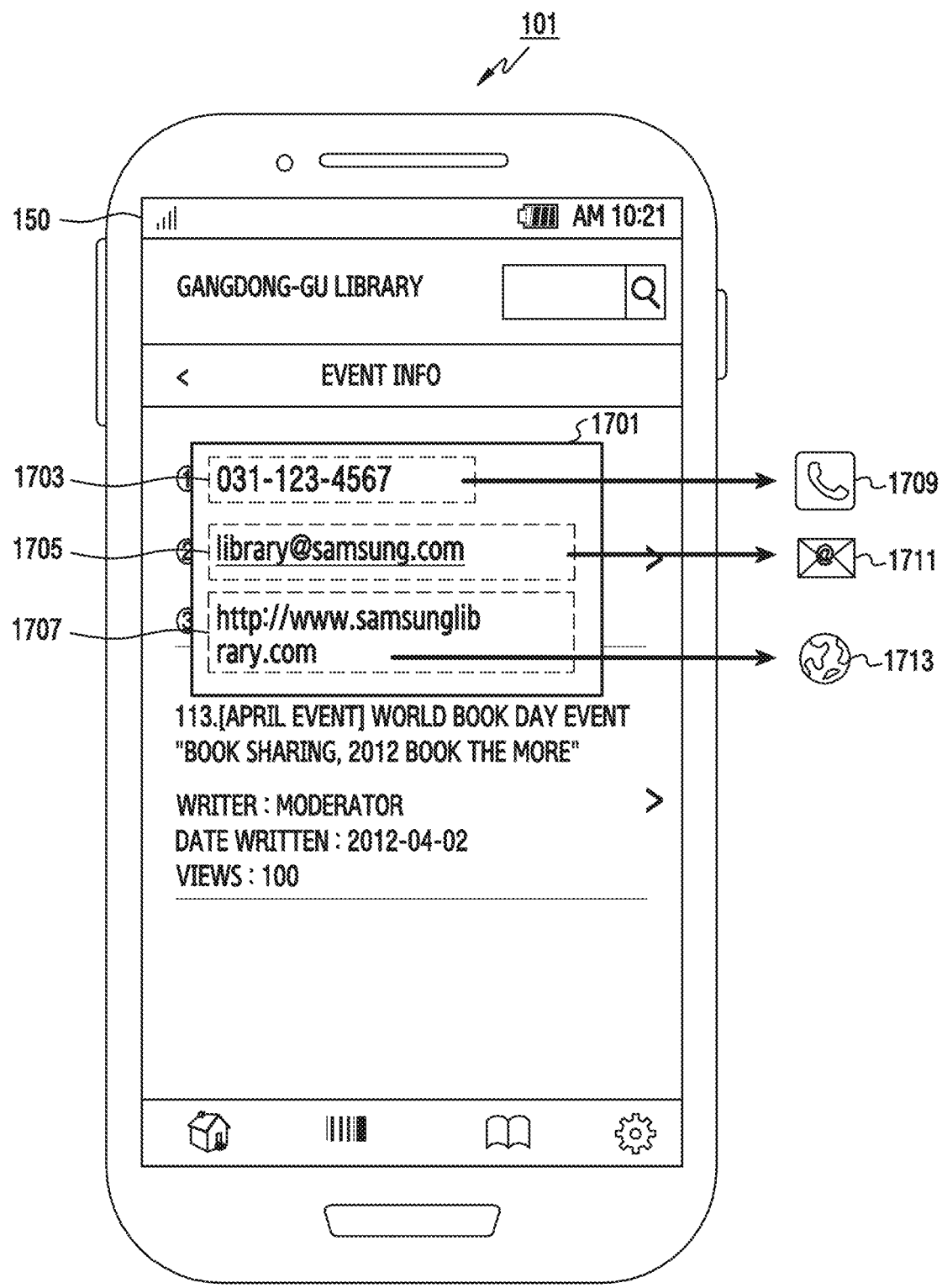
FIG. 17 is a view in which an electronic device performs a predetermined operation based on selected particular data according to an embodiment of the present disclosure.

FIG. 17 is a view in which an electronic device performs a predetermined operation based on selected particular data according to an embodiment of the present disclosure.

Referring to FIG. 17, when one or more pieces of particular data are acquired through analysis in the first program, the electronic device 101 may determine a data value corresponding to each of the particular data. When the electronic device 101 identifies the data value of the particular data, when the second program is executed using the particular data based on a user input, the electronic device 101 may transmit the data value to the second program and use the data value as an input value of the second program. All the data values corresponding to all the pieces of particular data are selected and transmitted, or some of the data values may be selected or automatically selected and transmitted.

According to an embodiment of the present disclosure, as a method of transmitting a plurality of particular data to the second program, the electronic device 101 may transmit a plurality of particular data to one second program. For example, the electronic device 101 may transmit a plurality of phone numbers analyzed in the first program as particular data to a message program corresponding to the second program. The plurality of phone numbers are entered as recipients of messages, and the electronic device 101 may send the messages to the plurality of recipients. Further, the electronic device 101 may transmit two addresses analyzed in the first program as particular data to a navigation program corresponding to the second program. The one transmitted particular data is entered as a starting point and the other transmitted particular data is entered as a destination, and the electronic device 101 may execute the navigation program. When three or more addresses are transmitted, the electronic device 101 may use one address as a stopover as well as the starting point or the destination through various methods. According to an embodiment of the present disclosure, all programs, which require one or more parameters, may be the second program. For example, when a plurality of parameters correspond to phone numbers, the second program may be a program such as a text message service including an SMS or an instant mobile messenger. When the plurality of parameters correspond to email addresses, the second program may be an email program.

As another method of transmitting a plurality of pieces of particular data to the second program, the electronic device 101 may execute the second program corresponding to each data format of each of the plurality of pieces of particular data. For example, the electronic device 101 may acquire one or more particular data through analysis in the first program. When a plurality of data values exist according to the particular data, the electronic device 101 may transmit the data values of the particular data to a plurality of second programs related to the particular data and simultaneously execute the plurality of second programs.

Referring to FIG. 17, the electronic device 101 may analyze content displayed on the display 150 to acquire a phone number 1703, an email address 1705, and/or a URL 1707 and display the acquired information in the form of one list 1701 or two or more lists. The electronic device 101 may select at least one particular data from the displayed list 1701 based on a user input or select particular data designated based on configuration information. The electronic device 101 may execute the second program (e.g., a dialer program 1709, an email program 1711, or a browser program 1713) corresponding to each of the particular data selected from the list 1701. When executing the second program corresponding to each of the plurality of particular data, the electronic device 101 may display one designated program on the display 150 and execute the remaining programs in the background. Alternatively, the electronic device 101 may divide the screen of the display 150 and display the two or more second programs on the divided screens, or may display one designated second program on the display 150 and the remaining second programs on a separate layer (or a popup window).

According to an embodiment of the present disclosure, as a method of transmitting particular data analyzed in the first program to the second program, the electronic device 101 may transmit the particular data in the form of a character string (e.g., text).

For example, when the particular data analyzed in the first program corresponds to information including a character string such as a phone number, email, or an address, the electronic device 101 may directly transmit the information to the second program for executing the particular data and the second program may perform a function suitable for the information. When the user selects a phone number among the particular data analyzed in a browser corresponding to the first program, the electronic device 101 may execute a dialer program as the second program. When the dialer program is executed, the electronic device 101 may also transmit the selected phone number.

According to an embodiment of the present disclosure, when the particular data analyzed in the first program corresponds to the information including the character string as described above, if the number of operations which can be performed using the particular data received by the second program, is one or more, the electronic device 101 may construct the character string by adding a command to be executed in the second program to the particular data. For example, address information among the particular data analyzed in the browser corresponding to the first program is selected based on a user input and thus a navigation program is executed as the second program. It may be difficult for the navigation program to determine whether the received address information is information on a starting point or information on a destination. In this case, the first program may add not only the address information but also information indicating that the transmitted address information is destination information to the character string and transmit the character string to the second program, so that the second program may use the address information as the destination information without any separate determination.

As a method of transmitting particular data analyzed in the first program to the second program, the electronic device 101 may transmit the particular data in the form of an image. For example, when the electronic device 101 identifies an input for moving a serial number of a particular product, which is being output in content of the first program, to the second program, if the serial number is a character string form, the user may directly copy and paste the serial number or transmit the serial number in the character string form, so as to automatically paste the serial number in an input window of the second program. However, when the user desires to transmit a serial number included in multimedia content, such as a particular picture or a moving image, the electronic device 101 may transmit a particular frame of the image or moving image, in which the serial number is being output in the first program, to the second program, output the transmitted image in a part of the screen around the input window in the second program, and input the serial number included in the image into the input window. In this case, the electronic device 101 may fix information on the first program to some areas of the display 150 and move the information to an area, which avoids a main part according to a screen configuration. Further, the electronic device 101 may move the information to a desired location based on a user input or automatically control the location according to a user's input situation. When the second program is executed, the electronic device 101 may deactivate the first program in a translucent state and in the background, and allow the user to move a serial number output in the first program to the second program.

According to an embodiment of the present disclosure, the electronic device 101 may acquire required information through an image search in a storage space such as a database by using the image received from the second program. For example, when a program icon image is received from the first program, the electronic device 101 may acquire an identifier such as program ID for executing another program by using the program icon image. With respect to the installed programs, the electronic device 101 may map and store a main menu icon and program ID that represent each of the programs in the storage space. Accordingly, the electronic device 101 may search for the main menu icon in the storage space through the image received from the second program to recognize the related program ID, and execute another mapped program by using the program ID.

According to an embodiment of the present disclosure, the electronic device 101 may analyze an image of a particular building or landmark as particular data in the first program. When the electronic device 101 executes a map program as the second program through the particular data, the electronic device 101 may transmit the image of the building or landmark to the map program and the second program may display a location corresponding to the building or area on the map through an image search. An operation for searching for an image may be performed the system of the electronic device 101 by itself or by the second program. A module for the image search such as a separate image recognition engine may be used or a function controlled by an external service through the network may be used.

Further, as a method of searching for the image, a pixel-by-pixel scheme may be used. The pixel-by-pixel scheme may compare pixels one by one starting at a particular reference pixel to determine whether two images are similar images.

As another method of searching for the image, an outline of object recognition scheme may be used. The outline of object recognition scheme corresponds to a method of recognizing outlines of objects (e.g., people, animals, buildings, etc.) existing in the image. The outline of object recognition scheme may recognize objects in each of the two images and compare whether a particular object existing in one image exists in the other image or whether locations of the objects are similar to each other, so as to determine whether the two images are similar images.

Further, in order to perform the image search even though scale, rotation, or orientation between images is different, the electronic device 101 may extract feature components, which correspond to descriptor information indicating inherent characteristics, from the images. When the descriptor information is prepared, the electronic device 101 may perform a subwindow search, which is a process for identifying whether a desired icon is included in the input image. When a similarity is within a threshold, the electronic device 101 may determine that the corresponding area includes the desired icon. Such a process may be more accurately performed using a machine learning scheme (cascade booster classifier or support vector machine).

According to an embodiment of the present disclosure, as a method of transmitting particular data analyzed in the first program to the second program, the electronic device 101 may transmit the particular data in the form of a character string. For example, when the first program is a program using a voice such as a phone call program, the electronic device 101 may analyze particular data from information generated by recording, by the user, information guided by a counterpart during the phone call. The electronic device 101 may convert the analyzed particular data into a character string and transmit the character string to the second program to allow the second program to use the character string, but the electronic device 101 may transmit the particular data in the form of voice information if the second program is a voice command program using the voice. For example, when a voice recording program corresponds to the first program and stores information having a destination address to find therein through a previous phone call with a friend, the electronic device 101 may analyze the recorded information to acquire voice information on the destination address as particular data. Then, the electronic device 101 may execute a voice command program as the second program and instruct to configure the destination through the voice information on the received destination address.

Figure 18:
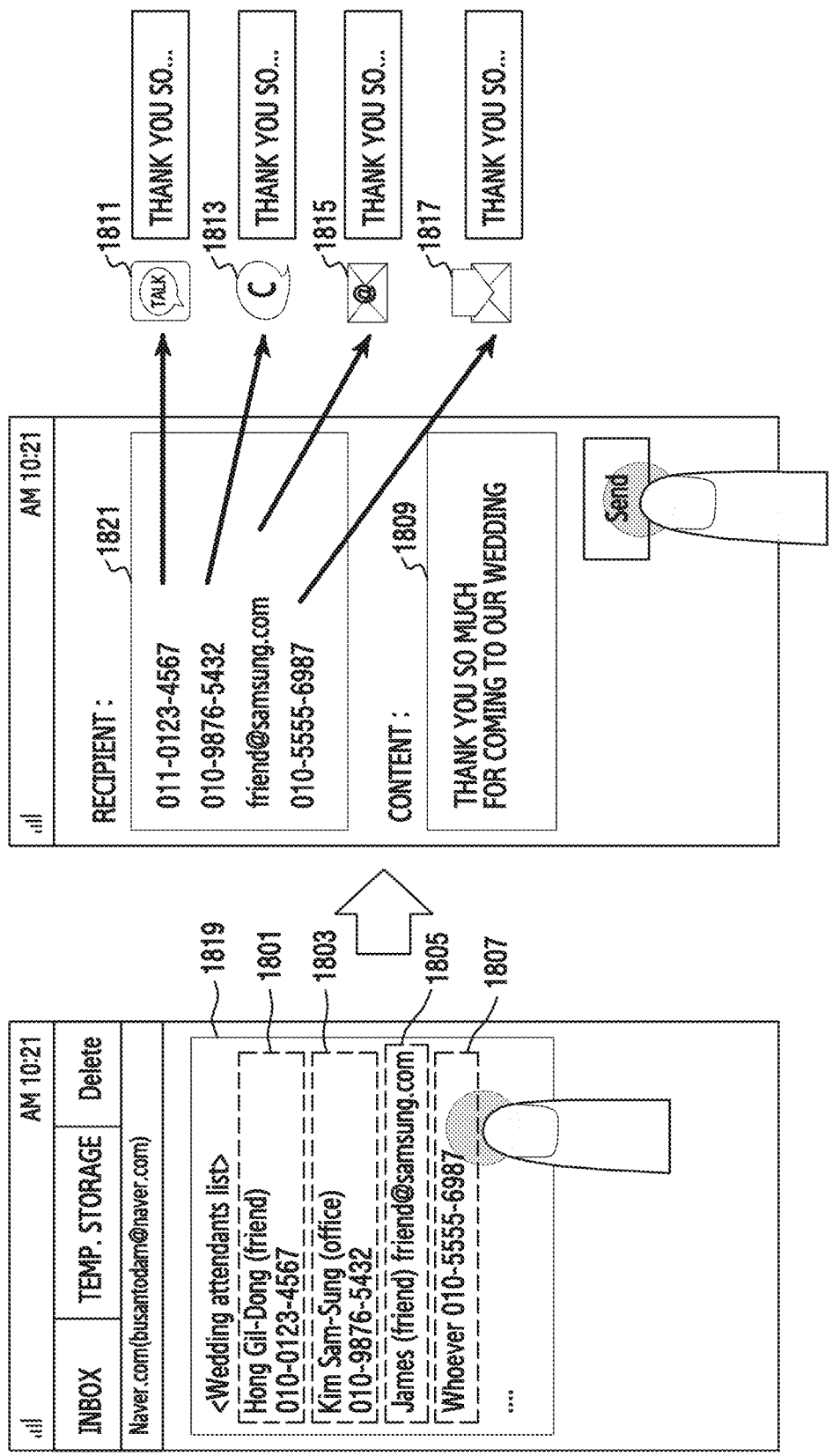
FIG. 18 is a view in which an electronic device performs a predetermined operation based on selected particular data according to an embodiment of the present disclosure.

FIG. 18 is a view in which the electronic device performs a predetermined operation based on selected particular data according to an embodiment of the present disclosure.

Referring to FIG. 18, when performing predetermined operations corresponding to a plurality of particular data selected based on the first program in the second program, the electronic device 101 may reflect data formats and user's usage habits for the plurality of pieces of particular data to execute the second program. According to an embodiment of the present disclosure, when the electronic device 101 receives content (e.g., email) including a plurality of phone numbers and email addresses, the electronic device 101 may perform an analysis operation for acquiring particular data. When the plurality of phone numbers and email addresses are selected, the electronic device 101 may generate a common writing windows (or message writing program). For example, the electronic device 101 may acquire particular data of a phone number 1801 of Hong Gil-Dong, a phone number 1803 of Kim Sam-Sung, an email address 1805 of James, and a phone number 1807 of anyone in the content, and display the acquired particular data in the form of a list 1819 on the display 150. When at least one of the displayed particular data is selected from the list 1819, the electronic device 101 may execute the message writing program. The electronic device 101 may input the selected particular data as recipients 1821 of the message writing program. When the electronic device 101 enters and transmits a message 1809 to a plurality of selected recipients through the message writing program, the electronic device 101 may transmit the same message (message written through the message writing program) through most frequently used programs corresponding to the phone numbers and email addresses. For example, the electronic device 101 may transmit the message 1809 input through Kakao Talk 1811 to the phone number 1801 of Hong Gil-Dong, with whom the user of the electronic device 101 frequently communicates through Kakao Talk 1811; transmit, through ChatOn 1813, the same message 1809 to the phone number 1803 of Kim Sam-Sung with whom the user of the electronic device 101 communicates through ChatOn 1813; transmit the same message 1809 to the email address 1805 of James through the email 1815; and transmit the same message 1809 to a phone number 1807, with which the user of the electronic device 101 has not communicated (a phone number to which the frequently used program is not configured) through the message program 1817.

According to an embodiment of the present disclosure, the electronic device 101 may recognize a plurality of identifiers of the particular data, select a plurality of phone numbers from the selected identifiers, and perform the second program. For example, the electronic device 101 may analyze the content displayed on the display 150 to identify that a plurality of particular data (e.g., phone numbers) are included in the content, mark the plurality of the acquired phone numbers, and display the marked phone numbers on the display 150. The electronic device 101 may select all or some of the plurality of phone numbers based on a user input or configuration information, and execute a predetermined second program and/or perform a predetermined operation based on data formats of the phone numbers such as a messenger/instant mobile messenger.

According to an embodiment of the present disclosure, when a plurality of executable second programs exist in a state where the related second program is not predetermined, the electronic device 101 may display the executable programs and select one of the programs. For example, when particular data corresponds to a phone number and the execution of a message program is pre-defined, the electronic device 101 may designate a plurality of analyzed phone numbers as a plurality of recipients of the message program and directly execute the message program corresponding to the second program. When the second program is not pre-defined, the electronic device 101 may provide programs, which can use a plurality of phone numbers, for example, an SMS/instant mobile messengers, to allow the user to select at least one of the programs. The second program may be a program that can use a plurality of phone numbers, as described above. When particular data corresponds to a phone number, the electronic device 101 may execute a dialer, designate a plurality of selected phone numbers as a plurality of call participants, and perform a multiparty call connection in the dialer corresponding to the second program. Alternatively, the electronic device 101 may make a call connection to phone numbers one by one in a predetermined order (e.g., according to priorities) based on each of the phone numbers, and make a call connection to the next selected phone number automatically or manually after the call connection to one phone number ends. The electronic device 101 may reflect information on whether the call connection is successful in the first program or the screen of the display 150 and display the information in the content.

According to an embodiment of the present disclosure, as another method of recognizing a plurality of identifiers of the particular data and executing the second program by using identifier selected from the recognized identifiers, the electronic device 101 may select a plurality of analyzed email addresses and execute the second program. For example, when a plurality of email addresses are included in the content displayed on the display 150 of the electronic device 101, the electronic device 101 may analyze the content to extract the plurality of email addresses and display the acquired email addresses on the display 150. Further, the electronic device 101 may select all or some of the displayed email addresses and execute the second program such as an email program and/or perform a predetermined operation. When a plurality of executable second programs exists in a state where the related second program is not predetermined, the electronic device 101 may display the executable programs and select one of the programs. For example, when the particular data corresponds to an email address and execution of Gmail is pre-defined based on the email address, the electronic device 101 may designate the plurality of analyzed email addresses as a plurality of recipients of Gmail and execute a Gmail program corresponding to the second program. When the second program is not pre-defined, the electronic device 101 may provide programs, which can use the plurality of phone numbers or email addresses, for example, email programs, to allow the user to select one of the programs. The second program may be a program, which can use a plurality of email addresses, as described above.

According to an embodiment of the present disclosure, the electronic device 101 may acquire one or more pieces of particular data through analysis in the first program. When a plurality of data values exist according to the particular data, the electronic device 101 may transmit the data values of the particular data to a plurality of second programs related to the particular data and simultaneously execute the plurality of second programs. For example, the electronic device 101 may analyze email text to acquire three phone numbers and five email addresses. When the user desires to send the same message to recipients, which correspond to the values, through the second program based on a user input, the electronic device 101 may transmit one or more values to the second program related to the particular data and simultaneously perform desired operations. Further, when editing the same message, the electronic device 101 may use a common composer.

According to an embodiment of the present disclosure, as another method of recognizing a plurality of identifiers of the particular data and executing the second program by using identifier selected from the recognized identifiers, the electronic device 101 may select a plurality of analyzed addresses and execute the second program. For example, when a plurality of addresses are included in the content displayed on the display 150 of the electronic device 101, the electronic device 101 may analyze the content to extract the plurality of addresses and display the extracted addresses on the display 150. Further, the electronic device 101 may select all or some of the displayed addresses and execute the second program such as a map or pathfinding program and/or perform a predetermined operation. When a plurality of executable second programs exist in a state where the related second program is not predetermined, the electronic device 101 may display the executable programs on the display 150 and select one of the programs based on a user input or configuration information. For example, when selecting the map program, the electronic device 101 may display locations corresponding to one or more received addresses. When displaying the locations corresponding to the one or more received addresses, the electronic device 101 may display all the locations on one screen, or display only the location corresponding to one address and display the remaining location through a separate event. The electronic device 101 may display a location corresponding to a previous/next address through a previous/next touch button included in the electronic device 101.

According to an embodiment of the present disclosure, when selecting the pathfinding program, the electronic device 101 may search for a shortest path or an optimal path, through which all locations corresponding to the one or more received addresses can be visited, and display the shortest path or the optimal path on the display 150. The electronic device 101 may store information on the found path. The electronic device 101 may reflect a result of the second program in the first program and display the result in the content. For example, the electronic device 101 may display path information made in the second program in a blank space of the content or through a separate layer or a separate window. When the aforementioned content is called again, the electronic device 101 may provide the pre-stored path information without the need to generate the path information again.

According to an embodiment of the present disclosure, as another method of recognizing a plurality of identifiers of the particular data and executing the second program by using identifiers selected from the recognized identifiers, the electronic device 101 may select a plurality of analyzed dates and execute the second program. For example, when a plurality of dates are included in the content displayed on the display 150 of the electronic device 101, the electronic device 101 may analyze the content to extract the plurality of dates or a date interval and display the extracted dates or date interval on the display 150. Further, the electronic device 101 may select all or some of the displayed dates or date interval and execute the second program such as a calendar program and/or perform a predetermined operation. For example, the electronic device 101 may include information on a particular appointment in the content. For example, when text such as "2014.03.13 15:00, first meeting" and "2014.03.14 16:00, second meeting" are included in the content, the electronic device 101 may select at least one of the two dates based on a user input. The electronic device 101 may execute the calendar program or select at least one of a plurality of other second programs. The electronic device 101 may transmit one or more of the selected dates to the selected second program, and the corresponding second program may display information related to the transmitted dates. The electronic device 101 may display a screen through which a schedule can be input into the corresponding date in the calendar program.

The electronic device 101 may also display the content together with the calendar program on one screen to allow the user to easily copy and paste other texts included in the content. Further, the electronic device 101 may display other schedules included in the corresponding date in the calendar program. The electronic device 101 may reflect a result of the second program in the first program and display the result in the content. When the schedules of the corresponding dates are stored in the calendar program, the electronic device 101 may display a storage result in the content. When the content is called again based on a user input, the electronic device 101 may identify whether the storage is reflected in the existing calendar without re-execution of the calendar program.

According to an embodiment of the present disclosure, as another method of using one or more particular data analyzed in the first program, the electronic device 101 may perform an additional operation using a common editor (or a message writing program) for processing particular data. According to an embodiment of the present disclosure, the common editor may have a similar form to that of a note pad. The electronic device 101 may execute the second program by using the information analyzed through the common editor without changing or editing some of the data and then execute the related second program. For example, in a case of particular data such as a phone number "031-123-4567" acquired through analysis of content processed in the first program, the electronic device 101 may enter the phone number in an editing screen through execution of the common editor and display the phone number on the display 150. Further, through a method of outputting in advance the second program and executing the second program according to a user selection, the electronic device 101 may output candidates of executable second programs based on the phone number in the form of a list or icon.

When the phone number "031-123-4568" is selected based on the user input, the electronic device 101 may allow the user to directly edit the phone number output to the editing window, and may perform an additional operation such as sending a message or making a phone call based on the user input. Further, when a pause or wait function is added according to a predetermined user, the electronic device 101 may add a corresponding symbol through the editor and use the desired second program. In addition, when the phone number is stored in the address book through the common editor, the electronic device 101 may additionally enter a name, an email address, and an address as well as the phone number and execute an address book program, so as to store the information entered through the editor as well as the phone number.

When the second program is executed using the common editor, the electronic device 101 may maintain the common editor without ending the common editor. For example, when the user desires to store the phone number in the common editor in the address book and transmit a message to the phone number based on a user input, the electronic device 101 may maintain the common editor in the background while executing the address book program and/or display the address book program on the display 150 through the list or icon, and thus perform a function of transmitting the message through the common editor after the storage of the address book ends.

Further, when more than one particular data are output to the common editor, the electronic device 101 may select at least one of the particular data and execute the second program. For example, when a plurality of phone numbers are output to the common editor, the electronic device 101 may select some of the phone numbers and transmit text messages to the selected phone numbers, and select some of the phone numbers and transmit mobile instant messages to the selected phone numbers.

According to an embodiment of the present disclosure, when outputting executable second programs related to the data format analyzed in the first program, the electronic device 101 may determine orders of the programs. As the number of installed programs increases, the number of programs that can be executed in a particular data format may also increase, and the programs may include an email program such as a program performing a similar operation as that of Gmail or Samsung Email. As an example of a method of determining the orders of outputting the program in the program list, the electronic device 101 may use an alphabetical order of the program. When the program list includes a lot of items, the user may move between the lists to identify each item if the user may not easily know the reference of the order.

As another method of determining the order of outputting the program in the program list, the electronic device 101 may use the order in the program menu. When generally executing the program based on the user input, since the program is mostly executed through the program menu, the electronic device 101 may easily recognize the order of the program in the program menu unconsciously. Accordingly, when the electronic device 101 generates a list of executable second programs, if the electronic device 101 outputs the second programs according to the order of the program menu, the user may find a desired program easily and conveniently.

As another method of determining the order of outputting the program in the program list, the electronic device 101 may use the correlation between context. Further, when outputting the program list, the electronic device 101 displays the reference of the list order in a part of the list, so that the user may more easily understand the order and the electronic device 101 may allow the user to change the order into an order which the user desires through a UI.

According to an embodiment of the present disclosure, when at least one data format is selected in the first program based on a user input, the electronic device 101 automatically executes a function related to a value of the selected data format in the second program when the second program related to the data format is executed. For example, when the user selects address information from data formats analyzed in the first program, the electronic device 101 may display lists or icons, which can execute an address book program, a map program, and a navigation program related to the address information in some areas of the screen. When the electronic device 101 desires to identify a geographical location of the address information to select the map program as the second program based on the user input, the first program may transmit the address information to the map program in addition to the execution of the map program. The electronic device 101 may display the location on the map through the address information received by the map program and output the location to the user.

However, when the electronic device 101 selects one or more addresses as data formats in the first program based on the user input and selects the map program as the second program, the map program may not determine which address is referred to for displaying location information. In this case, the electronic device 101 may execute the map program based on a first address among the addresses transmitted from the first program. Before the map program is executed or while the map program is executed, the electronic device 101 may allow the user to directly select the address information received by the map program through a list or a selection window, a popup window, or a list window having a similar form to that of the list and then execute the map program based on the address information selected by the user.

According to an embodiment of the present disclosure, when one or more addresses, such as a starting point and a destination, can be input as in a navigation program, the electronic device 101 may execute the program by applying the one or more addresses selected in the first program to the starting point and the destination of the navigation program according to the same order as that in the above embodiment, or the user may directly select the address to be applied to the starting point and the destination of the navigation program before the navigation program is executed or while the navigation program is executed.

Figure 19:
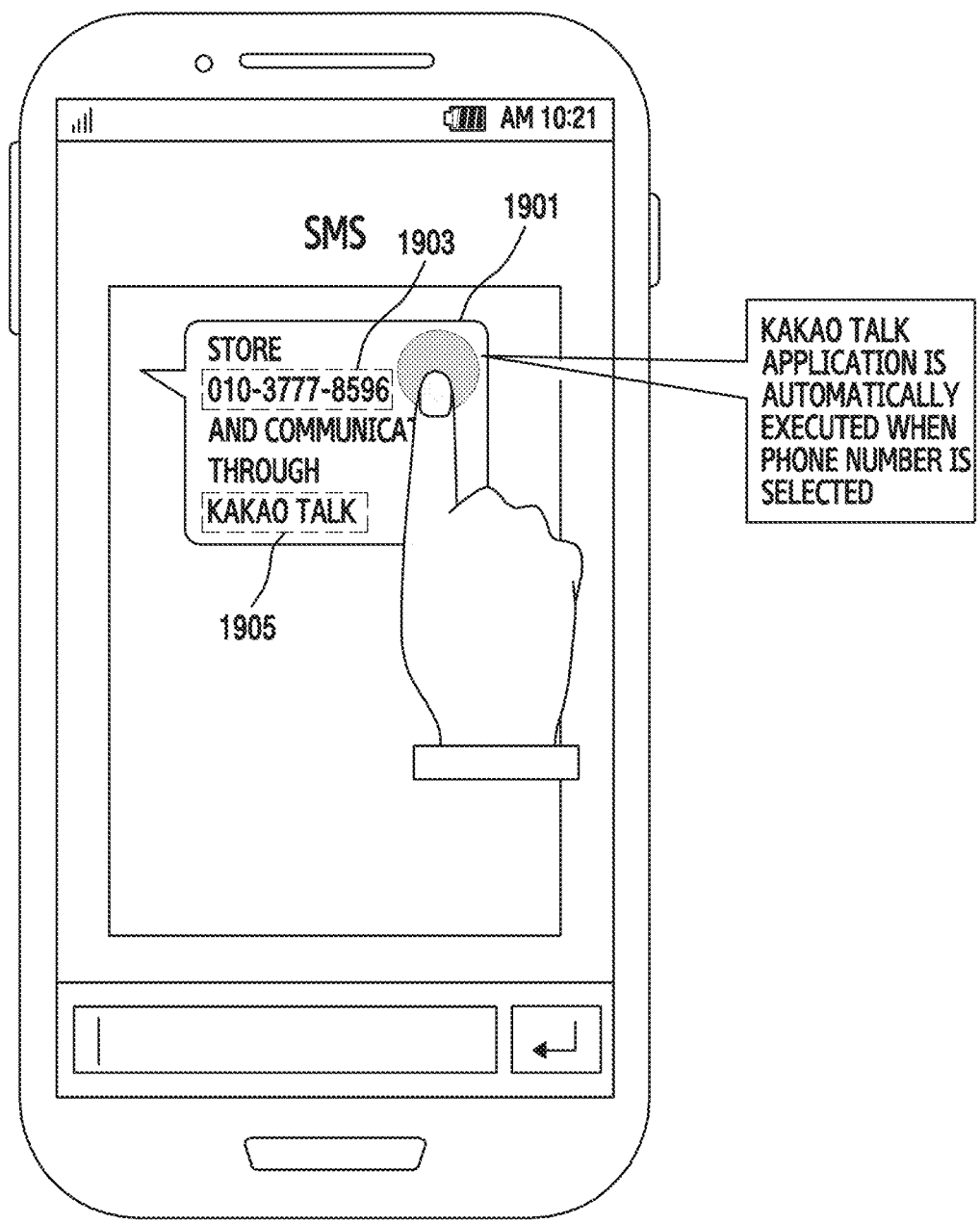
FIG. 19 is a view for determining second programs based on particular data and other particular data selected in an electronic device according to an embodiment of the present disclosure.

FIG. 19 is a view for determining a second program based on particular data and one or more other particular data selected by an electronic device according to an embodiment of the present disclosure.

Referring to FIG. 19, according to an embodiments of the present disclosure, when a plurality of second programs may be executed for particular data selected by the user in the first program, the electronic device 101 may directly execute the second program associated with the particular data when the user selects the particular data in content output by the first program in one method of executing the second program. For example, when the particular data analyzed in the first program includes a phone number, and the phone number is selected based on a user input, the electronic device 101 may execute a dialer program without any separate selection of the second program and send a phone call to the selected phone number, or execute an address book program and store the phone number. According to an embodiment of the present disclosure, the particular data analyzed in the first program includes an address and the address is selected based on a user input, the electronic device 101 may execute a map program and output a location of the selected address in the map, or execute a navigation program and start a path search with the selected address as a destination. In this case, the electronic device 101 may reduce input stages for executing the second program and more conveniently execute the second program.

As a method of selecting the second program, which can be executed using one or more particular data selected based on a user input, without any user input, the electronic device 101 may predict the second program to be executed by the user through context of the selected particular data.

For example, when the electronic device 101 receives a text message including a sentence of "store 010-3777-8596 and communicate through Kakao Talk" 1901, the electronic device 101 may analyze the text message to acquire the phone number 1903 (010-3777-8596) and the program name 1905 (Kakao Talk) from the particular data. When the user selects the phone number, the electronic device 101 combines the program name around the selected phone number and the text "store" to predict that the user would execute "Kakao Talk" with a recipient having the phone number. Accordingly, although the electronic device 101 does not additionally perform a separate operation except for the selection of the phone number based on the user input, the electronic device 101 may automatically execute the second program through "Kakao Talk". Further, when the electronic device 101 cannot search for a user corresponding to the phone number 1903 after the execution of Kakao Talk 1905, the electronic device 101 may perform a process of searching for the phone number 1903 or registering the phone number in a chatting list.

In addition, when the user inputs a message of "Wait, I'll give you the phone number" while executing a mobile messenger (second program) based on a user input and then executes an email program or an address book program (first program) to select the phone number, the electronic device 101 may predict that the user will transmit the phone number stored in the email program or the address book program through the mobile messenger. Accordingly, although the user does not select a separate second program for the phone number selected in the email program or the address book program, the electronic device 101 may automatically paste the selected phone number in a message window of the mobile messenger program. The electronic device 101 may select the second program by using context information, by which the next user operation can be predicted in the program which is currently executed or used. Further, the electronic device 101 may directly execute the program having the highest priority through the method of the context correlation.

Figure 20:
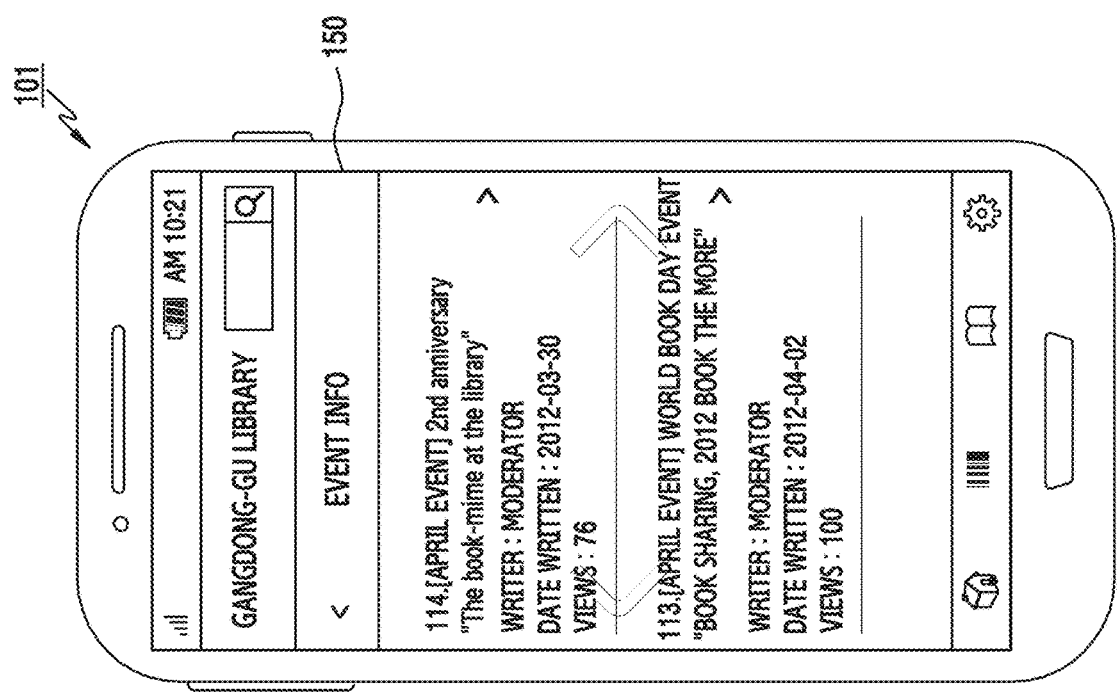
FIG. 20 illustrates an operation in which an electronic device interworks with another electronic device when executing a second program based on particular data according to an embodiment of the present disclosure.
Figure 20:
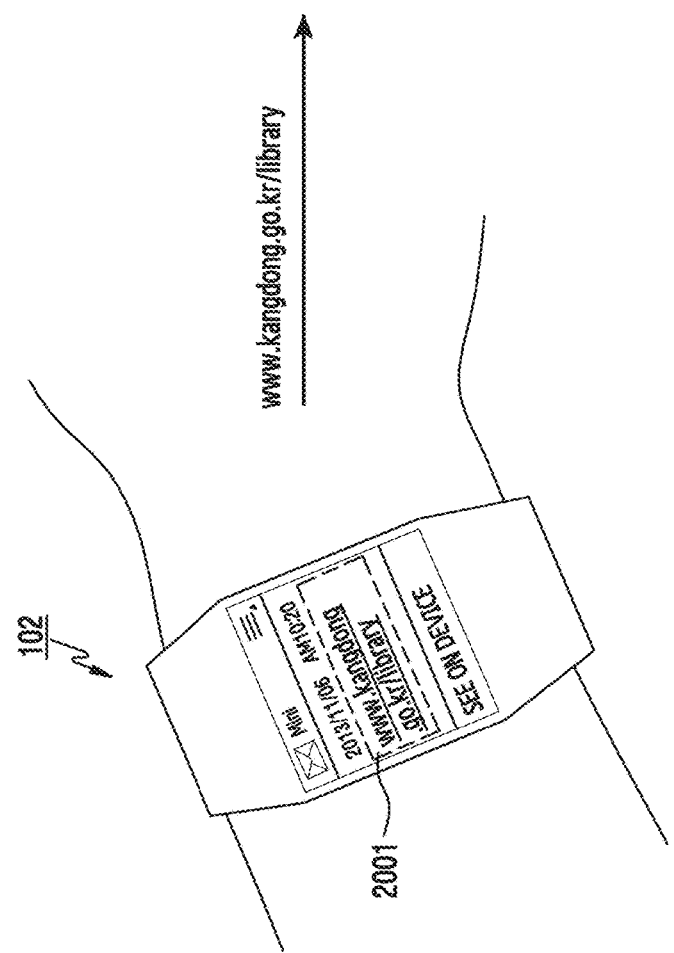

FIG. 20 illustrates an operation in which an electronic device interworks with another electronic device when executing a second program based on particular data according to an embodiment of the present disclosure.

Referring to FIG. 20, when executing the second program in the first program, the electronic device 101 may allow another electronic device (e.g., the electronic device 102) which is one of the neighboring devices to execute the second program while the first program is executed in the electronic device 101. This is to provide convenience without an interruption of work processed during the operation of the electronic device 101, to protect a user's private life, remove a function limitation generated in the electronic device 101, and use larger amounts of available resources without a limit on a capability of the electronic device 101, so as to provide the user with more benefits.

As a communication method between a first device and a second device, the electronic device 101 may use a connection through a cable, a connection through a wired communication technology such as a docking station, or a connection through a wireless communication technology such as BT or Wi-Fi, and further may use a more improved communication technology according to the development of future technologies.

In the execution of the second program in the first program, when the second program is executed in the second device which is one of the neighboring devices (e.g., the electronic device 102) while the first program is executed in the electronic device 101, if the two electronic devices cannot currently communicate with each other, the electronic device 101 may make a control to execute the second program after making communication therebetween possible through a connection operation.

Further, when determining an operation performed based on a user input, the electronic device 101 may predefine the operation based on a user input or may allow the operation to be determined when an object recognized as the second device is selected.

According to an embodiment of the present disclosure, as a method of executing the second program in the electronic device 102 which is one of the neighboring devices of the electronic device 101 while the first program is executed in the electronic device 101, the electronic device 101 may analyze one or more content such as a website, an SMS, or a picture to acquire a phone number as particular data. When the operation performed based on a user input is determined as call origination, the electronic device 101 may transmit a call origination command to the electronic device 102 together with the phone number and make a request for performing a call origination operation in the second device.

For example, the electronic device 101 for performing the aforementioned embodiment of the present disclosure may be a smart phone, and the electronic device 102 may be a wearable device (e.g., a smart watch). When the user selects particular data corresponding to a phone number in one or more content displayed on the display 150 during the use of a gallery program while a web browsing or SMS program is executed, the electronic device 101 may make a request for sending a call to electronic device 102 through the selected phone number in a state where the screen of the browsing, SMS, or gallery program executed in the first device is maintained, and may perform a call origination operation in a state where the first program is not stopped or interrupted. Further, the electronic device 101 and the electronic device 102 may perform an operation opposite to the aforementioned operation, and may perform the aforementioned operation when the electronic device 101 is a smart phone and the electronic device 102 is a wearable device (e.g., a smart watch).

Hereinafter, referring to FIG. 20, the electronic device 101 or the electronic device 102 may be one of a smart phone, a wearable device (e.g., a smart watch, smart glasses, or a smart band). However, the present disclosure is not limited thereto, and it is apparent that various devices can be applied. Various embodiments thereof will be described below. Unless there is a special mention, the electronic device 101 may be a smart phone.

According to an embodiment of the present disclosure, the electronic device 101 may receive information making a request for displaying particular data (e.g., a URL 2001) analyzed in the content displayed on the electronic device 102 from the electronic device 102. The electronic device 101 may determine a web browser as the second program based on the received URL 2001, and access the received URL 2001 through the web browser and display information corresponding to the URL 2001 on the display 150.

The electronic device 102 may also be a car kit. When the electronic device 101 sends a call to a predetermined phone number acquired through an analysis operation during a search for a destination through the electronic device based on a user input and starts the call, the electronic device 101 may perform a connection with a car kit without stopping the operation of the electronic device 101 during the operation of selecting particular data, so that the user may select a call origination command and immediately starts driving.

According to an embodiment of the present disclosure, as another method of executing the second program in the second device which is one of the neighboring devices of the first device while the first program is executed in the first device, the electronic device 101 may analyze content such as a website, SMS, or picture to acquire a place name or an address as particular data. When a place name or address search is performed based on a user input, the electronic device 101 may make a request for performing a destination search through the electronic device 102 such as a car navigation device as well as the place name or address search and control the electronic device 102 to perform a search operation. When the electronic device 101 does not know about accurate information to be used for a navigation input such as an address or a phone number of a destination, the user may perform a search function through the electronic device 101 and a search result of the portable electronic device 101 may be immediately input without a direct input into the navigation device by the user. Further, when there is a fellow passenger in addition to a driver, the electronic device 101 may make a request for transmitting a search result generated using an electronic device 104 of the fellow passenger to the navigation device, and thus the driver does not need to use the electronic device 101 like the call origination through the car kit and the fellow passenger does not need to input the search result, which reduces cumbersomeness.

According to an embodiment of the present disclosure, as another method of executing the second program in the electronic device 102 which is one of the neighboring devices of the electronic device 101 while the first program is executed, when the electronic device 101 may analyze content such as a website, SMS, or picture to acquire text as particular data, the electronic device 101 may make a request for an operation for transmitting and reading (text to speech (TTS)) the selected text to the electronic device 102 based on a user input. Further, the electronic device 101 may also make a request for performing the reading function (TTS) by using an electronic device having an output function such as a speaker based on a user input. In this case, the electronic device 101 may perform the first program such as the browser, SMS, or gallery, which is being used, without waiting until the reading function (TTS) ends in the portable electronic device 101 in order to use the browsing or SMS of the first program.

Further, the electronic device 101 may make a request for storing information transmitted to the second device for the reading function (TTS) in the electronic device 102. When the information corresponds to particular image data or words for a pre-search, the information stored in the electronic device 102 may be easily converted into the form such as an image album or a word book to be used, and the predetermined information may be transmitted to the electronic device 101 based on a request of the electronic device 101.

According to an embodiment of the present disclosure, as another method of executing the second program in the electronic device 102 which is one of the neighboring devices of the electronic device 101 while the first program is executed in the electronic device 102, when the electronic device 101 may analyze content such as a website, SMS, or picture to acquire text as particular data, the electronic device 101 may transmit a browser search request to the electronic device 102 together with a request using the selected text as a search word based on the user input and make a control to perform a browser search operation in the electronic device 102. The electronic device 102 may be a smart phone, a TV, a monitor, or a projector, which can make a display and communicate with the electronic device 101. The electronic device 101 may maintain a previous operation such as continuing browsing in a state where the screen shown before text is selected is maintained. By displaying information on a device, which has a relatively larger screen than the electronic device 101 or is specified to a display function, the browser search function may be more conveniently performed rather than using the electronic device 101. For example, the electronic device 101 may be a wearable device (e.g., a smart watch), and the electronic device 102 may be a smart phone. For example, the electronic device 101 may process the URL 2001 received from the wearable device and display the processed information on the display 150 or transmit the information to a device which is relatively more suitable for web browsing or display such as a TV to perform an operation. When the electronic device 101 desires to share a particular search result, the electronic device 101 may determine a large display device such as a TV and make a request for displaying the URL 2001 received from the wearable device on the large display device through the web browser. Further, the electronic device 101 and the electronic device 102 may perform an operation opposite to the aforementioned operation, and may perform the aforementioned operation in a state where the electronic device 101 is a smart phone and the electronic device 102 is a wearable device (e.g., a smart watch).

In addition, the second device may be one or more devices. For example, when the user is together with friends or family in a state where there is no common display device such as a TV or a monitor or has a simple meeting, the user may simultaneously share a browser search result by using the second devices 102 such as a smart phone or a tablet PC with the people.

According to an embodiment of the present disclosure, as another method of executing the second program in the second device which is one of the neighboring devices of the electronic device 101 while the first program is executed in the electronic device 101, when particular data analyzed in the electronic device 101 corresponds to a text document, a figure, a design drawing, an image, or a link thereon, if an operation performed based on a user input from the selected particular data is a printing operation, the electronic device 101 may transmit particular data to be output and an output command to the electronic device 102 which can make the output such as a printer and make a request for performing the output operation.

Further, the electronic device 101 may be a smart phone, and the electronic device 102 which can make an output may be a 3D printer. When the particular data analyzed in the electronic device 101 is a 3D printer drawing, a design drawing, a 3D image, or a link thereon, and an operation which the user desires to perform from the selected particular data is a 3D printing operation, the electronic device 101 may transmit data to be output and an output command to the 3D printer to perform the output operation. Although original data of the 3D printer drawing, the design drawing, or the 3D image may be 3D data, the original data may be a result of the performance of a task such as 3D rendering using one or more 2D images possessed in the first device. Further, when the second device such as the 3D printer receives the selected data and executes the program for the 3D output, the second device may perform an additional configuration such as the size, color, material quality, or effect as necessary.

According to an embodiment of the present disclosure, when executing the second program in the first program, the electronic device 101 may execute a predetermined function in another electronic device and a program based on a user input while the first program is executed. As a method of determining a device suitable for performing the function, when the electronic device 101 cannot perform the function based on a user input but the electronic device 102 can perform the function, the electronic device 101 makes a request for providing the function which the user desires to perform through the second program of the electronic device 102. For example, the electronic device 101 may analyze content through a browser search to acquire a phone number as particular data in a state where a call origination function is limited such as in a tablet PC. When an operation to be performed based on a user input is the call origination operation, the electronic device 101 may execute the second program for performing a call function through the second device, which can send the call, and make a request for performing the call origination function through the selected phone number since the call origination is limited in the electronic device 101. The electronic device 101 may provide a more expanded function through the second device regardless of the function, which can be performed by the electronic device 101.

According to an embodiment of the present disclosure, as another method of determining the device suitable for performing the function, if both the electronic device 101 and the electronic device 102 can perform the function determined to be performed based on the user input, the corresponding function may be performed through the device most suitable for the function. For example, when the electronic device 101 is a wearable device and an operation to be performed for the first program of the electronic device 101 based on a user input is determined as a browser search, the electronic device 101 may determine the electronic device 102 having rich resources including a larger screen than the electronic device 101 having a limited capability including a small screen, such as the portable electronic device 101, tablet PC, car kit, or display device (e.g., TV), and make a request for performing the function to the determined device. When determining the device suitable for the function, the electronic device 101 may compare a character of the function to be performed with capabilities and resources of each device to automatically determine the device based on a user input or according to configuration information.

According to an embodiment of the present disclosure, as the method of determining the device suitable for the function, the electronic device 101 may determine the device according to physical restriction matters such as the functions or resources of the electronic device like in the aforementioned embodiment. However, the electronic device 101 may also determine the device based on preference such a user's taste on the basis of configuration information, a database, or log information, the existence of sensitivity of information such as personal information, a user's past use pattern, the existence of occurrence of costs according to the use of resources, accessibility or usability according to a location of each device, and statistical, logical/illogical, or environmental restrictions such as a location or behavior pattern of the user. Further, additional applications can be made according to user feedback based on a combination or result of the restriction matters.

According to an embodiment of the present disclosure, as a method of determining the electronic device, the electronic device 101 may determine the device to perform the second program according to a user preference or a past usage pattern. For example, when the electronic device 101 uses a call function through a found phone number, the electronic device 101 may perform the call function through a device according to a user preference among various electronic devices 102 such as a personal portable device, a car kit, and a wearable device according to pre-configured information or a typical usage pattern of the user. The call origination function may be supported by the first device, or may be more suitable for wearable devices closely worn on the user. However, when a car kit is configured as the electronic device 102 for the call origination while the user is driving, the user may perform the call origination function by using the car kit. When the user usually makes a call by using a speaker phone, the device which the user usually uses as the speaker phone is configured as the electronic device 102 instead of the electronic device 101 or the wearable device through the pattern, and the call origination function may be performed using the electronic device 102.

According to an embodiment of the present disclosure, as a method of determining the device, the electronic device 101 may determine the device to perform the second program according to sensitivity of information such as personal information. When information extracted from the first program is information requiring protection for one's private life, the electronic device 101 may determine the electronic device 102 from personal portable equipment or secured devices in order to not disclose extraction information of the electronic device 102 executing the first program and the second program of the electronic device 102 to the public. For example, in consideration of only display suitability of the information extracted from an information area such as a webpage, an email, a message, or a picture related to personal information, which is private and requiring protection, selectively executing the second program from the second device such as the wearable device in order to keep and not disclose a secret to the public according to a characteristic thereof is more suitable rather than using a device such as TV.

According to an embodiment of the present disclosure, as a method of determining the device, the electronic device 101 may determine the device to perform the second program according to accessibility or usability based on a location of each electronic device. For example, the electronic device 101 may be an electronic device possessed by a driver or a fellow passenger in a driven car. When the electronic device 101 searches for a store name of the store through a browser search and performs a map finding function for the found address, the electronic device 101 may determine to perform a map program corresponding to the second program in the electronic device 102, which makes access and use possible and is stability guaranteed such as a front display device including a navigation device or a head-up display (HUD) within the car rather than in the electronic device 101. Further, when the user uses the second program with people who participate in a meeting in a place such as a conference room, the electronic device 101 may make a request for performing the second program in the electronic device 102 such as a display in the conference room.

According to an embodiment of the present disclosure, as another method of determining the device, the electronic device 101 may determine the device to perform the second program according to whether costs are generated based on the use of resources. For example, the electronic device 101 may detect a function requiring a large amount of communication in the first program using a charged communication network. When the corresponding function is performed, the electronic device 101 may perform the function through another electronic device (e.g., the electronic device 102), which consumes a small cost for the corresponding function or the second program. The costs are not limited to a monetary meaning, and various references such as usage efficiency of the device, energy consumption, capability, or time required for performing the function according to usability may be applied. For example, the call origination may be directly performed by the electronic device 101 or performing the call origination by using one of the wearable devices performing network communication with the electronic device 101 in a state where the wearable device is worn on the user may be more effective. However, when the no charge calls of the electronic device 101 and the wearable devices are all exhausted and thus costs are generated, the call origination function may be performed using another electronic device having a remaining amount of no charge calls. Further, when the electronic device 101 has little power, if a task through a message or email is performed, consumption of power of the electronic device 101 may be reduced by performing an additional function for executing a browser search for analyzed particular data, a related document, or a moving image by using the electronic device 102 having more power.

According to an embodiment of the present disclosure, as another method of determining the device, the electronic device 101 may determine the device to perform the second program according to a location or behavior pattern of the user. For example, when the electronic device 101 searches for a phone number based on a user input in a driven car and uses a call function through the corresponding phone number, the electronic device 101 may perform the call function through a device such as a car kit within the car in determining the electronic device 102. However, when there is a VIP or a fellow passenger within the car or the user is in a particular situation such as listening to music or watching an image by using a sound or image device within the car, the electronic device 101 may make a request for performing a function by using personal portable equipment such as a wearable device connected to the electronic device 101. Such a situation may be determined according to a location of each user, a behavior pattern from a human engineering viewpoint, or context information such as neighboring device information.

According to an embodiment of the present disclosure, the electronic device 101 executes the second program in the first program based on a user input but an interrupt of the second program may be generated during the operation of the first program. If the electronic device 101 does not want the operation of the first program to be disturbed (stopped) by the execution of the second program, the electronic device 101 may make a request for performing the second program in the electronic device 102 while maintaining the operation of the first program executed in the electronic device 101.

According to an embodiment of the present disclosure, according to an embodiment in which the execution of the second program is generated during the operation of the first program, when the electronic device 101 receives a call or interrupt of a message, email, alarm, or notification is generated during a navigation operation in the first device, the electronic device 101 may make a request for performing identification of call reception or various notifications to the electronic device 102 such as a wearable device or a car kit, which can identify the call or the notification, as an operation for not stopping the navigation operation performed in the electronic device 101, and may continue to perform the navigation operation.

According to an embodiment of the present disclosure, as another method when the interrupt of the second program is generated during the operation of the first program, when the electronic device 101 receives a call or interrupt of a message, email, alarm, or notification is generated in a state where the electronic device 101 performs the first program such as the reproduction of a game, music, and moving image, the electronic device 101 may make a request for performing identification of the call or the notification to the electronic device 102 such as a wearable device or a neighboring tablet PC, which can identify the call or the notification, in order to not temporarily stop the first program, and may continue to perform the first program executed in the electronic device 101.

According to an embodiment of the present disclosure, as a method of selecting particular data in the first program, when the electronic device 101 displays second programs, which can be executed as analyzed particular data, in some area of the screen of the first program and the user selects a desired second program, the electronic device 101 may designate a particular data related to the second program to allow the user to select the second program based on a user input. For example, when the first program is a browser, the electronic device 101 may analyze a phone number, email, or an address as particular data, and may display a call origination, message, email, and map programs, which are executable second programs, in one side of the browser screen in the form of an icon or a character string. When the icon or character string for the call origination program is selected based on a user input, the electronic device 101 may allow the user to recognize only phone numbers among the particular data such as the analyzed phone number, email, and address in the browser. The electronic device 101 may allow the phone numbers to be selected based on the user input or display the phone numbers on the display 150 in the form of a list, so as to select one of the phone numbers based on the user input and perform call origination.

According to an embodiment of the present disclosure, when the amount of particular data displayed on the display 150 through the first program is excessively large, if the designation for user recognition is made in the particular data, the electronic device 101 may provide a confusing screen. Further, the electronic device 101 may execute an unintended second program based on a user input such as a touch on a surrounding area of the particular data.

The electronic device 101 may perform an operation corresponding to a user intention with respect to the execution of the second program by selecting an icon or character string related to the second program by the user through the aforementioned method, and may display the particular data on the display 150 in a clear state by marking the particular data related to the selected second program.

According to an embodiment of the present disclosure, as another method using one or more particular data analyzed in the first program, the electronic device 101 may execute the second program by using a plurality of windows. According to an embodiment of the present disclosure, the electronic device 101 may additionally generate one or more windows to simultaneously perform operations for executing the second programs while maintaining the operation of the first program analyzing the particular data. For example, when the electronic device 101 uses web surfing through the browser program as the first program, the electronic device 101 may perform an operation such as storing or sending the particular data while maintaining the browser program, which is currently executed, rather than changing the screen to the second program in order to perform the operation for storing or sending the particular data. Accordingly, in this case, the electronic device 101 may newly generate a separate window besides a window for outputting the browser program, so as to execute the second program.

According to an embodiment of the present disclosure, the electronic device 101 may additionally generate one or more windows to simultaneously perform operations for executing a plurality of second programs. For example, when the electronic device 101 searches for a restaurant through the browser program, if the analyzed particular data includes a restaurant phone number and address, the electronic device 101 may generate two windows, execute a message program in one window to transmit the restaurant phone number and address to a friend, and execute a map program using the address in the other window to display a location of the restaurant.

According to an embodiment of the present disclosure, the electronic device 101 may control the size of the additionally generated window to be the same as the size of the window in which the first program is executed, or may control the sizes to be different from each other according to a characteristic of the program. For example, the electronic device 101 may make the size of the message program just large enough to transmit the restaurant phone number and address to the friend and make the size of the map program as large as possible in the remaining areas of the display 150 to increase usability.

According to an embodiment of the present disclosure, the electronic device 101 overlaps areas of the existing window and the newly generated window, or overlaps the window of the first program on the window of the second program and vice versa. For example, the electronic device 101 may display the window of the map program in the entire screen of the display 150 and overlap the window of the message program on the window of the map program. The electronic device 101 may control transparency of the window of the message program based on a user input and maintain the usability of the map program hidden by the message program. Further, the electronic device 101 may freely move locations of some windows as necessary.

According to an embodiment of the present disclosure, when the electronic device 101 directly executes the second program with respect to the selected particular data, a problem may occur. For example, although the user desires to execute a dialer program by selecting a phone number as particular data based on a user input without storing the phone number in an address book or simply extract and copy a character string from content of the first program, a related second program, which the user does not intend to execute, may be executed.

As described above, in case of the unintended execution of the second program, the electronic device 101 may output a menu for identifying whether the currently executed second program is a program the user intends to execute in at least one part of the screen of the executed second program. When the user does not intend to execute the second program, the electronic device 101 may output a list of other alternative second programs to allow the user to easily switch the second program to another second program in a state where the unintended second program has been already executed.

The electronic device 101 may translucently output the second programs or make the second programs disappear when a predetermined time passes. The electronic device 101 may manually change locations of the second programs according to a user input or automatically change the locations of the second programs in order not to interrupt the user input. Further, when the user does not intend to execute the second program and thus the user selects and executes one of the other output second programs, the electronic device 101 may store situations at the time points. When the electronic device executes the second program in the same situation, the electronic device 101 may reflect the situation to a reference for automatically selecting the second program.

According to an embodiment of the present disclosure, as another method of executing the second program when there are a plurality of executable second programs with respect to particular data selected by the user in the first program, the electronic device 101 may output in advance information on the executable second programs related to the selected particular data on the screen and select and execute the second program based on a user input.

According to an embodiment of the present disclosure, as a method of outputting executable second programs related to particular data analyzed in the first program, the electronic device 101 may generally output all or some of the programs in the form of a list. The list may include text, images such as icons, or various elements such as combination of text and icons. The elements of the list may be arranged in a line, in a grid pattern, or in no particular pattern.

Content of the first program may include various types of particular data. For example, when the electronic device 101 receives email from a counterpart (e.g., the electronic device 102) through the first program (e.g., an email program), the email may include a phone number, an email address of a third party, an address, SNS account information, and a URL. When analysis for the email content is completed, the electronic device 101 may mark particular data to allow the user to recognize the selectable particular data.

When at least one of the marked particular data is selected based on a user input, the electronic device 101 may display some or all of the executable second programs related to the selected particular data and allow the user to re-select the second program to be executed. When a phone number and address information within the email are designated as particular data and the user selects the phone number, the electronic device 101 may output a dialer program, a message program, and an address program, which are related to the phone number, in a part or entirety of the screen in the form of a list or icon, and the user may select one of the programs to execute the second program.

The electronic device 101 may display some or all of the executable second programs related to the respective particular data without selection of particular data based on a user input and provide the second programs to allow the user to re-select the second program to be executed. When the phone number and the address information within the email are analyzed as the particular data, the electronic device 101 may output the dialer program, the message program, and the address book program, which are related to the phone number, and a map program and a navigation program, which are related to the address information, in the part or entirety of the screen currently output on the display 150 in the form or the list or icon, and the user may select at least one of the programs based on a user input to execute the second program.

As another method of outputting the executable second programs related to the particular data analyzed in the first program, the electronic device 101 may output only one or a predetermined number (or number of times) of icons of the programs having a highest execution possibility in a part of the screen such as a menu bar in the first program, and thus make a control to minimize the inconvenience of reducing the screen size when using the first program. When the second program to be executed is not the program related to the currently output icon, the electronic device 101 may output lists of icons of all the executable second programs related to the particular data through the menu such as more views and execute the second program based on user selection.

As another method of outputting the executable second programs related to the particular data, the electronic device 101 may overlap the related program list with the screen of the first program through a separate layer without allocation of a part of the screen of the first program. The electronic device 101 may control the overlapping program list in an opaque state, or may control the overlapping program list in a translucent or transparent state to provide the screen of the first program and remove an inconvenience in use by the user. When controlling a transparency degree of the program list, the electronic device 101 may determine the transparency degree of the program list according to a predefined value, and the user may control the transparency degree in a state where the program list is output. Further, when the electronic device 101 overlaps the related program list with the existing screen, the electronic device 101 may not only place the program list on a fixed area of the screen but also move the location of the program list as necessary. As a method of moving the location of the program list, the user may directly select the corresponding program list by using a finger, a pointing device, or a direction key to move the program list to a desired location based on a user input, or the electronic device 101 may detect a location, which is not a main part of the display 150 (e.g., a menu bar), and automatically move the program list to the detected location. Further, the electronic device 101 may detect a location of the user's finger or the pointing device through the display 150, determine a location at which the user looks, and place the program list to automatically avoid the user's finger or the pointing device not to interrupt the user's sight.

Figure 21:
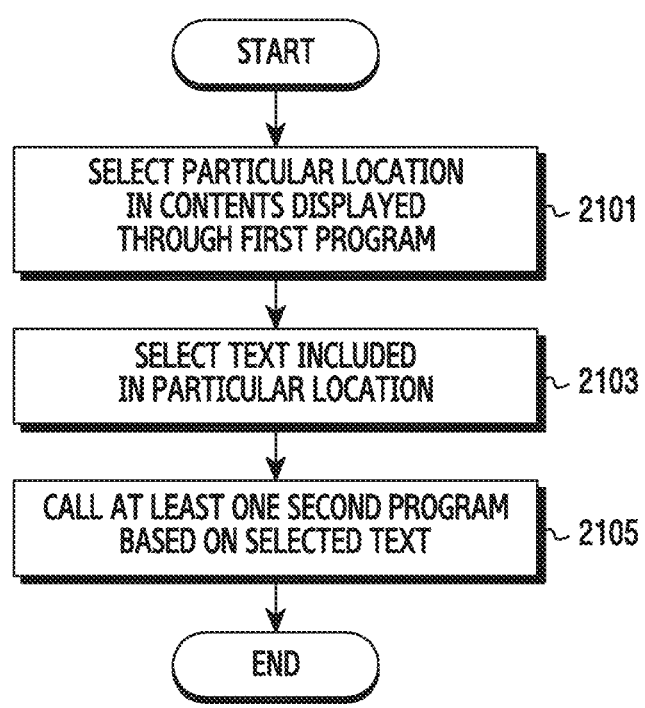
FIG. 21 is a flowchart illustrating an operation in which an electronic device calls a second program through a first program based on selected particular data according to an embodiment of the present disclosure.

FIG. 21 is a flowchart illustrating an operation in which an electronic device calls the second program through the first program based on selected particular data according to an embodiment of the present disclosure.

Referring to FIG. 21, at operation 2101, the electronic device 101 may select a particular location of content displayed on the display 150 through the first program. According to an embodiment of the present disclosure, the electronic device 101 may select a particular image or particular text in the content displayed on the display 150 based on a user input. The content displayed on the display 150 of the electronic device 101 may be a combination of one or more of a still image, a moving image, text, audio data, and a link. Although it has been described that the electronic device 101 selects a location of the content displayed on the display 150 where particular text is displayed, the present disclosure is not limited thereto and it is apparent that various objects such as a particular image, an icon, and a link can be selected.

In operation 2103, the electronic device 101 may acquire text corresponding to a selected location. According to an embodiment of the present disclosure, the text acquired by the electronic device 101 may be text included in the selected particular location of the content displayed on the display 150 in operation 2101. In order to identify the text, the electronic device 101 may perform an operation for analyzing the content displayed on the display 150. Through the analysis of the content, the electronic device 101 may extract text included in the content, identify the extracted text based on a predetermined data format, and determine the text as at least one second program, which can be processed, based on the identified text and the data format of the text. The text extracted based on the analysis operation may have various forms such as character strings, symbols, letters, and numbers.

In operation 2105, the electronic device 101 may call the predetermined second program corresponding to the selected text. According to an embodiment of the present disclosure, the number of second programs which can process the data based on the selected text may be one or more. The electronic device 101 may display at least one program among a plurality of second programs on the display 150 based on configuration information and call the selected second program based on a user input. Alternatively, when determining a plurality of second programs based on the selected text, the electronic device 101 may determine a priority based on configuration information and call the program having the highest priority or the program having a predetermined priority.

Figure 22:
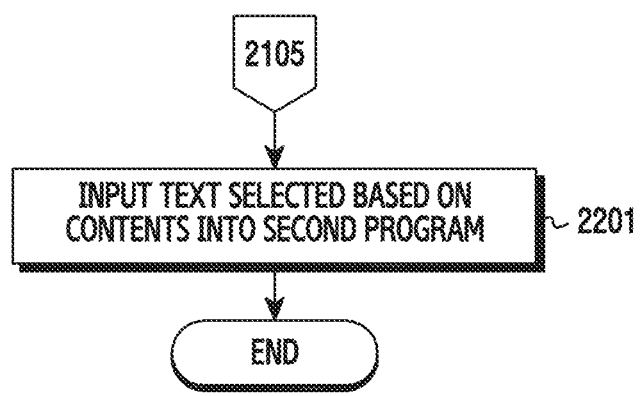
FIG. 22 is a flowchart illustrating a predetermined operation based on a second program called by an electronic device according to an embodiment of the present disclosure.

FIG. 22 is a flowchart illustrating a predetermined operation based on the second program called by an electronic device according to an embodiment of the present disclosure.

Referring to FIG. 22, at operation 2201, when the electronic device 101 calls the second program, the electronic device 101 may perform a predetermined operation based on particular data calling the second program. According to an embodiment of the present disclosure, the electronic device 101 may use the particular data calling the second program as input data. For example, when a phone number is selected as the particular data, the electronic device 101 may call a dialer program as the second program and connect a call through the phone number corresponding to the selected particular data based on the dialer program. According to an embodiment of the present disclosure, the selected particular data may be a store name or location address, and the electronic device 101 may call a navigation program as the second program. The electronic device 101 may input the store name or address, which is the particular data calling the navigation program, as a starting point, a destination, or a stopover in the navigation program. In execution of operation 2201 by the electronic device 101, operation 2201 may be an operation after operation 2105 of FIG. 21 in which the second program corresponding to the selected text is called.

Figure 23:
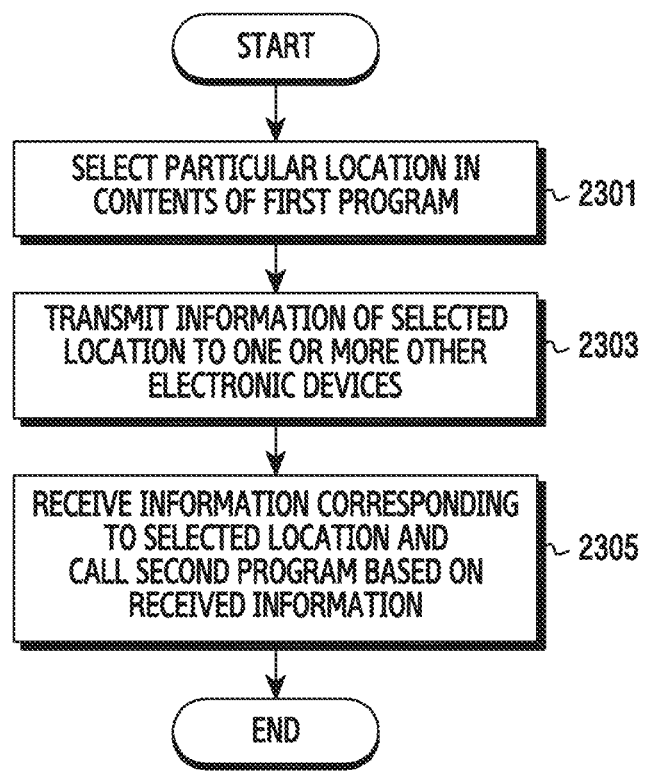
FIG. 23 is a flowchart illustrating an operation in which an electronic device receives information corresponding to a selected location in content of a first program from another electronic device and provides the received information according to an embodiment of the present disclosure.

FIG. 23 is a flowchart illustrating an operation in which an electronic device receives information corresponding to a selected location in content of a first program from another electronic device and provides the received information according to an embodiment of the present disclosure.

Referring to FIG. 23, at operation 2301, the electronic device 101 may select a particular location of content displayed on the display 150 through the first program. According to an embodiment of the present disclosure, the electronic device 101 may select a particular image or particular text in the content displayed on the display 150 based on a user input. The content displayed on the display 150 of the electronic device 101 may a combination of one or more of a still image, a moving image, text, audio data, and a link. Although it has been described that the electronic device 101 selects a location of the content displayed on the display 150 where particular text is displayed, the present disclosure is not limited thereto and it is apparent that various objects such as a particular image, an icon, and a link can be selected. For example, the content may be a map program. When a particular location is selected in the map displayed on the display 150, the electronic device 101 may output information corresponding to the coordinate or a predetermined area near the coordinate. However, with respect to any coordinate, the electronic device 101 may not provide corresponding information. When the location at which information is not provided is selected, the electronic device 101 may perform operation 2303.

In operation 2303, when the location at which information is not provided is selected in the map program, the electronic device 101 may acquire the selected coordinate and transmit the acquired coordinate to the predetermined server 106. When transmitting the coordinate to the server 106, the electronic device 101 may make a request for information on an area corresponding to the coordinate.

In operation 2305, the electronic device 101 receives the information corresponding to the coordinate transmitted from the server 106 and calls the second program based on the received information. According to an embodiment of the present disclosure, the server 106 may collect information corresponding to the coordinate through a database of the server 106 or a network (e.g., Internet) and determine at least one second program which can be called by the electronic device 101 based on the collected coordinate. The server 106 may transmit the collected information to the electronic device 101 based on a list and coordinate of the determined second program.

The electronic device 101 may provide the received information through the map program. According to an embodiment of the present disclosure, the electronic device 101 may provide information on a predetermined area based on the information received from the server 106 in accordance with the selected location at which information is not provided in the map program based on the received coordinate. Further, the electronic device 101 may call the second program determined to process the selected location coordinate as particular data with reference to the received information. According to an embodiment of the present disclosure, when a predetermined location is selected during the operation of the map program, the electronic device 101 may call the navigation program as the second program and input the selected location as a starting point, a destination, or a stopover in the navigation program.

According to an embodiment of the present disclosure, an operation method of the electronic device may include an operation for selecting a particular location in content displayed on the display, an operation for identifying text included in the particular location, and an operation for executing at least one program based on the text. According to an embodiment of the present disclosure, the content may include at least one of a still image, a moving image, text, audio data, and a link. According to an embodiment of the present disclosure, the text may be data including a data type processed in the program or a program name. According to an embodiment of the present disclosure, the data type may include at least one of an email address, a phone number, a location address, a location coordinate, a location name, and a person name. According to an embodiment of the present disclosure, when the number of particular locations is two or more, the operation method may further include an operation for executing at least one program based on text identified in the two or more selected particular locations. According to an embodiment of the present disclosure, when the number of particular locations is two or more, the operation method may further include an operation for calling all programs determined based on the text identified in the two or more particular locations and an operation for inputting the text determined to call the program into the program. According to an embodiment of the present disclosure, the operation method may further include an operation for transmitting the same data to a recipient corresponding to the text through each program. According to an embodiment of the present disclosure, when the particular location is a link, the text may be text corresponding to a preset data type included in other content linked. According to an embodiment of the present disclosure, the operation method may further include an operation for processing the text in the program. According to an embodiment of the present disclosure, the operation for processing the text may include an operation for inputting the text as a starting point, a destination, or a stopover when the program is a navigation device.

According to an embodiment of the present disclosure, an operation method of the electronic device 101 may include an operation for selecting a particular location in content displayed on the display, an operation for determining an icon identical or similar to an image of the selected location, and an operation for calling a program corresponding to the icon. According to an embodiment of the present disclosure, the operation method may further include an operation for detecting text included in the image and an operation for determining an icon based on at least one of the image and the text in the selected location.

Various operations performed by the electronic device 101 may be operations performed by a control of the processor 120. In addition, the electronic device 101 may include a module separate from the processor 120 which is programmed to control various embodiments of the present disclosure. The separate module programmed to control the various embodiments of the present disclosure may operate under a control of the processor 120.

According to an embodiment of the present disclosure, an electronic device may include a display that displays content and selects at least one location in the content, and at least one processor that selects a particular location in the content, identifies text included in the particular location, and executes at least one program based on the text. According to an embodiment of the present disclosure, the processor may process the content including at least one of a still image, a moving image, text, audio data, and a link. According to an embodiment of the present disclosure, the processor may process the text including a data type processed in the program or a program name. According to an embodiment of the present disclosure, the processor may process at least one of an email address, a phone number, a location address, a location coordinate, a location name, and a person name as the data type.

According to an embodiment of the present disclosure, when the number of particular locations is two or more, the processor may execute at least one program based on text identified in the two or more selected particular locations. According to an embodiment of the present disclosure, when the number of particular locations is two or more, the processor may call all programs determined based on the text identified in the two or more particular locations and input the text determined to call the program into the program.

According to an embodiment of the present disclosure, the processor may transmit the same data to a recipient corresponding to the text through each program. According to an embodiment of the present disclosure, when the particular location is a link, the processor may identify the text corresponding to a preset data type included in other content linked. According to an embodiment of the present disclosure, the processor may process the text in the program. According to an embodiment of the present disclosure, the processor may input the text as a starting point, a destination, or a stopover when the program is a navigation device.

According to an embodiment of the present disclosure, an electronic device may include a display that displays content and selects at least one location in the content, and at least one processor that selects a particular location in the content, determines an icon identical or similar to an image in the selected location, and calls a program corresponding to the icon. According to an embodiment of the present disclosure, the processor may detect text included in the image and determine an icon based on at least one of the image and the text in the selected location.

The term "module" used in the present disclosure may refer to, for example, a unit including a combination of one or more hardware, software, or firmware. The term "module" may be interchangeably used with a term such as "unit," "logic," "logical block," "component," or "circuit," etc. The term "module" may refer to a minimum unit of an integrally configured part or a portion thereof. The term "module" may refer to a minimum unit performing one or more functions or a portion thereof. The term "module" may refer to a device that is mechanically or electronically implemented. For example, a "module" according to the present disclosure may include at least one of an application-specific IC (ASIC) chip, a field-programmable gate array (FPGA), or a programmable-logic device which are known, or will be developed in the future, and performing certain operations.

According to an embodiment of the present disclosure, at least a portion of an apparatus (e.g., modules or functions thereof) or a method (e.g., operations) according to the present disclosure may be implemented as an instruction stored in a non-transitory computer-readable storage media, for example, in the form of a programming module. An instruction, when executed by one or more processors (e.g., the processor 120), may allow the one or more processors to perform a function corresponding to the instruction. The non-transitory computer-readable storage media may be, for example, the memory 130. At least a portion of a programming module may be implemented (e.g., executed) by, for example, the processor 120. At least a portion of the programming module may include, for example, a module, a program, a routine, sets of instructions, or a process, etc. for performing one or more functions.

The non-transitory computer-readable storage media may include a hard disk, a magnetic media such as a floppy disk and a magnetic tape, a CD-ROM, optical media such as a DVD, magneto-optical media such as a floptical disk, and a hardware device configured for storing and performing a program instruction (e.g., a programming module) such as a ROM, a RAM, a flash memory, etc. Also, the program instruction may include not only a machine language code generated by a compiler but also a high-level language code executable by a computer using an interpreter, and the like. The above-described hardware device may be configured to operate as one or more software modules in order to perform an operation of the present disclosure, and vice versa.

A module or a programming module according to the present disclosure may include at least one of the above-described elements, omit a portion thereof, or further include additional other elements. Operations performed by a module, a programming module, or other elements according to the present disclosure may be executed in a sequential, parallel, or heuristic method. Also, a portion of the operations may be executed in a different sequence, omitted, or other operations may be added.

According to an embodiment of the present disclosure, the electronic device 101 may select detailed information in content output in the first program based on a user input and execute a related second program if the selected information corresponds to particular data. The electronic device 101 may transmit detailed information selected by the user to the executed second program. When the electronic device 101 selects a phone number in a webpage based on a user input to execute a dialer app, an operation which the user desires can be performed only when detailed information corresponding to the phone number is transmitted to the dialer app. The electronic device 101 may store the detailed information transmitted from the first program to the second program in the first program, the second program, or a particular storage space (hereinafter referred to as a second storage space) designated by a program independent from the first program and the second program. The second storage space may be a physical storage device such as a memory or an SD card, but may be a logical storage space, which refers to a database, a file system or one or more files related to the first program, the second program, or the independent program. For example, when the particular data transmitted from the first program is a phone number, the second storage space may be basically an address book program or an address book database. Further, the electronic device 101 may use one particular group among a plurality of divided groups within one address book. When the electronic device 101 may use a storage space other than a call log program or a call log database, the electronic device 101 may use a new storage space separate from the address book program or the address book database as the second storage space.

Another example of particular data which can be transmitted to the second program includes multimedia data including an image, a voice signal, or other biometric signals. In a case of an image, the electronic device 101 may manage images of the same person within one directory or group through face recognition, acquire desired information through an image search using a particular object within the image or location information of the object, and use a character string within the image like in the use of the character string as the particular data. Further, the image may be used as 3D content through 3D rendering for combining one or more images and may be used through various methods such as a 3D printer. The voice signal may be used for identifying a call counterpart according to a characteristic of a voice through signal analysis, and used for performing a command through information included in the voice. In addition, information such as other biometric signals may be used.

When the particular data transmitted from the first program to the second program is multimedia data, the electronic device 101 may store the particular data in memory units in the form of a file and manage the particular data by a file system without separately storing the particular data in a separate second storage space generated by the second program. Further, the electronic device 101 may manage only a reference of each file by the second program by itself, or manage the particular data in a separate storage space. The electronic device 101 may distinguish whether the type of file is an image, a sound, or a video through an extension of the file, and may execute or reproduce the file through another program, which is not the currently selected second program such as a gallery program or a music program. However, the electronic device 101 may edit the particular data of the multimedia such as reducing, compressing, copying, and cropping and storing the original and store the original or the edited data in a separate database or a new second storage space in the same type as that of the database, and may use multimedia programs such as a gallery program or a music program or some areas within the multimedia programs as the separate second storage space.

When the detailed information corresponding to particular data selected based on the user is transmitted from the first program to the second program, the second program may generate a separate second storage space or use a second storage method to store the corresponding information. For example, when particular data of the detailed information selected by the user from the first program is a phone number or an email address, if the second program receives the corresponding information from the first program, the second program may perform functions related to the received information such as "store", "make a call connection", and "send email" with respect to the received information. Unlike the functions which can perform the corresponding operations without storage of the received information, the second program may provide functions necessarily requiring a storage operation of the received detailed information such as "simple store". In order to perform such functions, the electronic device 101 may mange the information by the second program itself unlike the typical method of managing the corresponding information by the first program, and thus may require an information management method or mechanism of the second program itself.

When the particular data analyzed in the content of the first program is information such as a restaurant, a parcel service, and a card company, which requires to identify a counterpart or requires to sometimes use a phone number search, the electronic device 101 may store the information in the second storage space. Basically, when the electronic device 101 receives and sends a call, identifies a call log, or identifies histories of received/transmitted messages, the electronic device 101 may output identification information on a counterpart, which is the same as that stored in the address book. When the electronic device 101 searches for an email address, the electronic device 101 may use the particular data as a search result.

According to an embodiment of the present disclosure, the maximum number of contacts, which can be stored in the address book of a general smart phone becomes very large or has no limitation due to a large capacity of performance and storage space of the electronic device 101. Further, the electronic device 101 uses too many spam messages such as text messages, multimedia message, or notes through various message services or a mobile messenger, so that reception of spam calls through the direct/indirect leakage of personal information rapidly increases. Accordingly, users reject reception of unnecessary information, and thus a function of registering and managing spam messages or phone numbers as spam contacts may be provided to meet user demands. However, in the electronic device 101, the call log, which stores histories of recently received or sent calls and messages, also shows spam messages or calls indiscriminately in order of time. Further, when the user registers a contact in a phone book or an address book, which is provided as a basic function in each mobile phone, unless the user divides contacts and designates a group, contact lists are managed in Korean alphabetical order or an English alphabetical order based on an initial consonant of the registered name. Accordingly, when the number of contacts increases, the user may have difficulty in finding a desired contact. In this case, the electronic device 101 may store and manage contacts in the address book corresponding to the second program receiving the phone number from the first program separately from the existing contacts. When the electronic device 101 selects a phone number received from a counterpart through a mobile messenger of "Kakao Talk" based on a user input and executes an address book, the corresponding address book may not be added to the basic address book and may be stored in a contact list related to "Kakao Talk". Similarly, when the electronic device 101 selects a phone number received from a counterpart through "Kakao Talk" and sends a call to a third party, the corresponding call origination histories may not only be stored in the integrated call log but also stored in a separate call log for call origination through "Kakao Talk".

In the similar way, the contacts may be differently stored according to importance of the contacts. When the phone number received through the first program is not directly related to the user and simply corresponds to a phone number for identifying a counterpart or the temporary use, such as a phone number of a restaurant or a parcel service, the electronic device 101 may manage the phone number as a separate contact or call log rather than adding to the existing contact or call log.

For example, when the electronic device 101 receives a phone number of a popular restaurant in a place where the user plans to visit from a friend through a mobile messenger based on a user input, the electronic device 101 may select the corresponding phone number, execute a contact program corresponding to the related second program, and store the phone number in the contacts. When 500 or more phone numbers have been already stored in the contacts, if the electronic device 101 adds the restaurant phone number to the existing contacts through the method of the related art, it may be difficult to find the corresponding restaurant phone number later. When the user searches for a phone number, it is difficult to find the phone number by simply scrolling the address book list. Accordingly, the user should use a method of directly searching for a name every time. When the user desires to back up the address book, the user should store all addresses one time, so that it takes a lot of time due to the large size of the address book. When storing a phone number, the electronic device 101 may provide a function of allowing the user to designate a group to the corresponding phone number. However, at this time, the user should perform an additional operation for generating and designating the group, which inconveniences the user. Accordingly, the electronic device 101 may generate contacts or call logs, which are divided according to importance of the stored information, and allow the users to more easily manage the contacts or call logs. The electronic device 101 additionally stores information, which is not frequently used but is required to be stored, in the second storage space in addition to the existing storage space or storage method, so that such inconvenience can be removed. Further, although the electronic device 101 does not separately store the information in the second storage space, the above embodiment of the present disclosure can be implemented through a method of changing a classification method of the existing storage space.

According to an embodiment of the present disclosure, the electronic device 101 may prevent unnecessary information transmitted through the SNS or mobile messenger, which is frequently used at present, or a program of sharing location information from being shared. The electronic device 101 may provide a service for recommending other people predicted as people related to the user or reveal information on the user to people predicted as acquaintances of the user through an SNS-based service such as "Facebook" or "Kakao Talk". One of the references for determining whether the person is related to the user uses address book information of the user. The electronic device 101 may share personal pictures or a profile with people temporarily stored in the address book through the SNS program. Accordingly, the electronic device 101 may separately store information on temporarily registered users in a separate storage space such as the second storage space and manages the corresponding contact to be not referred to by the SNS, mobile messenger, or the program for sharing the location information. Accordingly, the electronic device 101 may allow the user to not receive unnecessary recommendations or messages from contacts unintended by the user or may prevent information on the user from being leaked to unintended people.

According to an embodiment of the present disclosure, when particular data of the information transmitted from the first program to the second program is multimedia information such as an image, a voice signal, or other biometric signals, the electronic device 101 may perform an additional analysis operation of extracting a character string from the selected image unlike the simple character string analysis in order to allow the second program to use the related information. Such an analysis operation may be performed through the first program or an independent program before the corresponding information is transmitted to the second program or performed through the second program or an independent program after the corresponding information is transmitted to the second program. Analysis of multimedia information such as an image or a moving image takes much more time than analysis of the general character string and uses many more system resources. If the same analysis process should be performed whenever the same multimedia content, which have been previously selected based on the user input, are transmitted to the second program, unnecessary system resources may be wasted. Accordingly, multimedia information, which is transmitted to the second program and analyzed at least one time, may be stored in the second storage space together with an analysis result thereof by the first program, the second program, or an independent program. When the same information is transmitted later, at least a part of the analysis result may be re-used and thus an unnecessary waste of the system resources can be minimized.

According to an embodiment of the present disclosure, the electronic device 101 may automatically store all of the particular data analyzed in the first program in the second storage space without any user input. Although identification information of the particular data is not additionally input, the user may search for the corresponding information by remembering some of the information. For example, when the electronic device 101 receives an input of only the last four numbers of the phone number based on a user input, the user may find the desired phone number in the second storage space. Further, when the user inputs only some information in a dialer or email address input window, the electronic device 101 may search for the particular data and input text to match them or output a search result.

In addition to the method of dividing the storage space or storage method, a method of configuring a storage period at a storage time point may be useful for information required only for a limited time such as a phone number for simply identifying a counterpart or the temporary use. In other words, when data is temporarily stored based on a user input, the electronic device 101 may apply a method of removing the data after the one time use or after a few days pass. For example, when the user stores necessary information on accommodation or restaurants around the destination while traveling or going on a business trip, the user does not need the information after returning to the daily life, so that the user should remove the information in person. The electronic device 101 may automatically remove the information without any user input by configuring a usage count or a storage period. In this case, when a predetermined time passes or the usage count is exceeded, the information may be automatically removed or remind logic may be realized for allowing the user to identify whether to remove the information since the storage period of the corresponding information expires or a reference count arrives. Further, when the size of the second storage space is lacking, the electronic device 101 may remove the stored particular data in an order from the lowest priority based on a use frequency or a use time.

Through such a method, the electronic device 101 may prevent contact information in the address book or call logs from unnecessarily increasing. Such a method of managing the contacts may be performed by the second program receiving the related information from the first program, but may be provided to the user as an independent function by the address book, the contacts, or a call log related program.

In addition, the program may be stored in an attachable storage device capable of accessing the electronic device through a communication network such as the Internet, an intranet, a local area network (LAN), a wide LAN (WLAN), a storage area network (SAN), or any combination thereof. Such a storage device may access the electronic device via an external port. Further, a separate storage device on the communication network may access a portable electronic device. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

According to various embodiments of the present disclosure, the electronic device can increase usability of the electronic device and provide a convenient user interface by executing a particular operation of the electronic device based on provided content and data included in the content.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating an electronic device, the method comprising:
   displaying multimedia content;
   detecting an input on a visual object, which is a non-executable object, included in the multimedia content being displayed;
   obtaining, by recognizing the visual object from the multimedia content, information of the visual object;
   identifying an application among a plurality of applications that are stored in the electronic device by comparing the information of the visual object with representative information of each of the plurality of applications; and
   executing the identified application,
   wherein the representative information of the application includes at least one of:
      an image resource of the application including at least one of an icon, a layout, a color, a mascot or a button shape, or
      a keyword indicating a function of the application.

2. The method of claim 1, wherein the displaying of the multimedia content comprises displaying the multimedia content by using another application among the plurality of applications, and
   wherein the other application is distinct from the application that is identified.

3. The method of claim 1, further comprising:
   displaying, in response to the execution of the application, a screen including information associated with the multimedia content.

4. The method of claim 3, wherein the displaying of the screen comprises ceasing to display the multimedia content.

5. The method of claim 1, further comprising:
   in response to the detection, identifying a type of the input;
   based on identifying that the type of the input corresponds to first type, obtaining the information of the visual object by recognizing the visual object from the multimedia content, identifying the application by comparing the information of the visual object with the representative information of each of the plurality of applications, and executing the identified application; and
   based on identifying that the type of the input corresponds to second type distinct from the first type, displaying information associated with the visual object by using another application that is used for displaying the multimedia content, wherein the other application is distinct from the application.

6. The method of claim 1, wherein the recognizing of the visual object comprises extracting, from the multimedia content, the visual object.

7. The method of claim 1, wherein the information of the visual object comprises at least one of information on an image extracted from the visual object or a text extracted from the visual object.

8. An electronic device comprising:
   a display; and
   at least one processor configured to:
      display multimedia content,
      detect an input on a visual object, which is a non-executable object, included in the multimedia content being displayed, obtain, by recognizing the visual object from the multimedia content, information of the visual object, identify among an application a plurality of applications that are stored in the electronic device by comparing the information of the visual object with representative information of each of the plurality of applications, and execute the identified application, wherein the representative information of the application includes at least one of:

an image resource of the application including at least one of an icon, a layout, a color, a mascot or a button shape, or a keyword indicating a function of the application.

9. The electronic device of claim 8, wherein the processor is further configured to display the multimedia content by using another application among the plurality of applications, and wherein the other application is distinct from the application that is identified.

10. The electronic device of claim 8, wherein the processor is further configured to display, in response to the execution of the application, a screen including information associated with the multimedia content.

11. The electronic device of claim 10, wherein the processor is further configured to cease to display the multimedia content in response to executing the application.

12. The electronic device of claim 8, wherein the processor is further configured to:

in response to the detection, identify a type of the input, based on identifying that the type of the input corresponds to first type, obtain the information of the visual object by recognizing the visual object from the multimedia content, identify the application by comparing the information of the visual object with the representative information of each of the plurality of applications, and execute the identified application, and based on identifying that the type of the input corresponds to second type distinct from the first type, display information associated with the visual object by using another application that is used for displaying the multimedia content, wherein the another application is distinct from the application.

13. The electronic device of claim 12, wherein the processor is further configured to:

extract, from the multimedia content, the visual object, and obtain the information of the visual object by recognizing the visual object that is extracted from the multimedia content.

14. The electronic device of claim 8, wherein the information of the visual object comprises at least one of information on an image extracted from the visual object or a text extracted from the visual object.

\* \* \* \* \*